US010679443B2

(12) United States Patent
Grigorov et al.

(10) Patent No.: US 10,679,443 B2
(45) Date of Patent: Jun. 9, 2020

(54) SYSTEM AND METHOD FOR CONTROLLING ACCESS TO A BUILDING WITH FACIAL RECOGNITION

(71) Applicant: Alcatraz AI, Inc., Palo Alto, CA (US)

(72) Inventors: Filip Grigorov, Sofia (BG); Maxim Taralov, Sofia (BG); Vahram Antonyan, Redwood City, CA (US); Marine Dunoguier, San Francisco, CA (US); Ventseslav Gaydarzhiev, Foster City, CA (US)

(73) Assignee: Alcatraz AI, Inc., Palo Alto, CA (US)

(*) Notice: Subject to any disclaimer, the term of this patent is extended or adjusted under 35 U.S.C. 154(b) by 0 days.

(21) Appl. No.: 16/159,484

(22) Filed: Oct. 12, 2018

(65) Prior Publication Data

US 2019/0213816 A1 Jul. 11, 2019

Related U.S. Application Data

(60) Provisional application No. 62/572,344, filed on Oct. 13, 2017.

(51) Int. Cl.
*G07C 9/00* (2006.01)
*G06K 9/00* (2006.01)
*H04N 7/18* (2006.01)
*G06T 7/20* (2017.01)
*H04N 5/33* (2006.01)
*H04N 5/232* (2006.01)
(Continued)

(52) U.S. Cl.
CPC ......... *G07C 9/00563* (2013.01); *G06F 21/32* (2013.01); *G06K 9/00255* (2013.01); *G06K 9/00288* (2013.01); *G06K 9/00302* (2013.01); *G06K 9/209* (2013.01); *G06T 7/20* (2013.01); *G06T 7/521* (2017.01); *G07C 9/00571* (2013.01); *G07C 9/37* (2020.01); *H04N 5/232* (2013.01); *H04N 5/247* (2013.01); *H04N 5/33* (2013.01); *H04N 5/332* (2013.01); *H04N 7/181* (2013.01); *H04N 7/186* (2013.01); *H04N 9/045* (2013.01); *G06T 2207/10024* (2013.01); *G06T 2207/10028* (2013.01); *G06T 2207/10048* (2013.01)

(58) Field of Classification Search
CPC ............... G07C 9/00563; G06T 7/521; G06T 2207/10024; G06T 2207/10028; G06T 2207/10048; G06K 9/00288; G06K 9/209; H04N 5/247
See application file for complete search history.

(56) References Cited

U.S. PATENT DOCUMENTS 4,581,634 A  4/1986 Williams
4,843,461 A  6/1989 Tatsumi
(Continued)

Primary Examiner — John R Schnurr
(74) Attorney, Agent, or Firm — Knobbe, Martens, Olson & Bear, LLP

(57) ABSTRACT

Systems and methods are provided for controlling access to a building or other restricted physical spaces using at least a facial recognition module, an access control panel and electronically lockable doors or other means of controlling access. The facial recognition module comprises visible light and IR detection. The facial recognition module detects multiple persons in the vicinity of an access control location, and may be configured to deny access to some or all of those persons unless all are recognized as authorized entrants.

20 Claims, 44 Drawing Sheets

(51) Int. Cl.
    *H04N 9/04*     (2006.01)
    *G06F 21/32*     (2013.01)
    *G07C 9/37*     (2020.01)
    *G06T 7/521*     (2017.01)
    *G06K 9/20*     (2006.01)
    *H04N 5/247*     (2006.01)

(56) References Cited

U.S. PATENT DOCUMENTS

| | | | |
|---|---|---|---|
| 5,867,587 A | | 2/1999 | Aboutalib |
| 9,728,077 B1 * | | 8/2017 | Fu .................. G08B 29/185 |
| 10,032,327 B1 * | | 7/2018 | Xin .................. G07C 9/00158 |
| 2003/0169337 A1 | | 9/2003 | Wilson |
| 2005/0110637 A1 | | 5/2005 | Rao |
| 2005/0212654 A1 | | 9/2005 | Yoda |
| 2006/0104488 A1 | | 5/2006 | Bazakos |
| 2007/0291118 A1 | | 12/2007 | Shu |
| 2008/0222963 A1 | | 9/2008 | Zwart |
| 2011/0248851 A1 | | 10/2011 | Pham |
| 2012/0169465 A1 | | 7/2012 | Chang |
| 2013/0194184 A1 | | 8/2013 | Kang |
| 2015/0287301 A1 | | 10/2015 | Locke |
| 2015/0379333 A1 * | | 12/2015 | Ingram .............. G06K 9/00342 |
| | | | 348/46 |
| 2016/0239705 A1 | | 8/2016 | Masood |
| 2017/0286754 A1 | | 10/2017 | Eder |
| 2018/0013211 A1 * | | 1/2018 | Ricci .................. H04L 9/321 |
| 2018/0047230 A1 * | | 2/2018 | Nye .................. G05B 15/02 |
| 2018/0158269 A1 * | | 6/2018 | Friedman .......... G07C 9/00158 |
| 2019/0272413 A1 | | 9/2019 | Eder |

\* cited by examiner

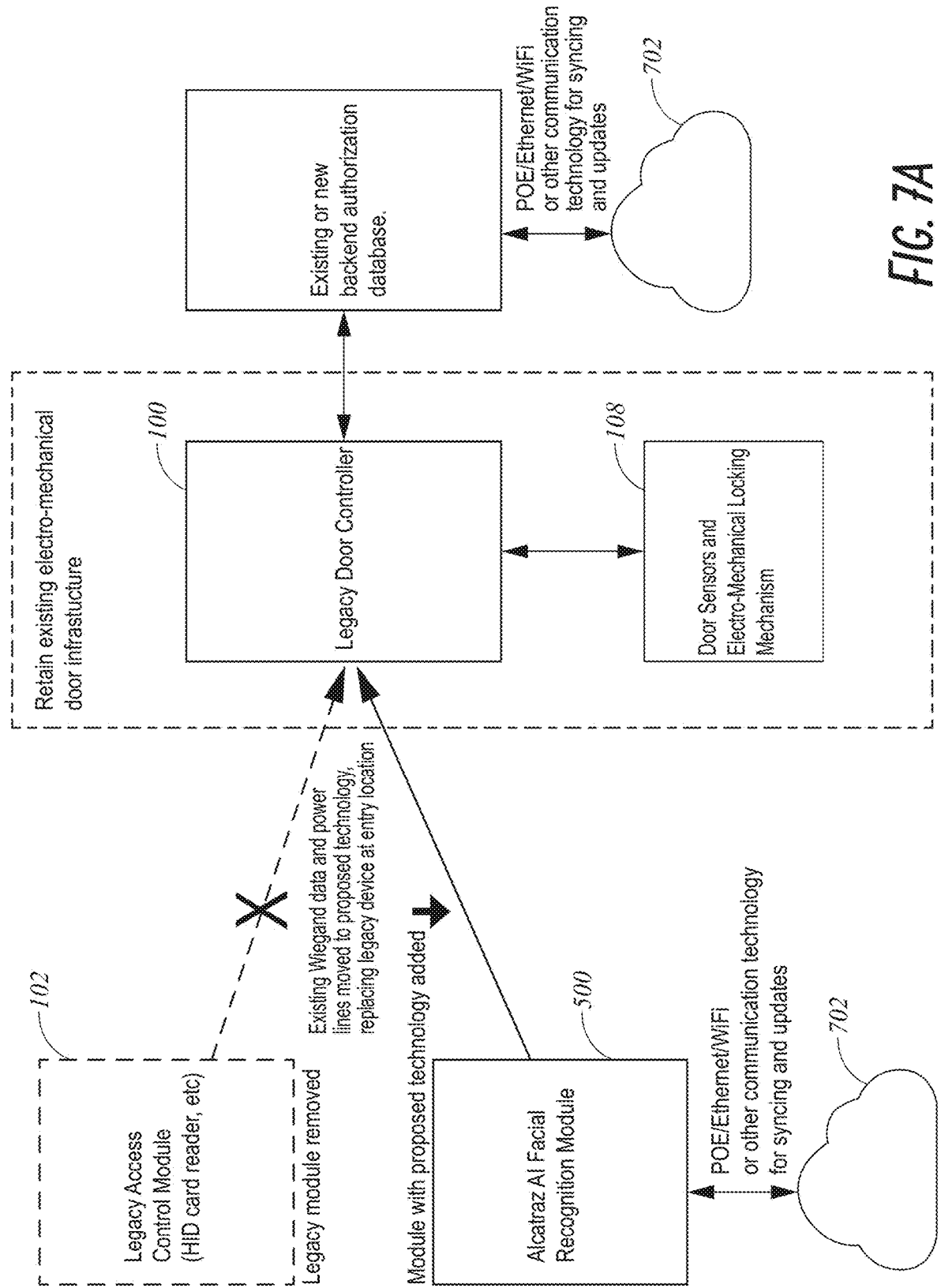

*1A*

Are you human?
○

Proposed game to the user to invite him trying several approaches in order to make non human objects recognized as a real person.

*1B*

Give indications on the tentative results with fun punchlines

| - Are you a zombie?<br>- Robot detected | - You're alive!<br>- Living person detected |

|   | Security | Speed | Ease of use | Set up |
|---|---|---|---|---|
| Smartphone/Key/PIN | | | | |
| Badge | | | | |
| Fingerprint | | | | |
| Iris | | | | |
| Camera | | | | |
| The technology | | | | |

FIG. 43

SYSTEM AND METHOD FOR CONTROLLING ACCESS TO A BUILDING WITH FACIAL RECOGNITION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

Controlling access to buildings is an old problem. Castles once had drawbridges and moats. Guards, armed or otherwise, have been posted at doors for centuries. These approaches can be effective, but come at a significant cost. As with most other forms of security, there were tradeoffs between efficiency (ease of ingress and egress) and security.

In the context of a modern business that may have thousands of employees, more sophisticated tools are required. For several decades, many businesses have used badge-based access control systems. The least sophisticated of these still rely on a human to check for and make decisions about whether to admit or deny based on a visual appraisal of basic badge, generally by checking the "headshot" photograph on the badge against the physical appearance of the person wearing it. This approach obviously requires a human guard at each entrance.

More technically sophisticated access control systems use electronically lockable doors, and some form of machine-readable coding on the badges carried by employees, each of which generally contains a unique identifier for each badge. Such coding may take the form of a magnetic strip, a chip, or another form of RFID or other technique for encoding a unique identifier. When an employee (or other person with an ID) attempts to enter a controlled-access building (or a limited-access area within a building), the coding on the badge is read by the appropriate equipment (such as a "swipeable" card slot, or an antenna), and the unique identifier associated with the badge is generally transmitted to a access control panel that contains, at minimum, a database of badge identifiers. If the badge being used is associated with permission to the space controlled by the electronic lock, the access control panel sends an "unlock" signal to that door to enable to badge holder to enter; if not, the door does not unlock. (Additional steps might also be taken, such as triggering an alert.)

Badge-based systems are widely used, but have a number of drawbacks. When used alone (an approach widely characterized as single-factor authentication), they can be compromised by cards that have been stolen, borrowed or counterfeited. They also create the opportunity for a security risk known as "tailgating". People tend to reflexively make polite gestures like holding a door open for those walking behind them. Bad actors may use such instincts as a means to circumvent security systems. Such exploits are so common that they have a name: deception to manipulate individuals into giving others access to or divulging confidential or personal information that may be used for fraudulent purposes is generally known as "social engineering." Tailgating, a specific and physical form of social engineering, is difficult to prevent with such access control systems. (Tailgating may also include the situation in which an unauthorized entrant follows a permitted entrant into a space without the permitted entrant even noticing.) Posting a human guard at each access point reduces, but does not eliminate the risk. It also substantially increases the cost of the security regime—in terms of the financial cost of the guards, of course, but also the frictional effects of forcing each potential building entrant to interact with the guards. That requirement slows the process, and can cause significant queuing at peak times of day, resulting in annoyed workers and lost productivity.

An alternative approach that has been used to a limited extent is biometric verification. Technologies like fingerprint readers and iris scanners have been deployed in high-security environments such as data centers, secret government facilities, etc. Even where such technologies offer strong security, they have significant drawbacks that generally make them undesirable for broader applications. In addition to the costs of the hardware required to scan eyeballs and/or read fingerprints, the hardware to enroll people in the system and the computer systems necessary to store, process and make decisions based on the collected biometric information, both systems require that each person seeking entrance to the access-controlled area have a significant, time-consuming interaction with that system, including the first enrollment phase, which may be very long. This may be an acceptable tradeoff for a highly secure facility accessible to a small number of people. But the costs are likely too high for higher-volume applications.

An increasingly prevalent form of biometric verification is facial recognition. Facial recognition generally uses one or more digital cameras or sensors to capture one or more images, which are used to generate a digital file containing data about a person's face. Image processing software uses this data to perform analysis to detect facial features and to determine attributes such as distances between different facial features, description of those facial features and the shape of the head. Algorithms running on one or more processors then uses this data to compare the captured face to one or more faces that have been previously analyzed to estimate the probability that they are the same person.

Facial recognition is now being used as a security method for some smartphones.

The quality of cameras or sensors and the speed of the processors deployed in phones have rapidly improved, enabling early forms of image recognition. However, many early approaches could be fooled by, for example, holding a photograph of a person in front of the camera. In an attempt to compensate, some newer smartphone-based recognition systems require the user to perform a task such as change facial expression or move or change orientation to provide evidence that what is being observed is a living person and not just a picture.

Another form of facial recognition is to generate a depth map based on stereoscopic vision, relying on the differences in two simultaneous images captured by two different cameras or sensors separated by a distance.

Some more recent devices employ a more sophisticated approach called "structured light". Structured light is the process of projecting a known pattern, such as a grid of lines or dots onto the object, such as a face, to be analyzed. Such patterns may be projected with a laser, which could use visible light, infrared light, or another signal. A camera or sensor in turn records the shape of the grid as seen on the surface of the object. When such a grid is projected onto a flat surface perpendicular to the projector, the grid is unaltered. But when such a grid is projected onto more complex shapes, the deformations in the grid created by the uneven surfaces allow machine vision systems to calculate the distance of those grid points from each other in 3 dimensions, and thus to model the shape of the object.

Measuring the time of flight is another way to generate a depth image with a projector and sensor. This technology is based on the fact that the speed of light is a constant. The emitted light travels to an object and is reflected back to the sensor. Measuring the time in between the projector emission and reception of the light back on the sensor allow an estimate of the traveled distance.

Thus, for example, one popular smartphone that uses this approach, the iPhone X from Apple, may both measure time of flight for some purposes, and project thousands of points using an infrared laser projector, allowing it to read the resulting grid as overlaid on a face using an infrared sensor.

This is a relatively simple use case for facial recognition in several ways. First, high-end smartphones now have high-resolution cameras built in, as well as processing power and memory that only expensive computer workstations featured only a few years ago. A few smartphones even include infrared emitters and sensors. Users also tend to help the process by holding the phone fairly close to their faces, with the camera and/or other sensors pointed in the proper direction. And perhaps most important, in the ordinary case, the number of entries in the database of faces authorized, and thus stored for comparison purposes, is one. Together, these factors simplify and speed up the task.

There have been attempts to apply facial recognition to access control. However, there are a number of challenges in this context. The library of faces of approved people can number in the thousands or more. Matching a new image to the correct identity can require significant processing power and system memory. Determining a reasonable degree of certainty that the new image of a person seeking entry is not a match with one of the people already in the database is also computationally expensive. Because those resources have until recently been quite expensive, such systems have generally required that the sensing units located at access points be networked to a central computer. Such topologies can be expensive to install and maintain. They also have tended to introduce sufficient lag time that queuing can become in issue.

Existing systems also tend to require that a person seeking admittance stand still in a specific location and look directly toward a specific location usually at one or more cameras or sensors. They also tend to work only under controlled lighting conditions.

Current solutions in the secure access control industry can be spoofed or require human interaction. Many methods are currently available, including, but not limited to badging, iris scan, fingerprint scan, PIN code or phone access using Bluetooth or NFC. Some of those solutions are very secure but require additional interactions from the user, while other lacks security at its core.

In contrast, what is proposed below enables instantly secure, spoof-free authentication based on 3D facial reconstruction and AI. The tech is envisioned to replace the ubiquitous badge readers by the doors and eventually make its place to other areas like integrating into medical devices or ATM one/two factor authentication. It is a fast and frictionless method of identifying securely a user with no additional interaction. In some embodiments, Deep learning is used to train for each new user so the experience is transparent.

Thus there is a need for a building security system that maximizes security (by preventing or substantially reducing the risk of improper entry), while minimizing cost (by reducing the need for expensive human guards and reducing friction and waiting for those who are desired entrants to the building). Ideally, such a system would be easily integrated into an existing building security system.

SUMMARY OF THE INVENTION

In one embodiment, the invention comprises a compact module that includes a visible light (RGB) camera, a plurality of infrared sensors, an infrared projector, a processor, and memory. It also includes means for communicating with an access control panel.

In another embodiment, the invention also comprises means for directly controlling access by transmitting a signal to lock or unlock a door.

In another embodiment, the invention also comprises means for autonomous operation of a module without communication with a remote server.

In another embodiment the invention also comprises a badge reader or wireless means of reading a badge or token, such as by using Bluetooth.

In another embodiment, the invention enables single or multiple-factor authentication.

In another embodiment, the invention comprises methods for connecting and communicating between multiple modules and entry points.

In another embodiment, the invention comprises additional components that can detect tampering with the system.

In another embodiment, the invention also comprises systems and methods for re-configuring hardware interfaces with other access control systems.

In another embodiment, the invention also comprises methods for recognizing authorized entrants without requiring them to alter the normal process of entering a space as if access was not controlled.

In another embodiment, the invention also comprises methods for associating a user's face with an alternate identifier such as a badge number.

In another embodiment, the invention also comprises methods for detecting and preventing unauthorized persons from entering a controlled space by following an authorized person.

In another embodiment, the invention comprises techniques for recognizing a face when captured images of that face are partially blocked or occluded.

In another embodiment, the invention also comprises methods for using related interactions with the system to improve accuracy.

In another embodiment, the invention also comprises using a combination of RGB image data and 3-dimensional imaging data to detect spoofing.

In another embodiment, the invention comprises methods for identifying people who attempt to enter a controlled space using an improper badge.

In another embodiment, the invention comprises methods for enabling guest access under certain conditions.

In another embodiment, the invention comprises methods for determining the number of occupants in a building and enabling coordination of those determinations with emergency systems.

In another embodiment, the invention also comprises systems and methods for coordinating and sharing data regarding authorized entrants across multiple devices and multiple entry points.

In another embodiment, the invention also comprises systems and methods for detecting whether a person in the vicinity of an entry point intends to enter.

In another embodiment, the invention also comprises systems and methods for determining, in the case of a location with a plurality of separately controlled entry points, which of those entry points a user seeks to enter.

In another embodiment, the invention comprises a method for provisioning networked devices equipped with cameras by presenting configuration information to the devices in the form of barcodes or another coded graphic format.

In another embodiment, the invention also comprises systems and methods for increasing efficiency of identifying authorized persons.

In another embodiment, the invention also comprises systems and methods for clustering similar facial images in order to improve matching accuracy.

In another embodiment, the invention also comprises systems and methods for improving the acceptance of the system by gamifying the machine-human interaction In another embodiment, the invention offers the ability, through a "slider" control or similar user-adjustable method of representing levels of certainty in a user interface, to make the system either more accurate by lowering false positives and false negatives, or moving to less friction by sticking with single-factor facial recognition with slightly lower accuracy.

In another embodiment, the invention also comprise a method to semi-automate an annotation process.

In another embodiment, the invention offers a recognition method which does not request preliminary enrollment of the user.

BRIEF DESCRIPTION OF THE DRAWINGS

FIG. 7a is a high-level diagram of an access control system using an aspect of the present invention.

FIG. 43 is an illustration of relative benefits of different technologies for building security.

DETAILED DESCRIPTION OF THE PREFERRED EMBODIMENT

Common in the prior art are badge-based access control systems. Badges may include photographs of the associated user, or may be simple cards or other small portable tokens that contain only internal means for storing a unique identifier. Permitted users will generally each be issued a badge or token.

Figure 1:
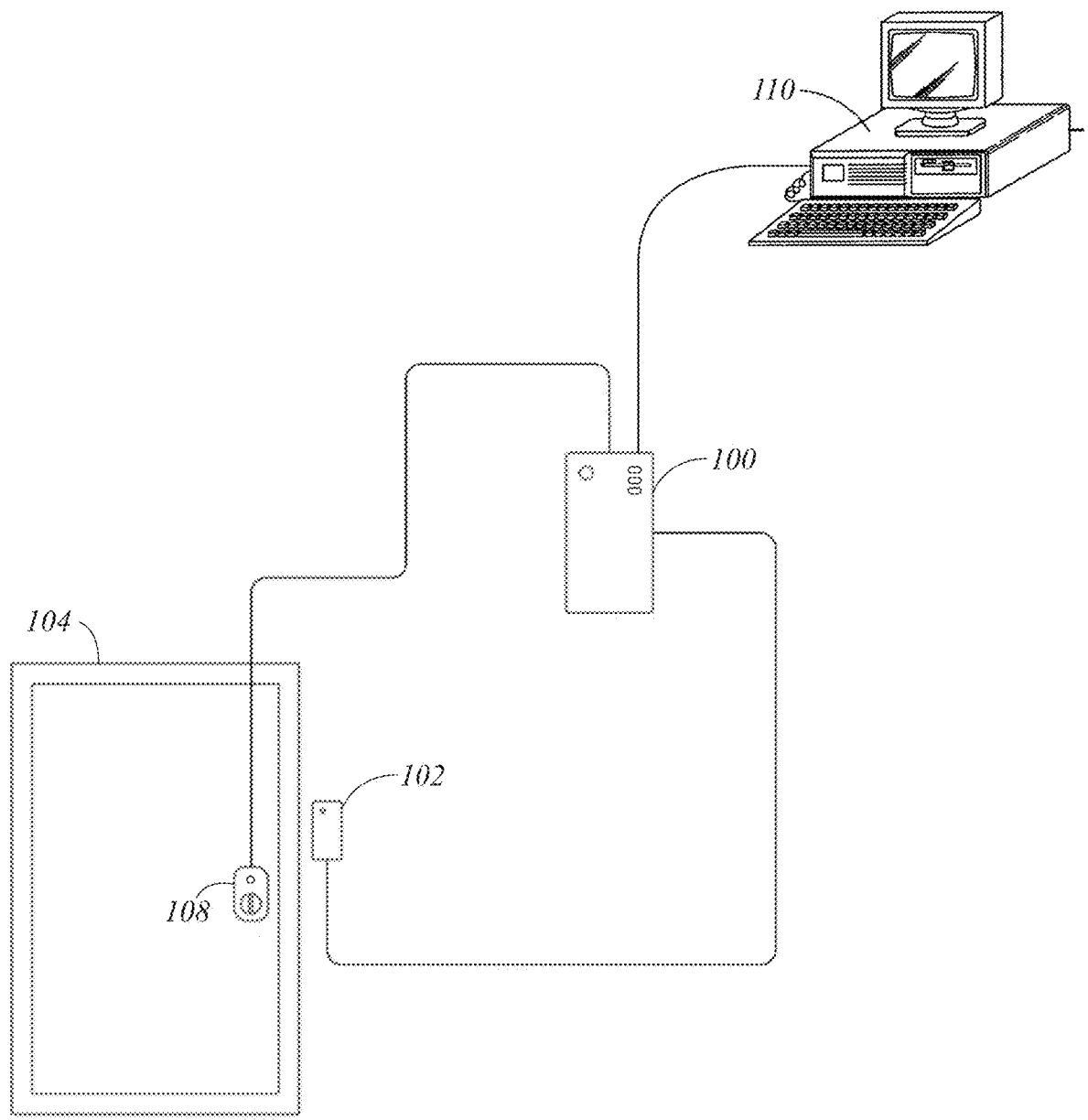
FIG. 1 illustrates a system of controlling access to a building or other restricted area using technology common in the prior art.

FIG. 1 illustrates the major elements of a representative system used to control access to a building or other secure area as commonly found in the prior art. A typical system includes an access control panel 100, and one or more badge readers 102, which are typically located at access points such as door 104. Access control panel 100 can also be connected to one or more turnstiles, as are sometime used in places like lobbies of buildings that control access and have large number of people entering and leaving. Doors 104 include electronic locks 108; turnstiles include remotely controlled means for locking and unlocking the turnstiles. Badges and badge readers can use a variety of technologies for encoding a unique identifier in each badge, including a number of proprietary protocols, and retrieving that identifier at the time the badge is presented.

The physical interface generally uses five or six wires one that carries DC voltage to power the card reader, a common ground, one or two wires that transmit status to the green and red indicator LEDs on the badge reader, and two data transmission wires. It is a simple binary transmission system, changing states from high (some positive DC voltage, e.g. 5 volts) to low (zero). The original Wiegand format for badge reader encoding permits a total of 26 bits. Other systems have used the Wiegand hardware layer but different data formats, using many more bits, that enable more complex addressing. Different encoding formats are also available now, some of which are proprietary to one specific company. Those encoded badge numbers are transmitted to the access control panel using a communication protocol which may be Wiegand or other protocols deployed have included mono-directional, Clock and Data or bidirectional OSDP (RS 485), RS 232 or UART.

Badge readers 102 will generally include a means for providing visual feedback to the badge holder, such as green LED light 112 and red LED light 114. Green will generally indicate that the user has successfully badged in, and is allowed to enter; at all other times the red light will generally be illuminated to indicate that the system is operational. Bunking red or a third color, such as orange could indicate that an invalid card has been swiped.

The badge's unique ID can be coded into a magnetic stripe, or RFID (radio frequency identification), or (with less security) a visual indicator such as a barcode or QR code. In the case of a magnetic stripe system, a magnetic reader like those traditionally used for credit cards is included in the badge readers 102, and each user must swipe his/her badge through a dedicated slot in badge reader 102. In the case of RFID-based systems, either active or passive, reader 102 will include one or antennas that may detect or generate a field of interrogating radio waves. In some systems, physical contact between the token/badge and the enclosure of the reader is required; in others, a level of proximity may be sufficient.

When a badge is scanned, the scanning device 102 determines the unique identifier encoded in the badge 106 and transmits the identifier to access control panel 100. Historically, these signals have generally been transmitted over a simple wired connection using a serial bus protocol which may be a proprietary standard such as the previously Wiegand system, or may utilize a different, non-proprietary protocol. However, some systems have used other approaches, including wired technologies including Ethernet, Power of Ethernet (PoE), or wireless systems such as IEEE 802.11, also known as WiFi.

In one embodiment, access control panel 100 is a dedicated central point to which a number of badge readers 102 can be connected. Access control panel generally includes a simple means of connecting a number of wired connections to access point controls. It also generally includes a storage medium capable of maintaining a list of authorized entrants to the building(s) or area(s) where access is controlled by the system. Access control panel 100 may also include a means for providing backup power to the access control system in the event power is interrupted, either by a power failure or due to an attempt to break into the controlled area.

When a badge is presented at a badge reader 102, the encoded badge number is transmitted to access control panel 100. Access control panel 100 determines if that badge number is on the stored list of permitted entrants, and if so, sends an unlock signal to the appropriate electronic lock or turnstile.

Access control panel 100 may also include means by which it can be connected to a computer 110, though for security reasons, the exposure of access control panel 100 to external devices may be carefully controlled. Such connection may be accomplished via a common networking protocol such as Ethernet, or may use a serial protocol such as RS232 or RS422. Computer 110 may be one or more conventional computers that are equipped with communications hardware such as modem or a network interface card. The computers include processors such as those sold by Intel and AMD. Other processors may also be used, including general-purpose processors, multi-chip processors, embedded processors and the like.

Computer 110 can also be a microprocessor-controlled computer such as a dedicated embedded system. Computer 110 may utilize a conventional keyboard and display, or may provide an alternate interface such as a touch screen, or some other means of interaction. It may utilize a browser or other application configured to facilitate interaction with a user.

Computer 110 may incorporate one or more storage medium that may comprise any method of storing information. It may comprise random access memory (RAM), electronically erasable programmable read only memory (EEPROM), read only memory (ROM), hard disk, floppy disk, CD-ROM, optical memory, or other method of storing data.

Computer 110 may use an operating system such as Microsoft Windows, Apple Mac OS, Linux, Unix or the like, or may use dedicated operating system.

Computer 110 may include means for communication over a network such as a local area network or the Internet to permit remote observation or control over its functions.

Computer 110 may be used to permit adding and deleting authorized users from the system.

Figure 2:
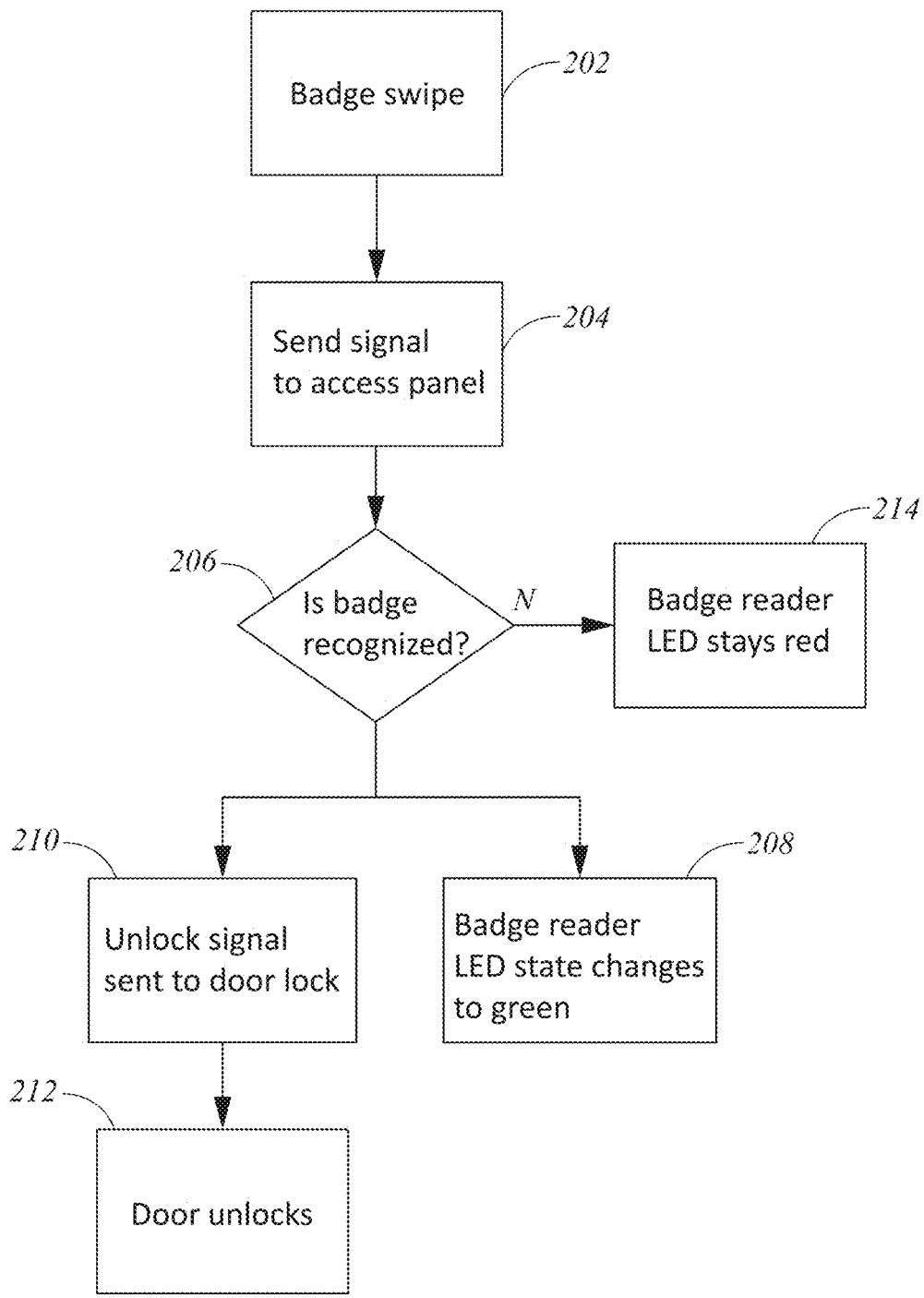
FIG. 2 is a flowchart illustrating the steps involved in validating and admitting an approved badge holder in the prior art.

FIG. 2 presents a block diagram illustrating the steps taken by a system typical of the prior art when a badge is presented to the system. In step 202 the badgeholder presents his or her badge 106 to the badge reader 102. In step 204, the badge reader transmits the unique identifier read from the badge 106 to access control panel 100. In step 206 access control panel 100 evaluates the transmitted unique identifier to determine if access should be granted. This process may consist of looking up the unique identifier in a database. If the unique identifier is in the database of permitted entrants, then in step 208 green LED 112 is illuminated, and in step 210, access control panel 100 transmits a signal to the door lock 108 unlocking it 212 and permitting entry. If the unique identifier is not in the database of permitted entrants, then in step 214, there is no state change transmitted, and red LED 114 remains illuminated, and door lock 108 (or turnstile) remain locked. In other embodiments, the red LED may blink to indicate that access has been refused. In some implementations, different color LEDs or patterns of illumination may be used to signal admittance or rejection. The illumination of the "admit" LED and the unlocking of the door or turnstile may be simultaneous instead of sequential. Again, turnstiles may be substituted for doors.

Figure 3:
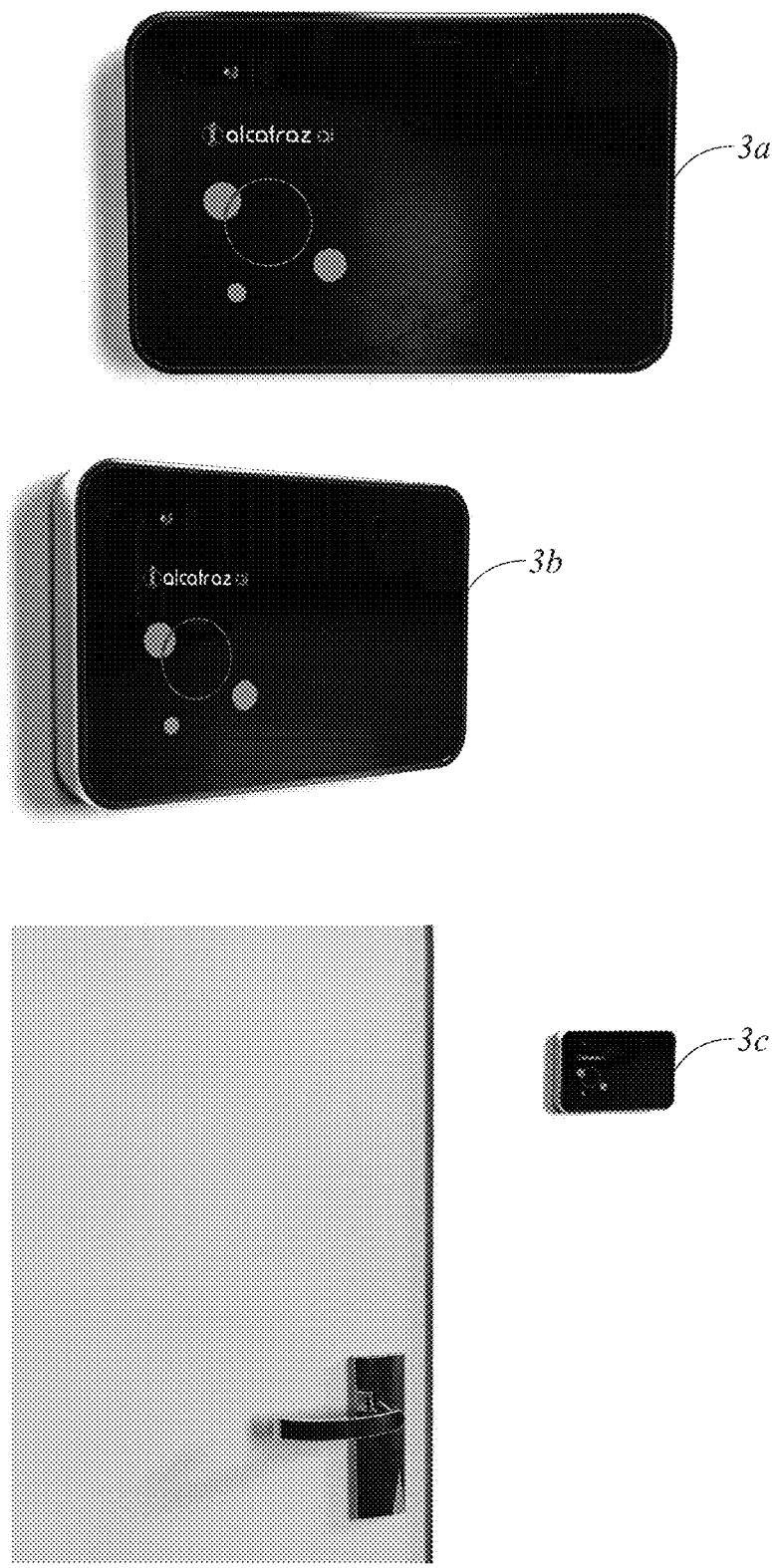
FIGS. 3a, 3b, and 3c show multiple images of a possible embodiment of a facial recognition module according to the present invention.

The accompanying hardware edge unit is designed to be placed on a wall or door next to the physical access point to be unlocked. This module includes several sensors protected by a non-transparent piece of glass (provided that it includes transparent areas in front of the IR laser projector and sensors), plastic or other transparent or non-transparent material that permits the sensors and IR laser projector enclosed therein to operate. The following renderings in FIG. 3 give an overview of the design of the unit. FIG. 3*a* shows an exemplary facial recognition module as viewed from the perspective of a person walking directly toward the unit. FIG. 3*b* shows the same facial recognition module in perspective. FIG. 3*c* shows the same facial recognition module in relationship with a door for which the facial recognition module controls access.

Figure 4:
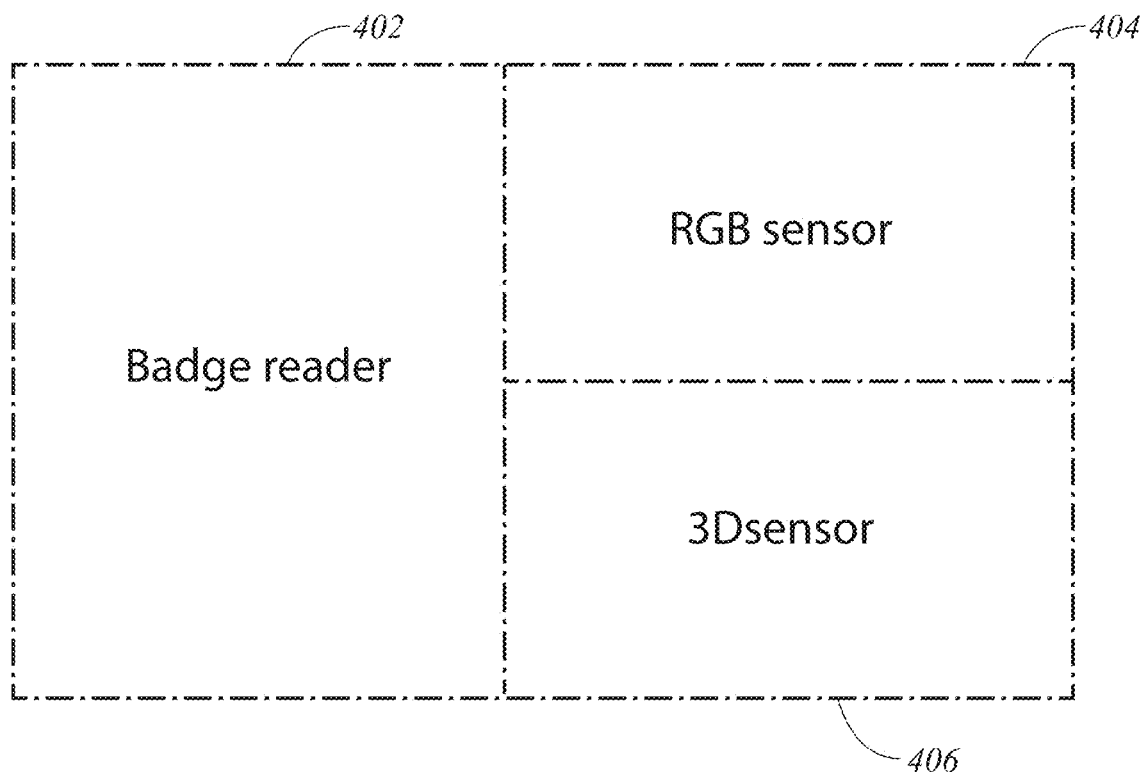
FIG. 4 is a high-level block diagram of a facial recognition module according to the present invention.

This face recognition module is mainly based on a badge reader associated with an RGB and depth sensors to be able to capture user's faces, as seen in FIG. 4. The edge unit also contains a processing unit and communication modules. It includes badge reader 402, RGB camera 404, and Infrared sensor 406. It may also include a small display to present messages, etc. to potential entrants.

Figure 5:
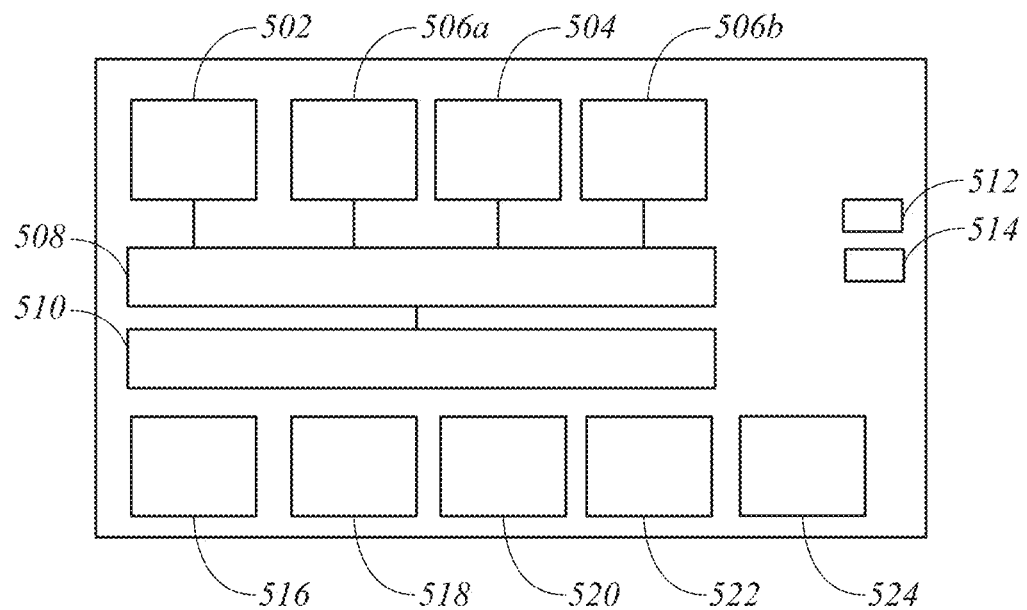
FIG. 5 is a more detailed block diagram of a facial recognition module according to the present invention.

FIG. 5 is a more detailed illustration of an embodiment of a facial recognition access point module 500 according to one aspect of the subject invention. Facial recognition access point module 500 includes an RGB (red, green, blue) camera 502 to capture visible light images. Preferably, RGB camera 502 is capable of capturing high-definition (such as 1920 by 1080 pixel) images, though a variety of resolutions may be used. Facial recognition access point module 500 also includes infrared laser projector 504. IR laser projector 504 includes both an IR source, and means for projecting structured light. In an embodiment, the IR source could be a simple IR emitter that does not project structured light. Facial recognition access point module 500 also includes two infrared sensors 506*a* and 506*b*. Infrared sensors 506*a* and 506*b* are physically separated in order to enable stereoscopic IR viewing, much as the separation of eyes enables depth perception. Infrared sensors 506*a* and 506*b* are also preferably high-definition units (such as a resolution of 1280×720 pixels), though again a variety of resolutions may be suitable.

Each of RGB camera 502, IR laser projector 504, and IR sensors 506*a* and 506*b* are connected internally to I/O interface module 508, which is in turn connected to processor module 510. In some implementations, I/O interface module 508 may be integrated into CPU 510. processor module 510 may comprise multiple processors, memory, etc., and may comprise other components to enhance performance, such as one or more graphics processing units (GPUs).

Facial recognition access point module 500 may also include one or more status indicator lights. These may consist of red LED 512 and green LED 514. Alternatively, a combination of LEDs may used to generate a wide range of colors. These LEDs can be controlled by processor 510. Also included may be means for connecting facial recognition access point module 500 to other devices, including Wiegand-based systems. Thus facial recognition access point module 500 may also include a wire block 516 or other means for connecting appropriate wires to the unit. Facial recognition access point module 500 may also contain power supply-related components 518, such as transformers, voltage regulators, surge suppressors, capacitors, batteries, etc. Facial recognition access point module 500 may also contain one or more relays or solenoids 520 used to trigger an unlock signal to the connected door or turnstile. Facial recognition access point module 500 may also contain anti-tampering components 522, which may comprise accelerometers, light sensors, temperature sensors or other means for detecting movement, removal from a wall, etc.

Facial recognition access point module 500 may also contain a badge reader 524. This permits new installations without requiring separate badge readers, and also permits removal of old badge reading hardware when retrofitted in legacy buildings.

Figure 6:
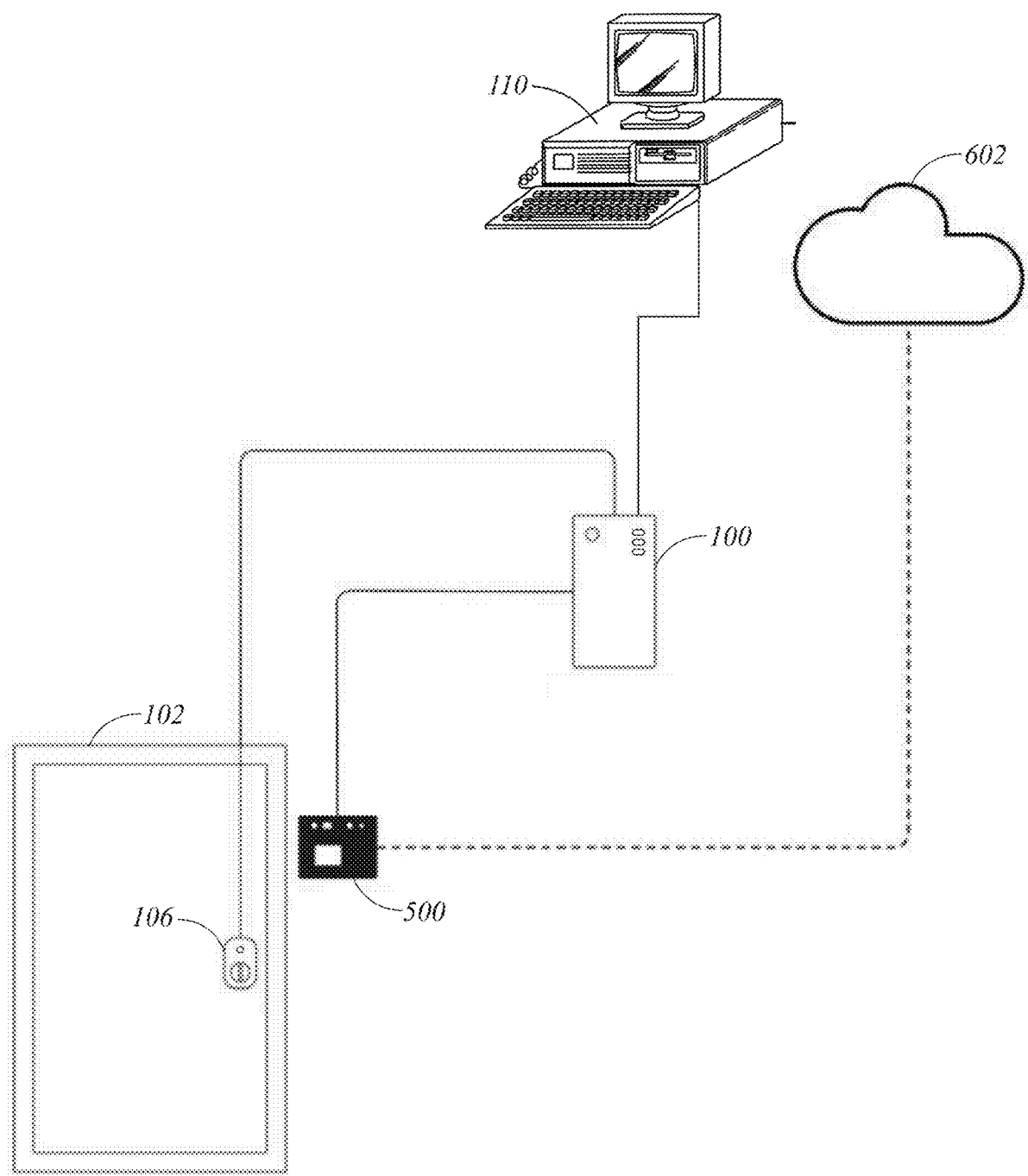
FIG. 6 illustrates a system of controlling access to a building or other restricted area using an aspect of the present invention.

FIG. 6 illustrates the major elements of a representative system used to control access to a building or other secure area using an embodiment of the subject invention, where the subject invention is integrated into an existing system providing badge-based access control.

It may include access control panel 100, and one or more access points such as doors 102 or turnstiles (not shown). Doors 102 include electronic locks 106; turnstiles may similarly include remotely controlled means for locking and unlocking them. Facial recognition module 500 will generally include a means for providing visual feedback to the person presenting the badge, such as green LED light 112 and red LED light 114 (not shown in this image). As in FIG. 1 green will generally indicate that the user has successfully badged in, and is allowed to enter; at all other times the red light will generally be illuminated to indicate that the system is operational, though other lighting signals are possible. Access control panel 100 may also connect with one or more servers located in cloud 602. Access control panel 100 may also connect to a computer 110.

In an exemplary embodiment, each facial recognition access point module 500 may be connected using five or more wires: generally two wires for supplying power, one or two wires to carry the LED signal from the access control panel, and two signal wires to communicate with the access control panel 100.

The proposed technology can be deployed by exchanging existing badging units with a new module containing the proposed technology. The hardware can utilize existing wiring to communicate with legacy door controllers and door access infrastructure.

This simplifies installation at locations that have existing investment in door access systems, as no new wiring is required. FIG. 7a Illustrates this module swap in context of existing infrastructure.

Legacy badge readers 102 can be retained, or can be removed and the badge readers in facial recognition modules 500 can be used for that purpose. Facial recognition access point module 500 is added to the system to enable facial recognition, and is connected to legacy door controller, which is access control panel 100, which may connect with electro-mechanical locking mechanism 108. Facial recognition access point module 500 may also be connected to a remote server accessible over the Internet located in the cloud 702, but may be physically connected to a local server for security reasons. Electronic lock 108 is also connected to authorization database 708, which may exist on access control panel 100. Authorization database 708 may also be connected to a remote server 702, which can be local or in the cloud, which may provide means for remote monitoring, updating, etc.

Figure 7B:
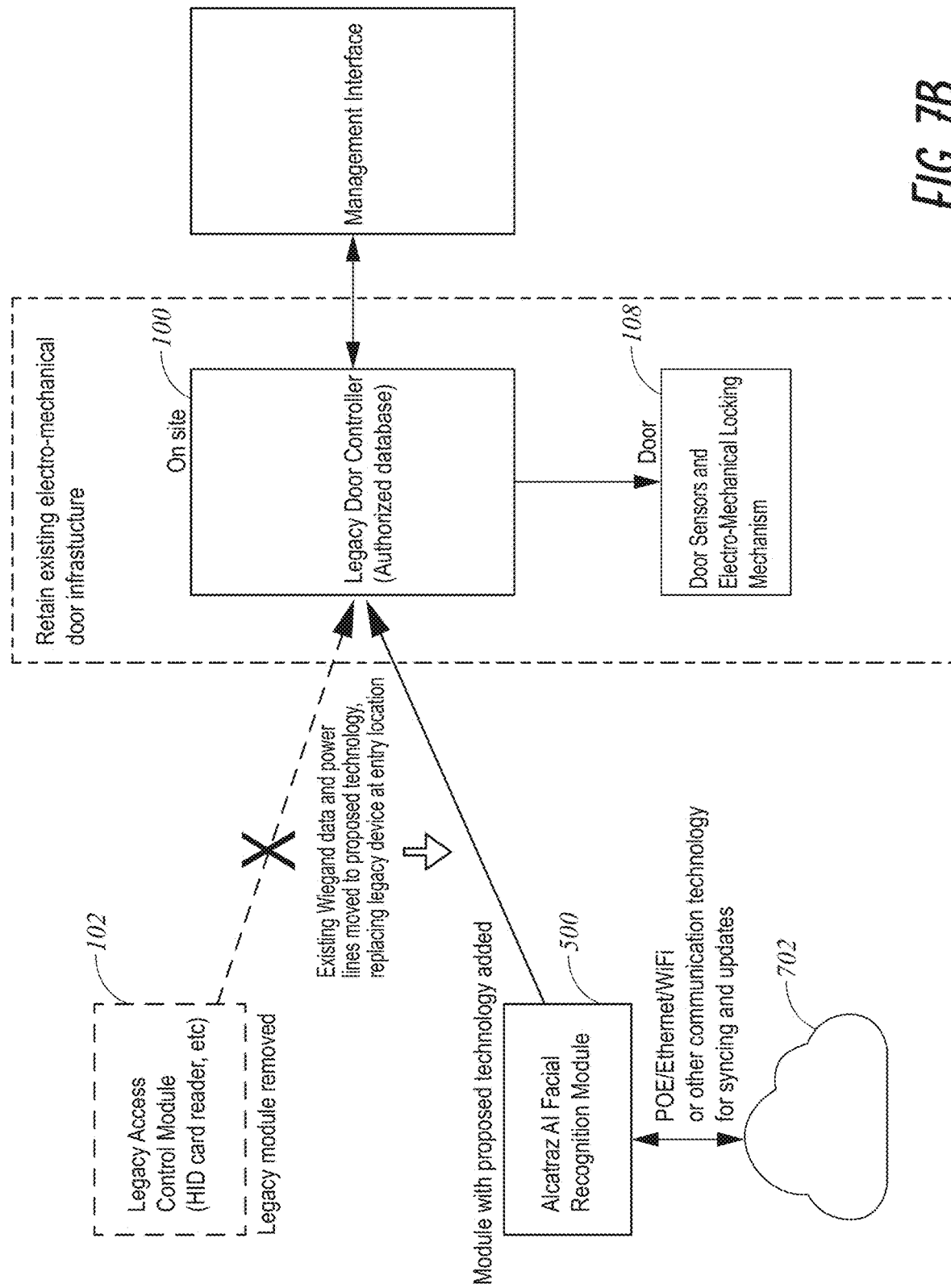
FIG. 7b is another high-level diagram of an access control system using an aspect of the present invention.

FIG. 7b shows an alternative embodiment. As in FIG. 7a, legacy badge readers 102 can be retained, or can be removed and the badge readers in facial recognition module 500 can be used for that purpose. Communication between facial recognition access point module 500 and access control panel 108 is bidirectional to enable LED signals (such as signifiers of admit/deny actions) to be transmitted to facial recognition module 500. Facial recognition access point module 500 may also be connected to a remote server accessible over the Internet located in the cloud 702, but may be physically connected to a local server for security reasons. Electronic lock 108 is also connected to authorization database 710, which may exist on access control panel 100. Authorization database 710 may also be connected to a remote server 702, which can be local or in the cloud, which may provide means for remote monitoring, updating, etc.

Figure 8:
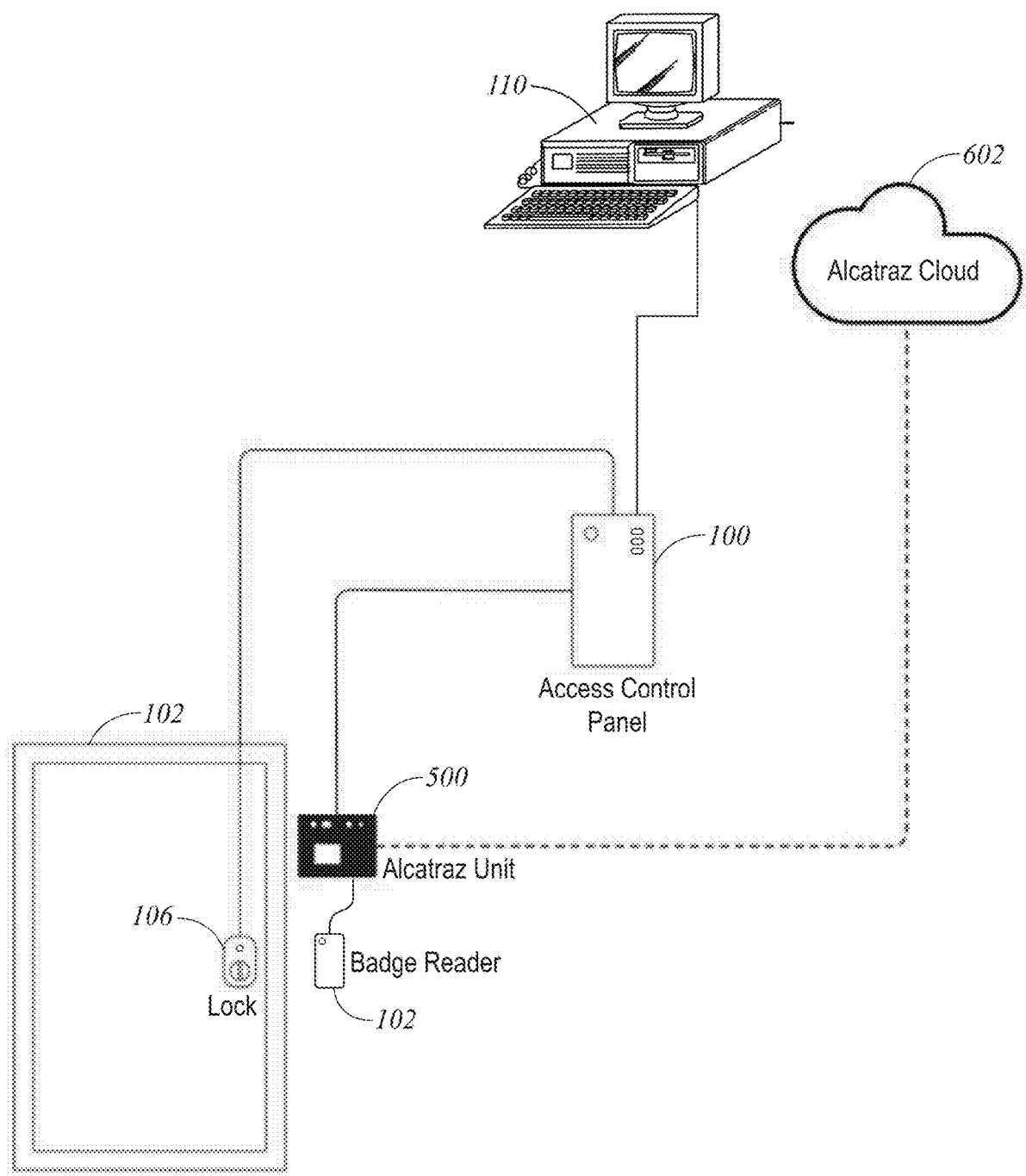
FIG. 8 illustrates a system of controlling access to a building or other restricted area using an aspect of the present invention.

FIG. 8 illustrates an embodiment in which an access point sensor module according to one aspect of the subject invention may be used to directly control door.

It may include an access control panel 100, and one or more badge readers 102, which are typically located at access points such as doors 104 or at turnstiles (not shown) Doors 104 include electronic locks 106. Badge readers 102 will generally include a means for providing visual feedback to the badge holder, such as green LED light 112 and red LED light 114. As in FIG. 1, green will generally indicate that the user has successfully badged in, and is allowed to enter; at all other times the red light will generally be illuminated to indicate that the system is operational.

Facial recognition access point modules 500 are added to the system at access-controlled doors 104 and/or turnstiles. In an exemplary embodiment, each facial recognition access point module 500 may be connected using five or six wires: two wires for supplying power, one or two wires to carry the LED signal from the access control panel, and two wires to control the access control mechanism (door, turnstile, etc.). Facial recognition module 500 may also include a badge reader, as well as means to read other forms of identification, including but not limited to technologies such as Bluetooth. Facial recognition access point module 500 may also be connected to a remote server accessible over the Internet located in the cloud 602, and/or may be physically connected to a local server 110 for security reasons.

Alcatraz AI is developing a module using color (often defined as "RGB" for red/green/blue images which are standard color images), depth and infrared images for facial recognition. This module uses badging to train the system with the user's face. Each time the person badges in, his face is recorded in the system. After a certain amount of time, usually after the first badging interaction, the system will have enough precision to work based only on facial recognition (no more badging requested). In alternate embodiment, the facial recognition access point module 500 may capture a series of images prior to eliminating the badging requirement, and may further require that each of the images are of sufficient quality (that is, with sufficient sharpness and with enough of the person's face being visible) to enable high accuracy. 3D data is able to detect all standard methods of spoofing (using a picture, a video on a screen, etc.) and prevent unwanted access.

In one embodiment, The authentication algorithm combines RGB, infrared and 3D depth data for better accuracy. The main algorithm is based on RGB and infrared processing while 3D data is used to confirm RGB authentication and add further accuracy. In one embodiment, over time, as the system learns more and more, the 3D personalized facial model is also used in recognition.

The proposed technology includes synchronized RGB, infrared and depth sensors. As traditional face detection algorithms work only on RGB data, a method needed to be invented to access face features from 3D mapping. Performing image detection on RGB and infrared frames and projecting them to depth data improves accuracy and enables the system to detect spoofing, as well as improving the accuracy of recognition and tracking. Knowing the position and intrinsic parameters of each sensor and their relative extrinsic parameters, the combination of rotation, translation and dilatation transforms can be defined, as they are required to match each RGB, infrared and depth pixel.

Figure 9:
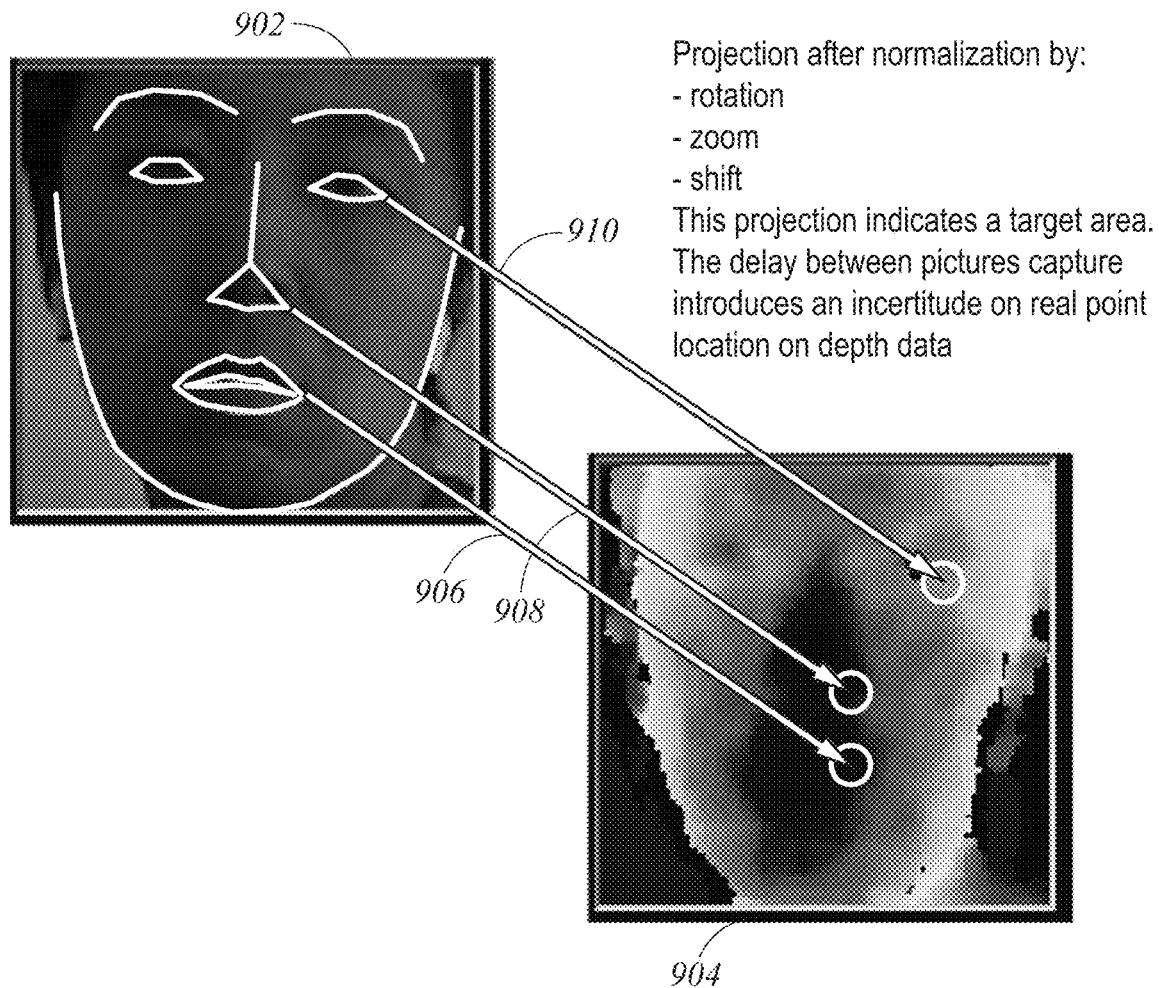
FIG. 9 illustrates how facial features recognized in an RGB image may be projected onto an IR image.

This location estimate includes small uncertainties as both pictures are not taken exactly at the same time. This estimate can also be quantified. FIG. 9 presents a visual explanation of this projection mechanism.

Image 902 is an RGB image of a potential entrant. Image 904 is an infrared image captured at roughly the same time. Arrows 906, 908 and 910 illustrate how specific landmarks on the RGB image may be projected on to the IR image.

Due to hardware limitations, two images theoretically shot at the same time may still have a small delay in between them. When mapping one image onto another it is useful to know if they were taken at different times and, if so by how much. Thus one aspect of the invention is to use time stamps to help align IR and RGB images. If for example, an IR and an RGB image were taken only a few milliseconds apart, they likely can be combined with high confidence, whereas if an RGB was captured 3 seconds before a specific IR image, both the location and the facial expression of the subject are likely to have changed too much to permit accurate mapping of one onto the other.

Figure 10:
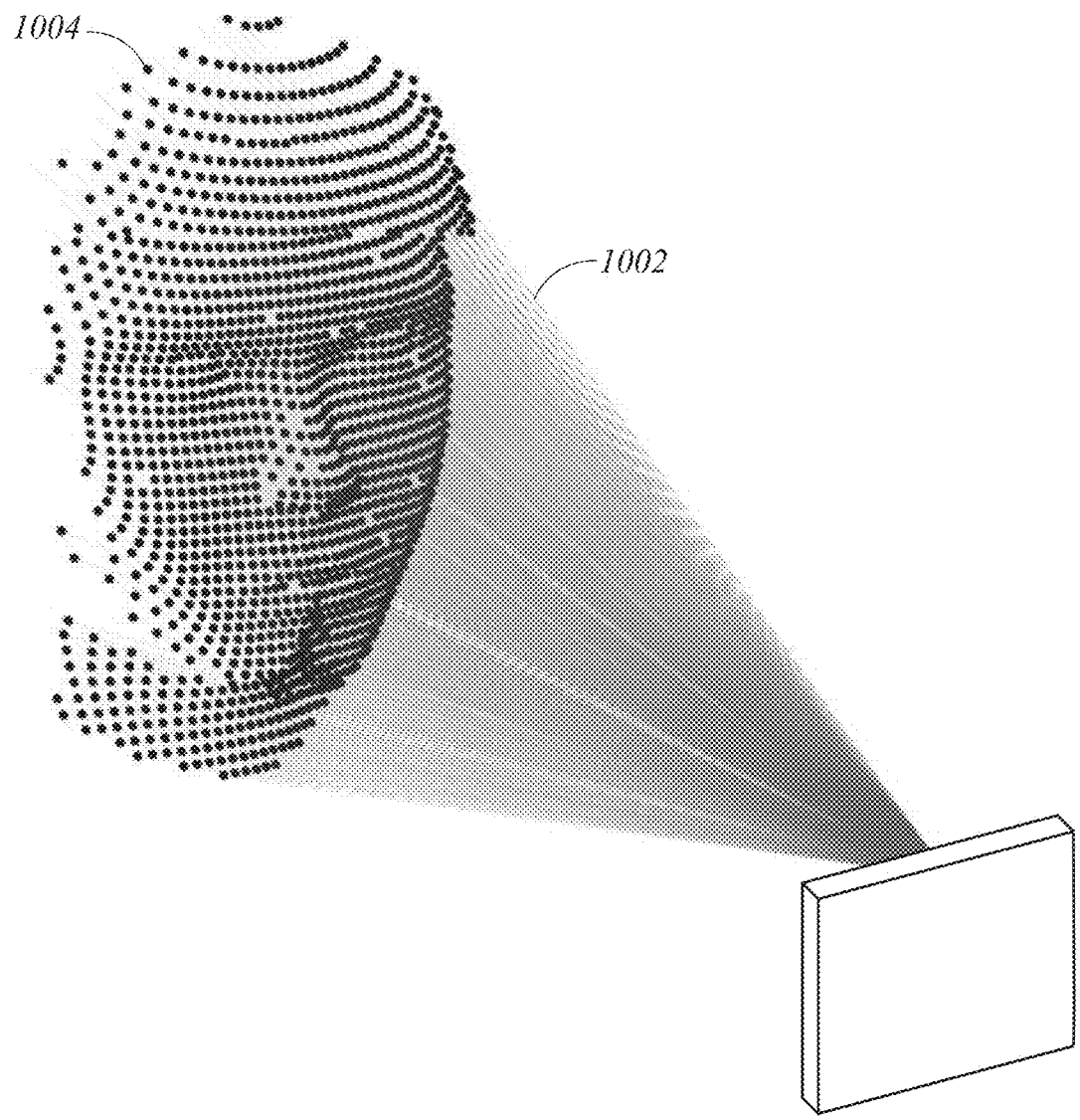
FIG. 10 illustrates how structured light may be used to create a depth map of a face.

FIG. 10 illustrates how an embodiment of the access point sensor module may be used to capture infrared structured light imaging of a person seeking entry. Infrared laser projector 504 projects an array of lines or points 1002 over an area that roughly corresponds to the field of view of infrared sensors 506a and 506b, and that includes the face being analyzed. This produces an array of dots 1004. Because the two infrared sensors are separated from each other and from the structured light source by a distance, which can be as small as a few millimeters, or as wide as a foot or more, the structured light projected by infrared laser projector 504 appears different to each of infrared sensors 506a and 506b, much as our two eyes perceive the visible light as it falls on objects differently. Just as the brain interprets those differences in order to judge distance, whether interpreting the contours of a face or hitting a baseball, processor 510 interprets the pattern of dots or lines 1002 in order to build a point cloud that comprises a 3D model of the detected face.

Figure 11:
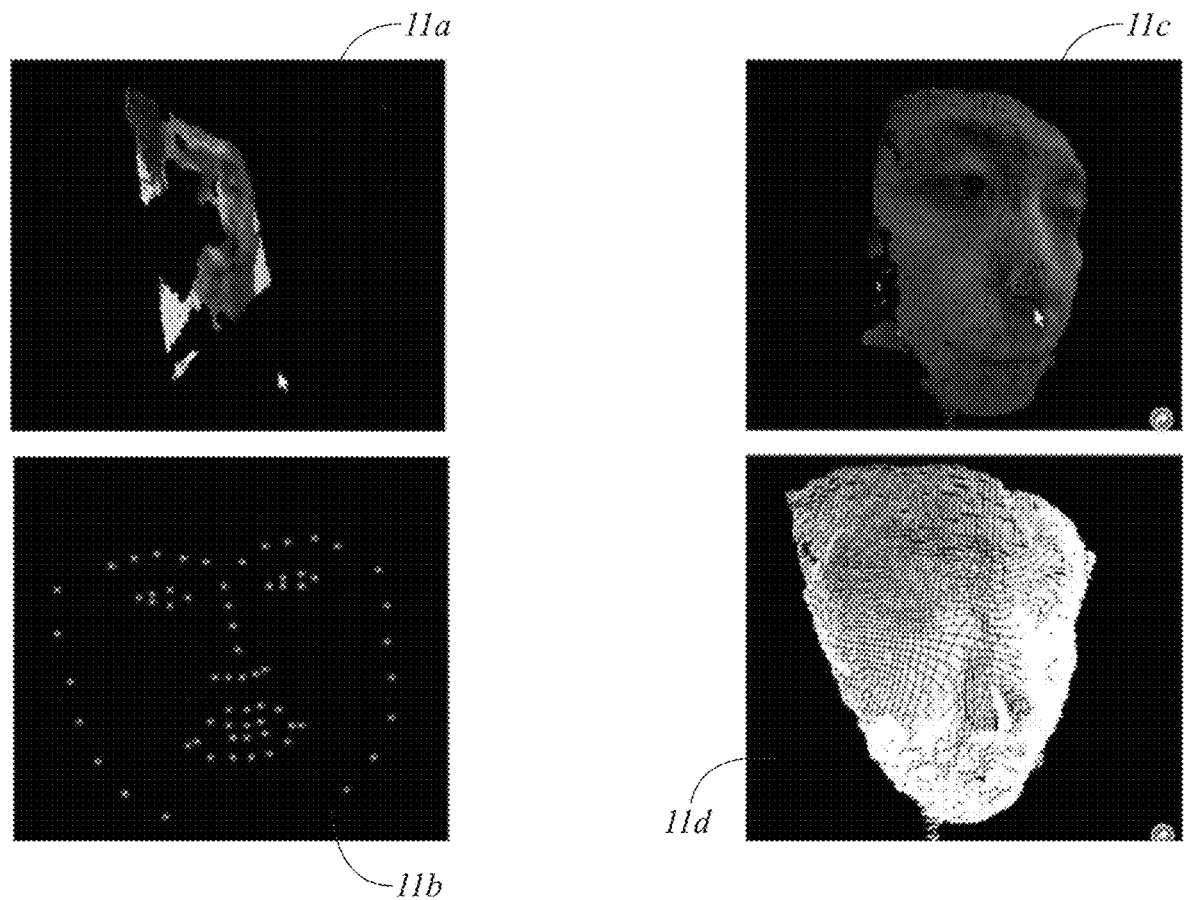
FIGS. 11a, 11b, 11c, and 11D illustrate mapping of facial landmarks using RGB and depth images.

As you can see in FIG. 11, depth data gives much more details on the face than a standard 2D color picture. FIG. 11a is a representation of the kind of image data captured by an RGB camera. FIG. 11b shows the limited number of facial landmarks that can be extracted from such an image. FIG. 11c shows the kind of image data that can be captured by a pair of IR sensors when "reading" an object illuminated by structured light or a time-of-flight system, and FIG. 11d shows the number of facial landmarks that can be extracted from such a structured light image or a time-of-flight system. Similar results may be obtained processing paired stereoscopic images.

The kind of data that can be generated from monocular visual (RGB) imaging of a human face may be limited relative to the information that can generated from infrared structured light, stereoscopic IR imaging, or time-of-flight imaging. Because a conventional RGB image is essentially two-dimensional, presenting digital values for each pixel in terms of the amount of red, green and blue light captured for each, the location and shape of each structural feature of a face (mouth, nose, eyes, etc.) must be inferred from often subtle gradients in color, shading, etc. This processing generally yields a relatively crude approximation of the "architecture" of a face. Thus for an image 11a taken with an RGB camera, applying typical algorithms for facial recognition, it is possible to place only about 60 key reference points with reasonable accuracy, as shown in 11b.

By applying structured light or time of flight imaging, and the grid projected on an object such as a human face by infrared laser projector 504, the resulting image is a point cloud such as that shown in FIG. 11c. Processing that image yields a 3-dimensional model of a face that may contain 5000 points or more, as shown in 11d. Such a model permits more precision in recognizing faces than is possible with only RGB image information.

Figure 12:
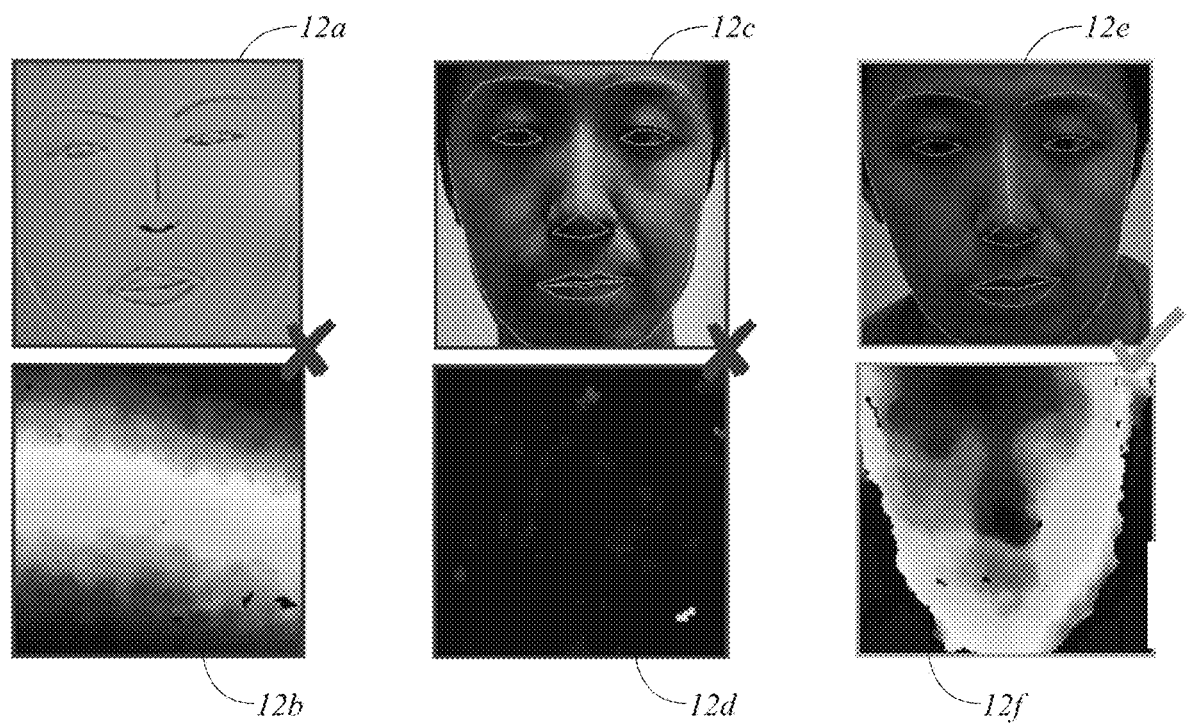
FIGS. 12a, 12b, 12c, 12d, 12e, and 12f illustrate how depth images may be used to detect spoofing.

Anti-spoofing is required to prevent purposeful and malicious security intrusions. A normal color or infrared 2D picture can be tricked easily with a photo or a video. The proposed technology includes 3D pictures for this specific application. A 3D map of the face gives very useful information to detect such attacks. 3D facial characteristics are extracted and deduced if this matches generalized model of the face or the specific personal face model. This method effectively prevents all traditional spoofing methods such as 2D attacks using flat images and basic 3D masks. An illustration of this 3D data variation is presented in the FIG. 12.

FIG. 12a shows what may be thought of as a drawing of a face on a piece of paper. An RGB image of such a drawing may extract features as if presented with an actual face. But the IR sensors reading structured light or time-of-flight imaging striking the piece of paper will generate a depth map like that shown in FIG. 12b, which is very different from the depth map of an actual face.

FIG. 12c shows what may be thought of as an image of a face on displayed on a device such as a tablet computer. An RGB image of such an image may again extract features as if presented with an actual face. But the IR sensors reading structured light striking the display will generate a depth map like that shown in FIG. 12d, which is very different from the depth map of an actual face. Similarly, time-of-flight imaging will generate a very different result than would result from an actual face.

FIG. 12e shows what may be thought of as an image of an actual face. An RGB image of such an image may again extract the expected features. IR sensors reading structured light striking the display will generate a depth map like that shown in FIG. 12f, which is easily distinguished from the objects presented to spoof the system. Similarly, time-of-flight imaging will generate a very different result than would result from an actual face.

In one embodiment, The proposed authentication method is based on combining recognition and anti-spoofing. The system will detect and track faces in front of the module. For each face detected, facial features and descriptors will be extracted and processed to find a potential match in authorized users' database. Other factors like stride, clothes, height and skin recognition are also used to increase accuracy.

In one embodiment, The anti-spoofing algorithm runs in parallel of this recognition process. RGB facial features will be used to find corresponding points in the depth map. After that, different prediction methods and parameters are combined for best results. Even if those methods are always evolving, the main ones are described below.

Figure 13:
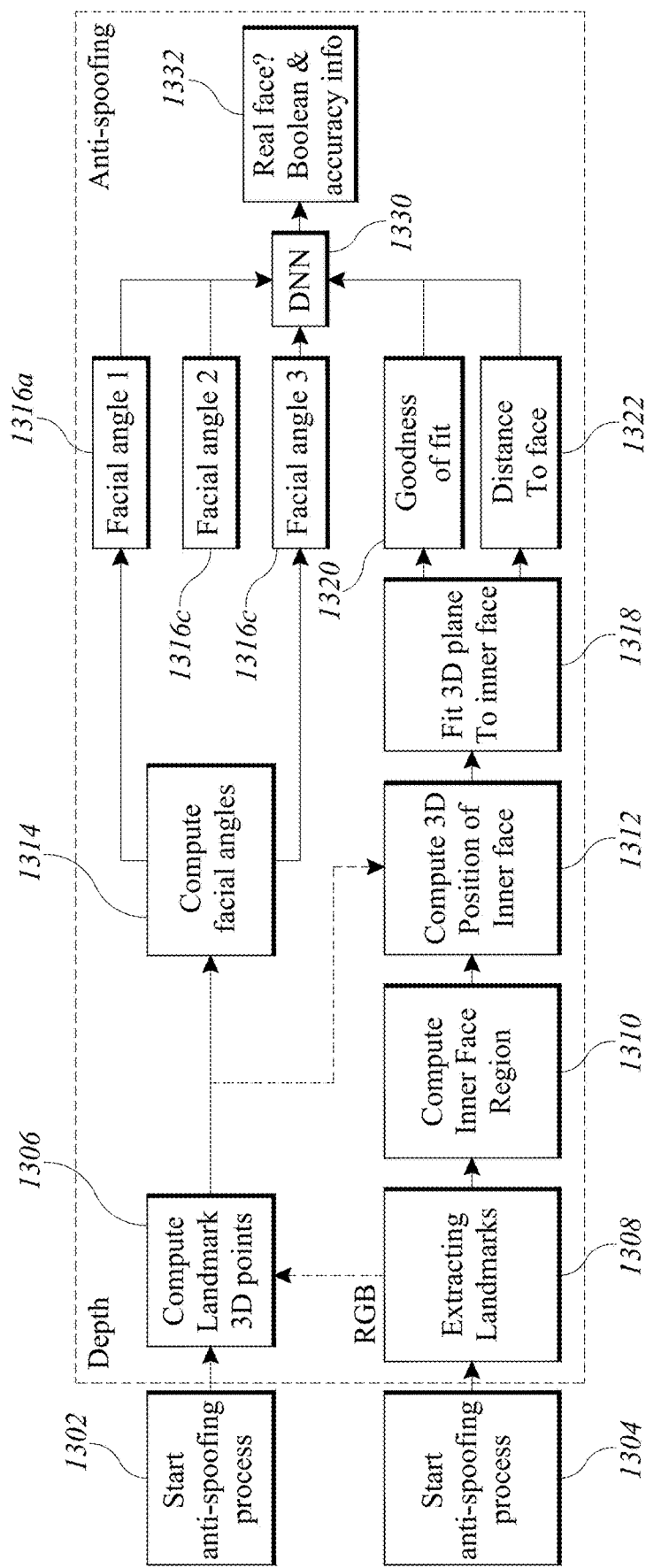
FIG. 13 is a flowchart illustrating how a neural net can be used to detect spoofing.

The following are some of the spoofing methods used by a proposed algorithm to determine if the detected face is a real one or not. All methods for spoof checking are processed in parallel and the results are returned with their confidence levels. Depending on each one of the values, a method was developed, based on neural networks, to output a final score with a decision. FIG. 13 presents how all those inputs are fed into the neural network (DNN) to generate the final prediction in an exemplary version of an aspect of the subject invention.

In step 1302, the (primarily) infrared-based anti-spoofing process begins, and in step 1304, the (primarily) RGB-based portion of the process begins. In step 1306, depth-based facial landmarks are extracted from the RGB image captured by camera 502. In step 1308, the RGB-derived facial landmarks are extracted from the RGB image captured by RGB camera 502. In step 1310, the RGB process determines which region of the image contains the critical region of the face (eyes, nose mouth, etc.). In step 1312, the output of the computational process in step 1308 and the output of the process in step 1310 are combined to calculate the relative distance of the detected facial features from each other.

In step 1314, the facial landmarks computed in step 1306 are used to compute a series of 3D angles 1316a, 1316b through 1316n between those facial landmarks.

In step 1318 the output of step 1312 is used to generate a normalized series of net distances from the base plane for the detected face.

With these data points, the system is now equipped to perform the anti-spoofing function. In step 1320, the quality of fit between the computed facial features and one or more stored model face maps is evaluated. In step 1322, a value for the distance between the face and the facial detection module 500 is calculated. This is performed in order to weight the quality of the image and related processing, since more distant images will have a lower resolution, and thus harder to use to make definitive decisions.

In an alternative embodiment, one or more of the previously described steps may be omitted and the equivalent function can be performed by the neural network described below.

In step 1330, the outputs of steps 1316*a* through *n*, 1320, and 1322 are fed into a neural network for evaluation. A properly trained neural network can produce an answer as to whether a real face (vs. a spoofed image) has been detected, together with numerical value or values indicating the degree of certainty associated with that answer. In step 1332, that probability is compared to a threshold that may be externally set. Thus the system may be configured so that if the evaluated images generate a, say, 90 percent probability that the system is viewing a live person, it is concluded that a real person is approaching, while lower probability is considered too large a danger of spoofing, and the system is not instructed to unlock.

In another embodiment, a DNN as disclosed in FIG. 13 may be employed to perform additional processes described in Fig as being accomplished by other means. Thus it is also possible to as part of the subject invention to feed RGB and IR images directly into the DNN, and permit the DNN to learn the factors necessary to differentiate between a 2-dimensional representation of a face and an actual face.

Figure 14:
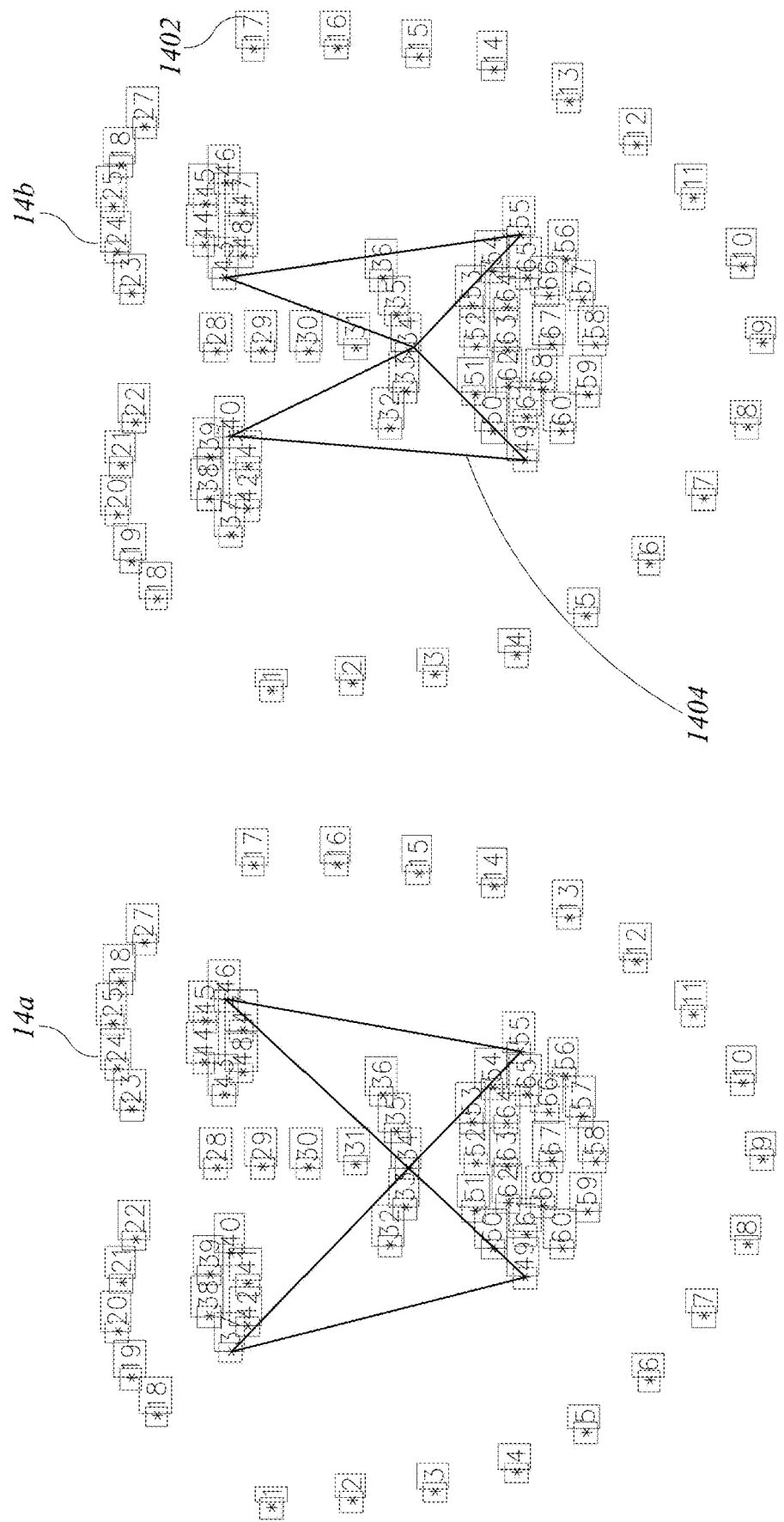
FIGS. 14a and 14b illustrate how facial angles can be used to identify faces.

As discussed, an aspect of the facial recognition process may be the computation of certain facial angles. Two examples of such a process are shown in FIGS. 14*a* and 14*b*. Each of 14*a* and 14*b* represent the kind of facial image data that can be extracted from RGB images of two different faces. Each small numbered point 1402 represents a landmark that can be extracted from a full-face image. These include points indicating the overall shape of the face, and the edges of features such as the nose, mouth and eyes. Those landmarks permit facial recognition module 500 to compute a series of angles 1404 between those points.

A similar process may be used as part of an anti-spoofing process, as discussed in more detail below.

Previous explanations described main authentication and anti-spoofing methods. In an exemplary embodiment, There are additional checks that need to be done for extra anti-spoof security.

Those methods includes but are not limited to:
Person's height and build
Skin color and microtextures analysis
Liveness information and particularly micro-movements of the face A challenge facing facial recognition technology is how to operate when the system captures an image that is partially occluded (such as by clothing, an object or person between the facial recognition module and the face being evaluated, or facial hair), or when the person is facing other than directly toward the module, so that the relationship between the landmark features of the face varies depending facial orientation. Even if one or more of these suboptimal conditions is present, it would be advantageous to be able to perform facial recognition on the facial features that are visible to the camera(s) and/or sensors, and to allow "in-the-flow" processing under such conditions. Thus in another embodiment, the invention comprises techniques for recognizing a face when captured images of that face are partially blocked or occluded.

One method of performing facial recognition is to detect and describe facial landmarks, and then to calculate the relationships between those facial landmarks. Those landmarks may include the inside and outside corners of the eyes, the pinna of the ears, the nostrils, etc. A facial recognition system may collect over 100 such points. The highest level of certainty is achieved when all of the points that can be plotted for a face have been captured. However, in a given use case, it may be that the loss of certainty when only a specified percentage of those points, for instance, 40%, are captured, is low relative to the associated reduction in user friction. In addition, as described in more detail below, an aspect of the subject invention is the capture, processing and categorization of images of a given user from a variety of angles, and under a variety of conditions.

In another embodiment of the invention, a neural network processes the RGB image of the face, and extracts all the distinguishing facial features it needs by itself.

Figure 15:
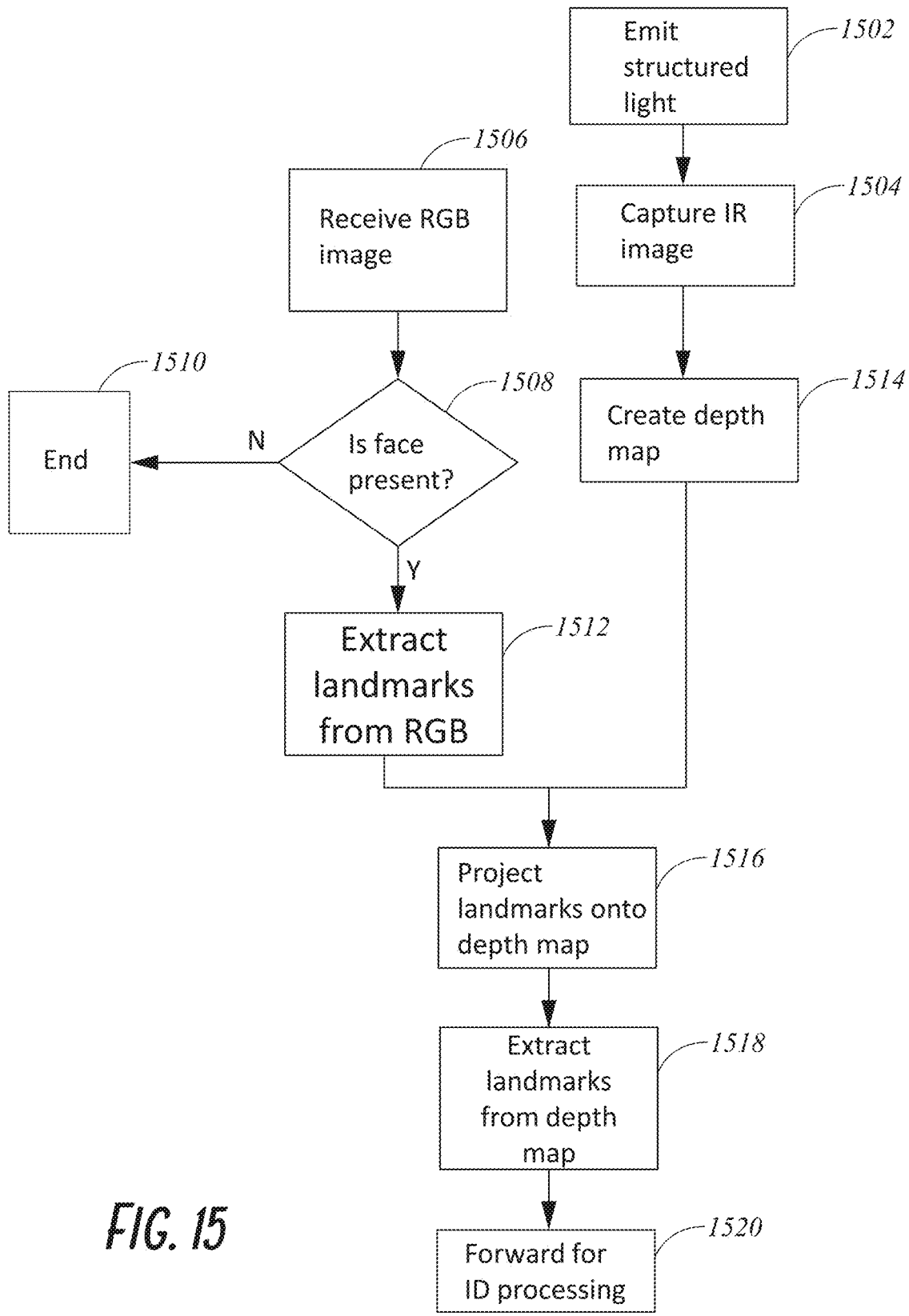
FIG. 15 is a flowchart illustrating how visible light and depth-sensing systems such as structured light may be incorporated in a facial recognition system.

An exemplary method that can be used to incorporate both 3-D imaging and RGB imaging in a facial recognition system is illustrated in FIG. 15.

In step 1502, IR laser projector 504 may emit structured light, or unstructured general IR illumination. In step 1504, the effect of that light is captured by IR sensors 506*a* and 506*b*. At the same time, in step 1506 an RGB image is captured. In step 1508 that image is analyzed to determine whether a face may be present in that image. If no potential face is detected, then in step 1510, the process ends. If a face is detected, then in step 1512, facial landmarks are extracted from the RGB image captured in step 1506. In step 1514, the captured IR image is used to create a depth map. In step 1516, the landmarks extracted from the RGB image are projected onto the depth map created in step 1514. In step 1518, landmarks are in turn extracted from the depth map, using the landmarks projected from the RGB image to enhance accuracy. In step 1520 the landmarks so extracted are passed on for further processing and comparison with stored information about previously recognized faces.

Additional techniques may also be applied to detect attempts to spoof the system. Such techniques may include, analysis of whole-body data including height estimation and/or gait analysis. These approaches may permit the system to perform these additional verification steps "in the flow," without requiring potential entrants to stand in place before a camera and/or sensor at close range. Other techniques that may require such steps include analysis of facial movements such as smiling and blinking. Another technique is to apply a combination of visible and infrared sensors to detect the unique characteristics of skin, such as subcutaneous veins. Such techniques and others can be applied individually, or in combination. Neural network analysis can be used to combine multiple sources of data with greater accuracy.

Another method according to the subject invention combines RGB and IR information to create a more detailed and accurate facial model.

Figure 16:
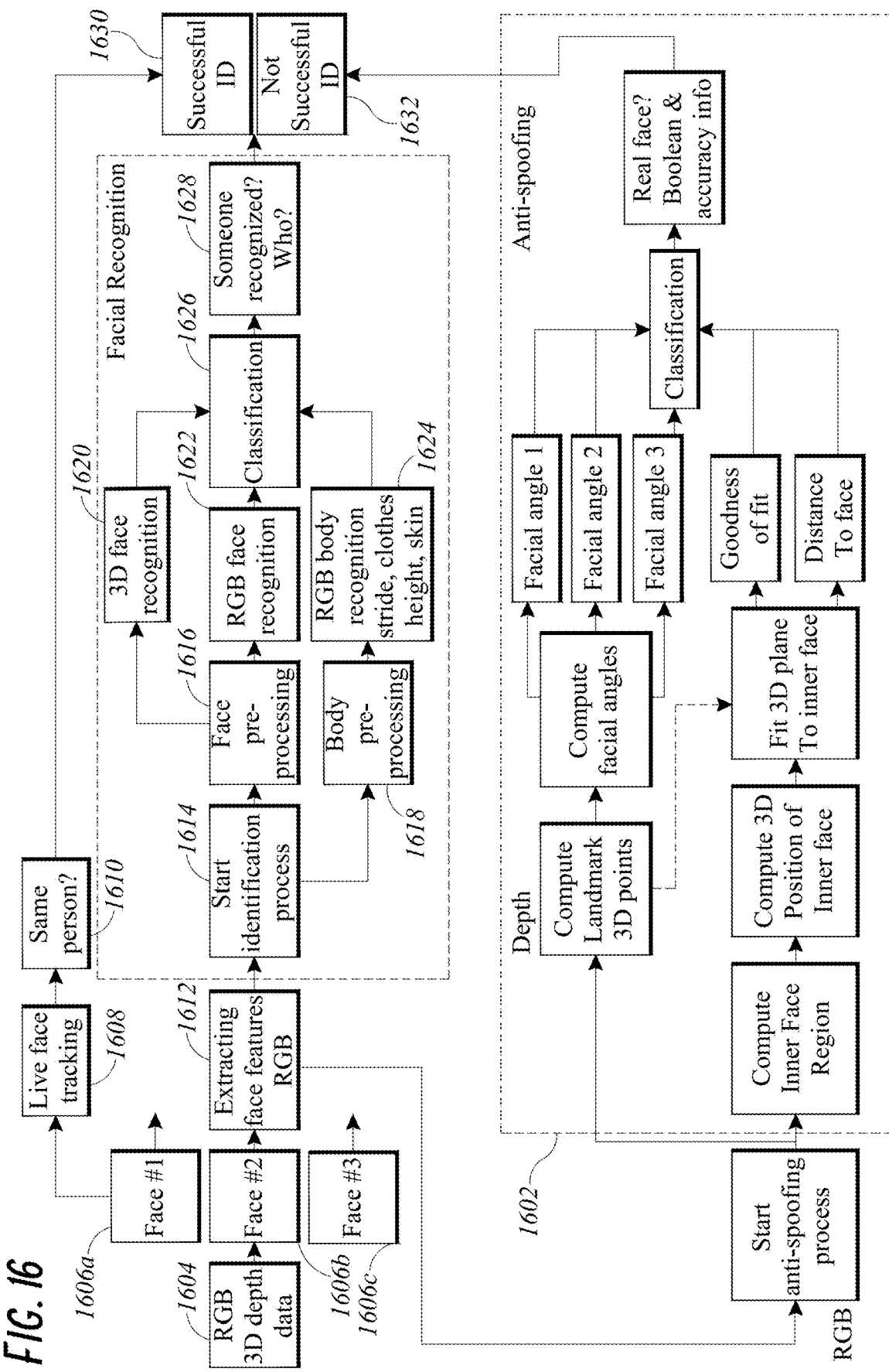
FIG. 16 is another flowchart illustrating how visible light and depth-sensing systems such as structured light may be incorporated in a facial recognition system.

Classification methods are used to process authentication and spoofing detection methods and determine if the person is authenticated successfully. This information is forwarded to a lock, login or any system requesting this type of information. FIG. 6 16 presents a block diagram of the technical workflow from RGB and depth data to output information "Successful ID or not" in an exemplary method.

The portion of FIG. 16 enclosed in dotted line 1602 is essentially the same as is described in FIG. 13, and thus will not be described again here. In step 1604, preliminary processing on the RGB image is performed.

One aspect of preprocessing that may be performed is automated image adjustment of the captured RGB image. A common technique for performing this step is commonly referred to as Histogram of Gradient, or HoG processing. This is a method for expanding or compressing the contrast range of an image to fit the captured image to occupy the full potential dynamic range of the image. This form of image processing may be optimized for the entire captured image, or it may be based on the characteristics of a specific region of interest.

Other preliminary steps may include cropping the image around the detected face; matching the infrared and RGB images; determining if the captured images are clear enough to permit further processing (that is, considerations such as enduring that the image is not too blurred, and neither too overexposed or underexposed); and other potential checks on image suitability. Other pre-processing steps may also be employed to make subsequent processing more efficient. Similar steps may also be taken to pre-process whole-body images.

If multiple potential faces are detected and separated for processing in steps 1606a, 1606b through 1606n. To separate them, the proposed method rank all detected faces from the most likely to go in to the less likely using three parameters: distance to the door, orientation of the face and position in the image. The following steps, illustrated only for one such identified face for simplicity, will be performed for each of them.

One aspect of the process is assuring that each face is properly tracked as people move within the field of view of the camera and/or sensors, at least until they have been identified. Thus in step 1608 each face is tracked, as described in more detail in Fig xxxx below. In step 1610 the system determines whether the tracking protocol is functioning correctly and the tracked face roughly matches the face previously matched to that moving image.

Separately, for a detected face, in step 1612, the features of the captured face are extracted. This process can combine data from both RGB camera and IR sensors. The extracted features may be applied to the FIG. 13 process as well. In step 1614, the process of identifying the specific person is initiated. In step 1616, pre-processing of the facial image is initiated. This pre-processing may comprise automated exposure adjustment of the captured RGB image, as previously discussed. This form of image processing may be optimized for the entire captured image, or it may be based on the characteristics of a specific region of interest.

Other preliminary steps may include cropping the image around the detected face; matching the infrared and RGB images; determining if the captured images are clear enough to permit further processing; and determining if the orientation of the subject's face will permit further processing. Other pre-processing steps may also be employed to make subsequent processing more efficient.

In step 1618, pre-processing of the captured images of the entire body of the selected person is initiated. This may consist of similar steps to those discussed above. Performing recognition of the body can be useful for a number of reasons. For example, if the system has learned through previous analysis that the face approaching the access point is attached to person who is roughly five feet tall, and the face being tracked appears to be attached to a person who is more than 6 feet tall, that can be an indicator of a spoofing attempt, or a reason to reject a specific identification. It is also possible to detect and analyze a person's gait, another distinctive biological trait that can be used to identify a user or detect spoofing.

In step 1620, the IR-based portion of the principal facial recognition process is performed. In step 1622, the RGB-based portion of the principal facial recognition process is performed. In step 1624, the principal portion of the body recognition process is performed. This process may include analysis of the person's body shape, clothing, height, stride, and other factors. In step 1626, the results of IR image facial processing, RGB image facial processing and body image processing are combined and weighted in so that a single profile of the person seeking admission is ready for evaluation. In general, face recognition will be weighted most heavily, followed by height, followed by other characteristics. In step 1628, the output of step 1626 is evaluated against the database of recognized users to determine if the person is recognized. If the person is recognized with a sufficient confidence level, then in step 1630, the access point is unlocked to permit entrance. If the person is not recognized as a permitted entrant, then in step 1632, the process ends without unlocking the entry point. Alternatively, if the person remains with view of the camera and sensors, additional images may be captured and analyzed. As an additional alternative, if a person is not recognized with a sufficiently high confidence level, the person can be prompted to present a badge to validate the identification.

In an alternative embodiment of the process illustrated in FIG. 16, steps such as computation of facial angles may be performed by a neural network without prior encoding of the characteristics of real faces vs. 2-dimensional representations.

Figure 17:
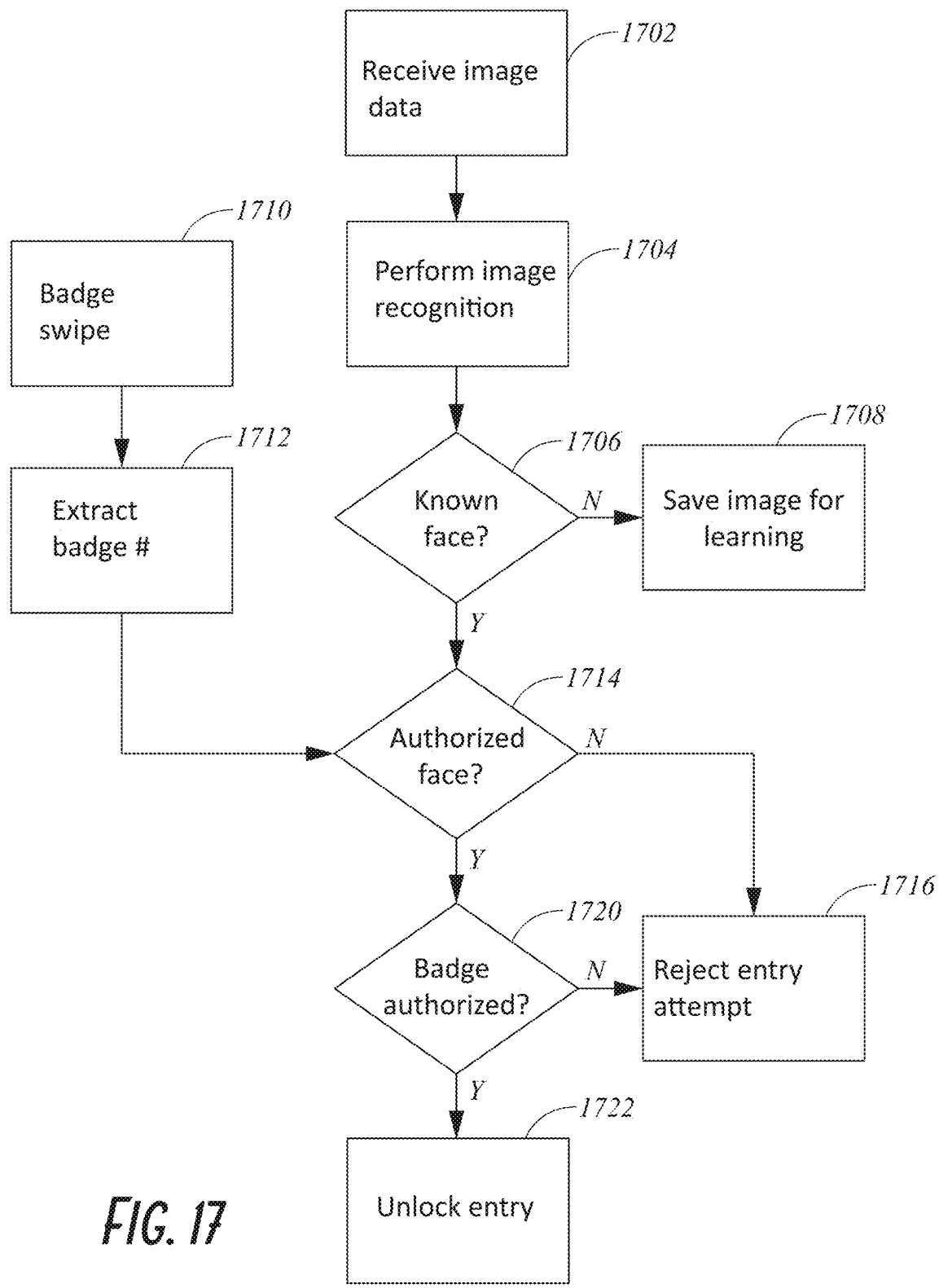
FIG. 17 is a flowchart illustrating an exemplary method for combining badge readers and facial recognition in an access control system.

As described above, the subject invention may comprise the use of face recognition as the primary or only authentication tool in an access control system. However, it can also comprise a multi-modal system that combines face recognition with other technologies, including badge readers. FIG. 17 illustrates the high-level architecture of an exemplary system that includes both badge readers connected directly to facial recognition modules 500 and face recognition hardware and software. In step 1702 the facial image data to be evaluated is received. In step 1704 the image is processed for facial recognition. If the face is not recognized in step 1706, then in step 1708 the facial image is saved for a potential new identification, and no signal is sent to the door lock or turnstile, regardless of whether a valid badge is presented to the badge reader. In step 1714 it is determined if the identified face belongs to an authorized entrant. If not, then in step 1716 the entry attempt is rejected, and the access point does not unlock.

Separately, in step 1710 a potential entrant presents a badge to the badge reader 102 (or a badge reader incorporated into facial recognition module 500). (The badge swipe can occur before, during or after image capture and processing.) In step 1712, the badge number is extracted from the badge reader. In step 1720, the badge number as extracted from the presented badge is compared to the badge number associated with the identified face. If the two badge numbers do not match, then the process ends without unlocking the access point. Optionally, the system may record the unsuccessful attempt, send an alert, flag the record of the badge number for review, or some other means of acting on the failed attempt. If the badge numbers do match, then in step 1722, the system sends an unlock signal to the access point.

It should be noted that some or all of the steps described as taking place within the facial recognition module can instead be undertaken by a central processor or control access panel communicating with a plurality of facial recognition modules.

Figure 18:
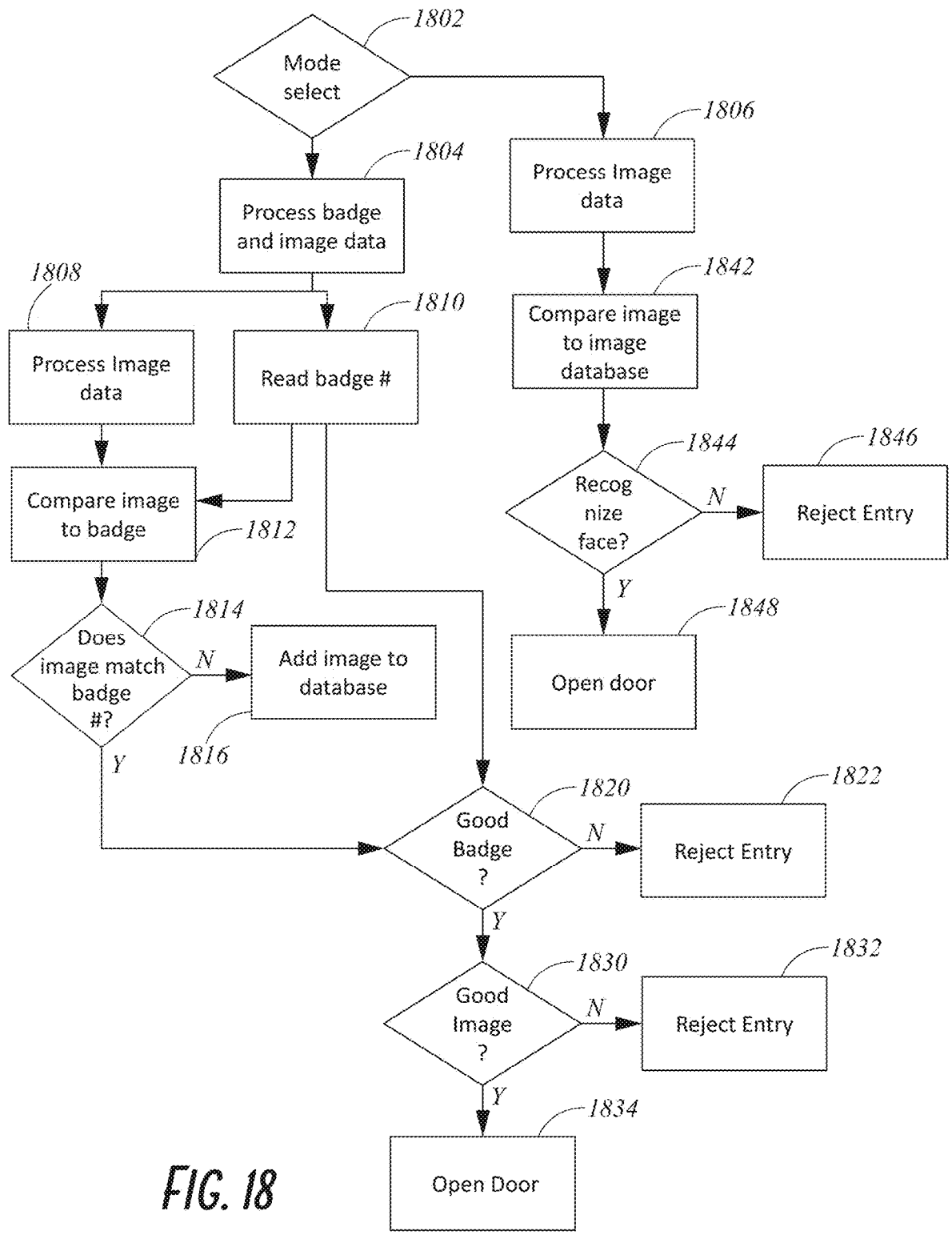
FIG. 18 is a flowchart illustrating another exemplary method for combining badge readers and facial recognition in an access control system.

The operation of another exemplary system is described in FIG. 18.

In step 1802 it is determined which of several possible modes of operation is to be used. If both facial recognition and badge numbers are to be used, the process starting with step 1804 is followed; if facial recognition-only is applied, the process starting with step 1806 is followed. (It is also possible to operate in badge-only mode, in which case the steps shown in FIG. 18 will not apply.)

In step 1808 the facial image data to be evaluated is evaluated and the person is identified. In step 1810 the presented badge is read to extract the badge number. In step 1812 the badge number and identity of the person in the facial image are compared. In step 1814, the system determines how to act based on that comparison. If the captured image and the badge number do not agree, then in step 1816, the image is added to the image database. If the badge number and image agree, then the process advances to step 1820.

The process of choosing when to add images to the database may depend upon the level of training the system has reached with a given user. For example, if the database includes fewer than a set number of stored images of a user, the system may store each captured image above a certain quality threshold until the set number of stored images is reached. After that number of images has been stored, the system may first compare new images to stored images, and either add the new images if they are of higher quality than the previously stored images, or present usefully different images, such as from different angles, or different lighting conditions, or the like.

In step 1820 the badge number as read in step 1810 is evaluated. If the badge number is not authorized for entry, then in step 1822 entry is denied. In step 1830, it is determined whether or not the image is of sufficient quality to support identification. If quality is insufficient, then in step 1832, entry is denied. If quality is sufficient, then in step 1834, the door or other access control apparatus is unlocked.

If the system is operating in facial recognition-only mode as determined in step 1802, then in step 1806, the captured facial image is process for recognition. In step 1842 the processed image is compared to the database of images. In step 1844 it is determined whether the image matches an authorized entrant. If not, then in step 1846, the entry attempt is rejected. If it does match, then in step 1848 the system either sends the appropriate signal to access control panel 100, or directly triggers the door to unlock, depending on the implementation.

For any security system there are tradeoffs between speed and convenience on the one hand, and accuracy and security on the other. When a facial recognition system is new, or when a new user is presented, the system has not yet accumulated a library of captured images to which the new image may be compared. Accuracy generally requires multiple captured images. Thus an image-based systems will either be slow and inconvenient (requiring a user to present him or herself for multiple image captures before gaining entrance), or insecure (by setting a low threshold for admission until an adequate library has been developed), or both.

Another great improvement proposed is a badge learning method. Standard biometric systems request the user to perform an additional out of norm registration process to be included in the system and user setup. With the proposed technique, users can keep their existing badges. No more specialized enrollment needed. The first time a user approaches a physical access point, their badge is scanned and pictures of the person are bound to their badge ID and stored in the system to train the recognition algorithms. Even if the person is recognized, the system waits until enough data is present to reach a very high accuracy before switching to full facial authentication. When this accuracy is reached, the person can go in and out using only their face. This badge learning concept is illustrated by FIG. 19a through 19c.

In FIG. 19a, a potential entrant approaches a controlled access point for the first time (or the first time after the installation of the facial recognition system). Because the person is not recognized, a badge swipe is required in order to gain entrance. In FIG. 19b, the potential entrant seeks entrance again, having previously done so a small number of times. The facial recognition system has not yet built up a sufficient library of images to permit badgeless entry, and again requires a badge read. In FIG. 19c, the facial recognition system has built up a sufficient number of images that it is able to recognize a specific user (here called "Joe") and permits him to enter without having to badge in.

Figure 20:
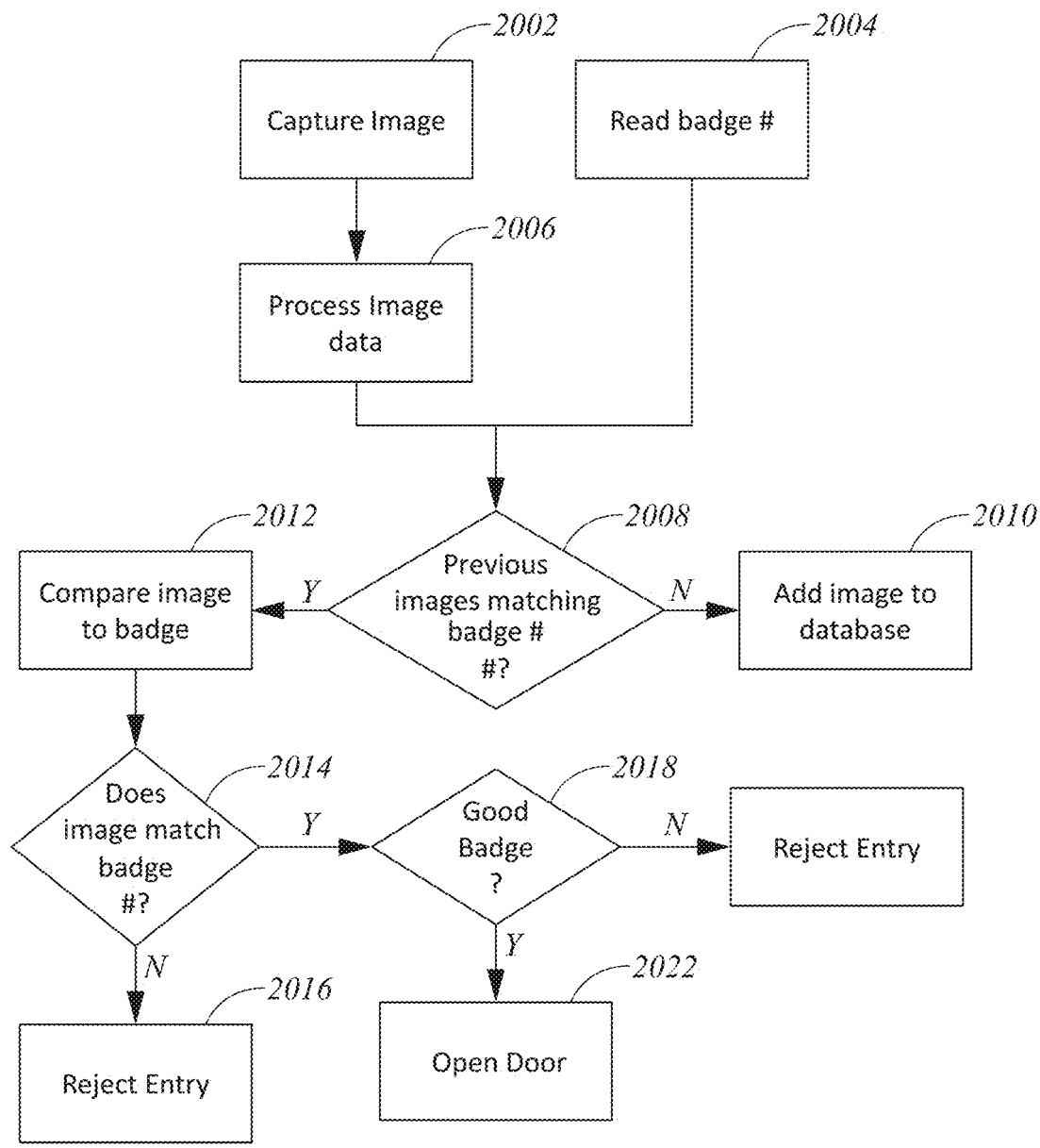
FIG. 20 is a flowchart illustrating an exemplary method by which an access control system can learn with the assistance of badge information.

A system that combines badge readers and facial recognition modules permits the facial recognition system to learn by pairing the unique identifier of a user's badge with that user's facial images. FIG. 20 is a flowchart describing the steps involved in an exemplary process to employ a system that includes badge readers to train the facial recognition system.

In step 2002, a facial image is captured. (It should be noted that it is also possible for facial recognition module 500 to capture and process a series of images in a single physical approach by a potential entrant; for simplicity, a single image is discussed.) In step 2004, the potential entrant submits a badge to the badge reader and the badge number is extracted. In step 2006, the image is processed for facial recognition. In step 2008, it is determined whether the system has stored other images associated with the badge number. If not, then in step 2010, the image is stored. If other images associated with the badge number have been stored, then in step 2012, the new image is compared to the stored images, and in step 2014, it is determined whether the match is close enough to conclude that the same person is presenting the badge as in previous attempts. It is likely to be desirable to employ a form of dynamic scoring, such that for a new installation, a lower confidence level is required than in a mature system, and so that a lower confidence level is required the second time a specific badge number is presented compared to the fiftieth time. Another approach to dynamic scoring is to condition the system's response based in part on the level of confidence in a given instance of facial recognition. For a high level of certainty of a match with an authorized entrant, a badge swipe may not be required; for a high level of certainty that a person is not an authorized entrant, even a badge swipe may not result in admittance. For a low-confidence identification, the person may be allowed in if the badge swipe corresponds to the tentative identification. If a match is not indicated, then in step 2016, the entry attempt is rejected. If a match is indicated, then in step 2018, it is determined whether the badge number presented indicates permission to enter at that entry point. If the badge number does not have permission at that entry point, then in step 2020 the entry attempt is rejected, and the door does not unlock. If the badge number does have the requisite permission, then in step 2022 the door is unlocked.

Once a system that includes both badge readers and facial recognition modules has accumulated a sufficient number of images of a given user, the system may be used so that facial recognition alone is sufficient to gain entrance to a building, and employees may not be required to use the badge reader to gain entrance (except when the facial recognition process results only in a low-confidence identification). This method will reduce friction at access points. Ideally, it will permit a user to enter as if the security system was not there—there will be no need to stop or slow down or stare into the camera and/or sensor unnaturally.

Figures 21A, 21B:
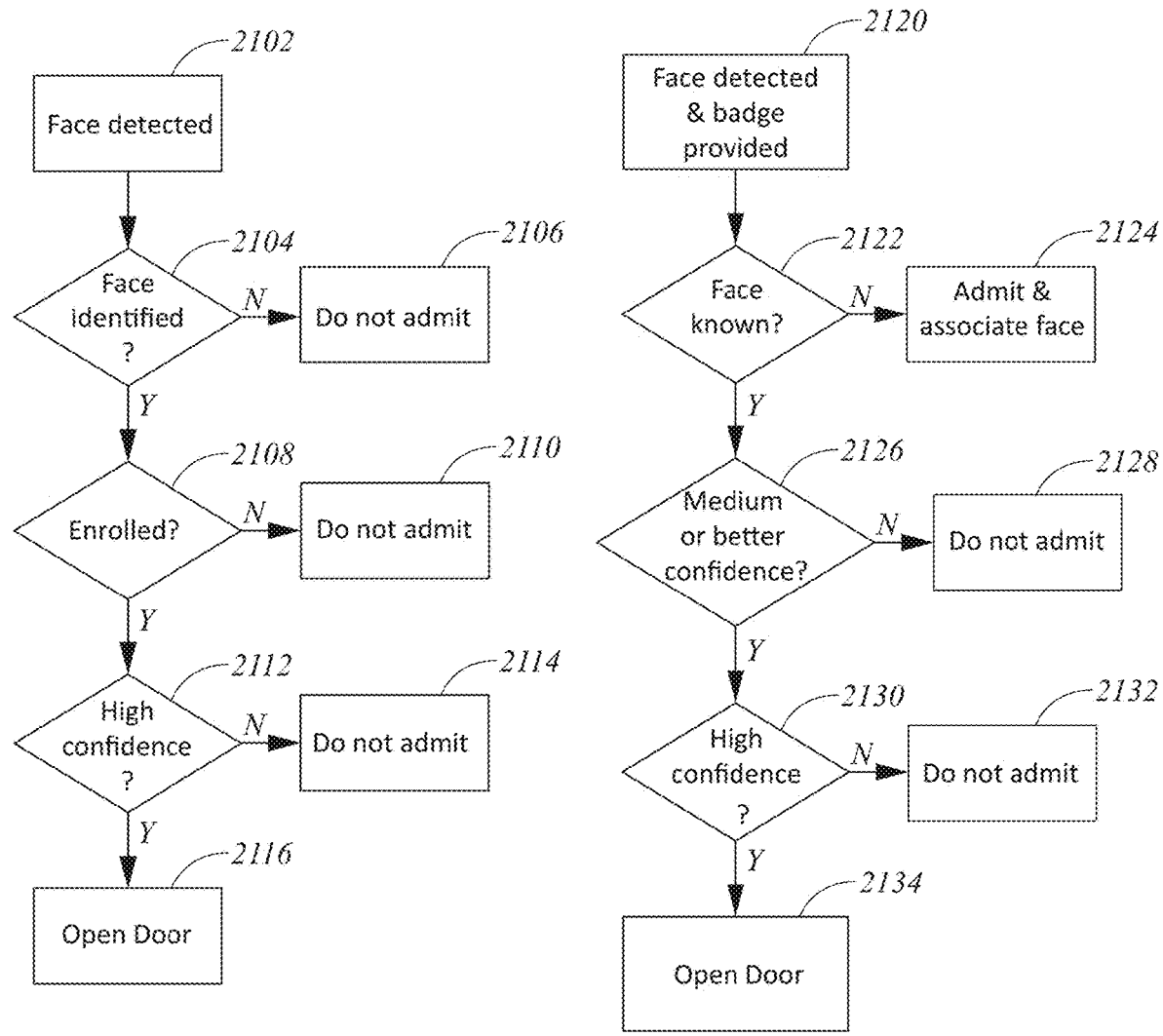
FIG. 21a is a flowchart illustrating an exemplary method by which an access control system can learn using only image recognition.
FIG. 21b is a flowchart illustrating an exemplary method by which an access control system can learn using both badge information and image recognition.

Additional approaches to learning are described in FIGS. 21a and 21b. FIG. 21a illustrates an exemplary process for learning using only facial recognition (that is, without matching up the user with a badge number). This learning process is applied to every new user to be included in the database. Several users can be totally enrolled while others are just starting the process. Any new person will have to complete this process to unlock full functionalities. In step 2102 a face is detected. In step 2104, it is determined whether that face can be identified. If not, then in step 2106 the access point is not unlocked. (If a user subsequently provides an authorized, badge, the person can enter.) If the face is identified then in step 2108 it is determined whether or not the identified person is authorized to enter at the access point. If the person is not authorized (either because the person is not recognized, or because the system can tentatively recognize the person, but has not accumulated enough images of the person to provide sufficient confidence in the identification), then in step 2110 the access point again is not unlocked based on facial recognition. If the recognized face is associated with an enrolled account, then in step 2112, it is determined whether the confidence level in the facial identification is above a set threshold. If it is not above the threshold, then in step 2114 the access point again is not unlocked based on facial recognition. If the identification is above the threshold for a high-confidence identification, then in step 2116 the access point is unlocked.

FIG. 21b illustrates an exemplary learning process that includes both facial identification and (roughly) simultaneous badge read. In step 2120, both the badge read and facial image are input. In step 2122 it is determined if the captured image matches an authorized face in the database with very high confidence. If so, then in step 2124 the person is admitted, and the face is associated with the submitted badge number. If not, then in step 2126, the level of confidence in the facial identification is evaluated. If the confidence level is low, then in step 2128 the entry attempt is rejected. If the confidence level is at least above a set level, then in step 2130 the identification is again evaluated. If the identification does not meet a required level of confidence, then in step 2132 the attempt is again rejected. If it does meet the minimum requirement, then in step 2134 the door is unlocked.

It should also be noted that the subject invention contemplates not only a system that captures and stores images as images, but a system in which the images are processed to extract key aspects of the images, and only that information, which may be thought of as metadata, is stored. Such metadata may be based on aspects of the images such as depth information about the face, the size and shape of and distances between key landmarks (eyes, nose, mouth, etc.) or other descriptive and/or distinctive aspects of the image. An advantage of converting images to such metadata and storing the data that way is that the images are effectively encrypted in that form, and thus the images and associated data stored in the system are likely to be useless to a hacker even if the data is somehow extracted from a facial recognition module. Additionally, more and more countries are creating minimum regulatory thresholds for security and protection of personal identifiable information (PII). By storing abstract metadata, the system avoids storing PII.

Different methods of controlling access to a secure building or area can create vulnerabilities that malicious persons could use to gain access. An additional concern with an access control system that uses computers and stored data is that the computers, and the data stored on them become targets for hacking as well. If a computer system includes personally identifiable information, or PII, that increases their attractiveness as targets, and the damage that could be caused by an intrusion. These issues are particularly concerning when security systems operate using a public "cloud" for the storage and transmission of sensitive data.

It is therefore desirable to implement an access control system that enhances the separation between PII about building entrants and the systems used to admit them. Thus another aspect of the subject invention is that it may be implemented so that the access control system does not know the identity of recognized users beyond their badge numbers (which are generally encrypted), plus highly abstracted metadata about their faces. Thus there is little or no value to a malicious actor to the data stored on the systems used to perform facial recognition. Thus a system according the teachings of the subject invention may operate without any PII other than the badge number of a user.

The process of curating images relative to single user is intended to maximize the probability that the system will be able to quickly recognize that user. Thus while the initial emphasis is on accumulating multiple images of at least a minimum acceptable quality, once a minimum number of images has been collected, the goal becomes maximizing the quality of those images. A variety of weighting heuristics may be employed to optimize the image library. Thus weight may be given to the quality of the images; to how recent those images are; to ensuring that images from a variety of lighting conditions (such as early morning, midday and evening); or to other factors such as facial expression, degree of blur, etc. As the system acquires new images that are determined to be of higher quality than similar previously stored images, the old images may be purged in order to reduce memory and storage requirements. The system may also store multiple sets of images for different "looks" for a user, such as winter clothing vs. summer clothing; bearded vs. shaved faces, etc. Images may also be categorized by the orientation of the face relative to the camera and/or sensors.

This embodiment may also be used to implement a longer-term two-factor authentication system. In other words, users may be required to both run their badges through the badge reader and be recognized by the facial recognition system.

One such approach is to apply the facial recognition as described herein, and apply the user's badge as a secondary check that is informed by the results of the facial recognition process. Thus if facial recognition results in a high level of confidence that an entrant is a specific approved person, the system can either admit that person without requiring a badge, or use a badge swipe as secondary confirmation depending on the level of security desired by a specific facility. If facial recognition results in an identification that falls below a specified level of confidence, the system can require a badge swipe in order to open the door or unlock a gate or turnstile, etc. Finally, if the prospective entrant is not recognized, is recognized as a (specific) non-authorized person, or if the recognition falls below the specified threshold, and the user either cannot produce a badge, or provides a badge that does not correspond with the identity of the person as determined by facial recognition, the person can be denied entry.

As previously discussed, an objective of the subject invention is to enable authorized persons to enter an access-controlled area with little or no friction. In order to accomplish this, the invention also comprises methods for recognizing authorized entrants without requiring them to alter the normal process of entering a space as if access was not controlled. This requires that the facial recognition module, and the image processing software that is used on the images captured by the module, need to be capable of recognizing faces while people are in motion.

A user starts approaching a door with the intent to enter. By the time he reaches the door the authentication and anti-spoofing are already done and the door is unlocked. The main goal is removing the user interaction with the security system. In most cases, the user should not notice the security checkpoint.

Quick in-motion detection is key to user experience. While a user is approaching the door, the proposed system starts processing his face at around 3 m distance.

As the person gets closer, the accuracy of the data and the authentication improves. The system is able to process many views (from different distances) of the person before he arrives at the door. As the person gets close to the door, the authentication algorithm would have checked all parameters and determined if the person is authorized to go in. If yes, the door is unlocked before the person reaches the door. If not, further info is displayed on the module's screen.

The user is simply approaching the access point (from top left to bottom right). The proposed authentication method starts capturing and processing facial data when user is close enough and within the field of view (FOV).

Figure 22:
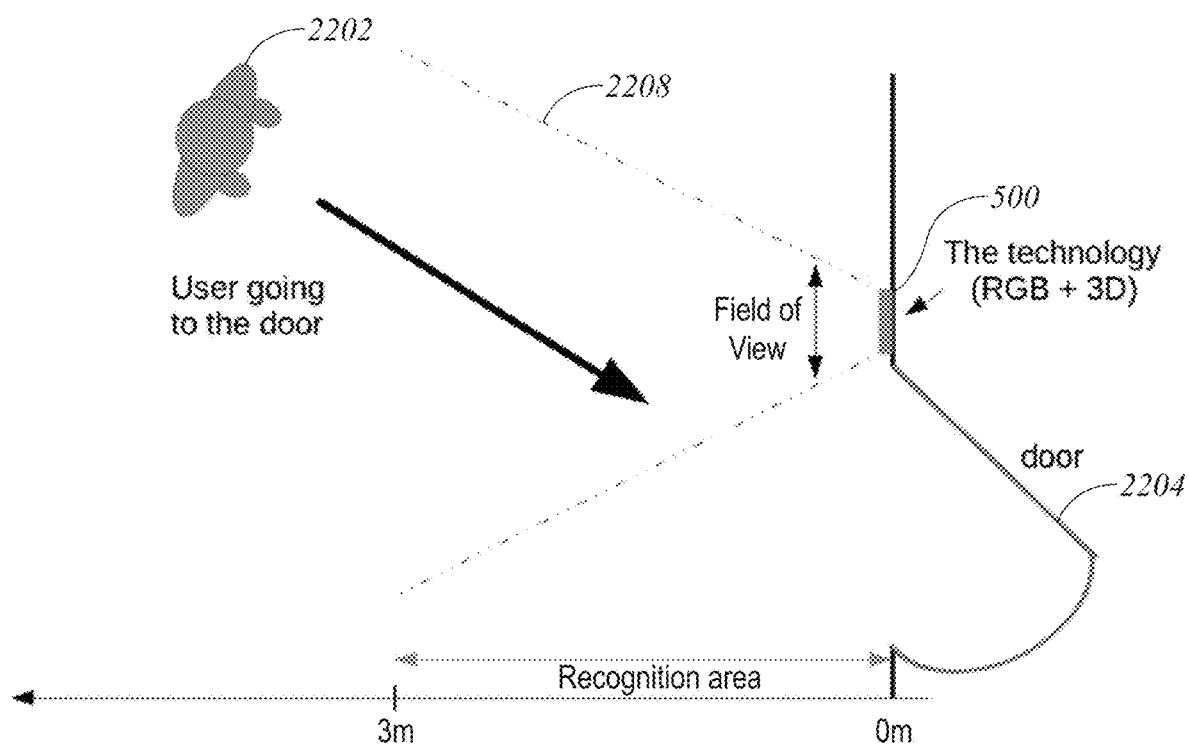
FIG. 22 is an illustration of how a facial recognition module can capture images of a person approaching a door controlled by the subject invention.

FIG. 22 provides a visual of this concept.

A potential entrant 2202 walks toward an access-controlled door 2204. Facial recognition module 500 is mounted on the wall near door 2204. The cameras and sensors mounted on facial recognition module 500 each have a specific field of view 2208, sometimes expressed as an included angle. They will also have a specific range beyond which a face, even if detected, will not be captured with sufficient resolution to enable accurate recognition. And although it is not necessary for a person to be looking directly at the camera or sensor for facial recognition to be performed using the subject invention, the divergence of the orientation of the face from the camera and sensors does have limits—the person cannot be facing 180 degrees from the camera and sensor. In some implementations, a divergence of greater than about 45 degrees may render facial recognition unreliable. Together, these factors mean that there will be a relatively short interval during which a face must be found and recognized in order to permit "in the flow" permissioning.

Figure 23:
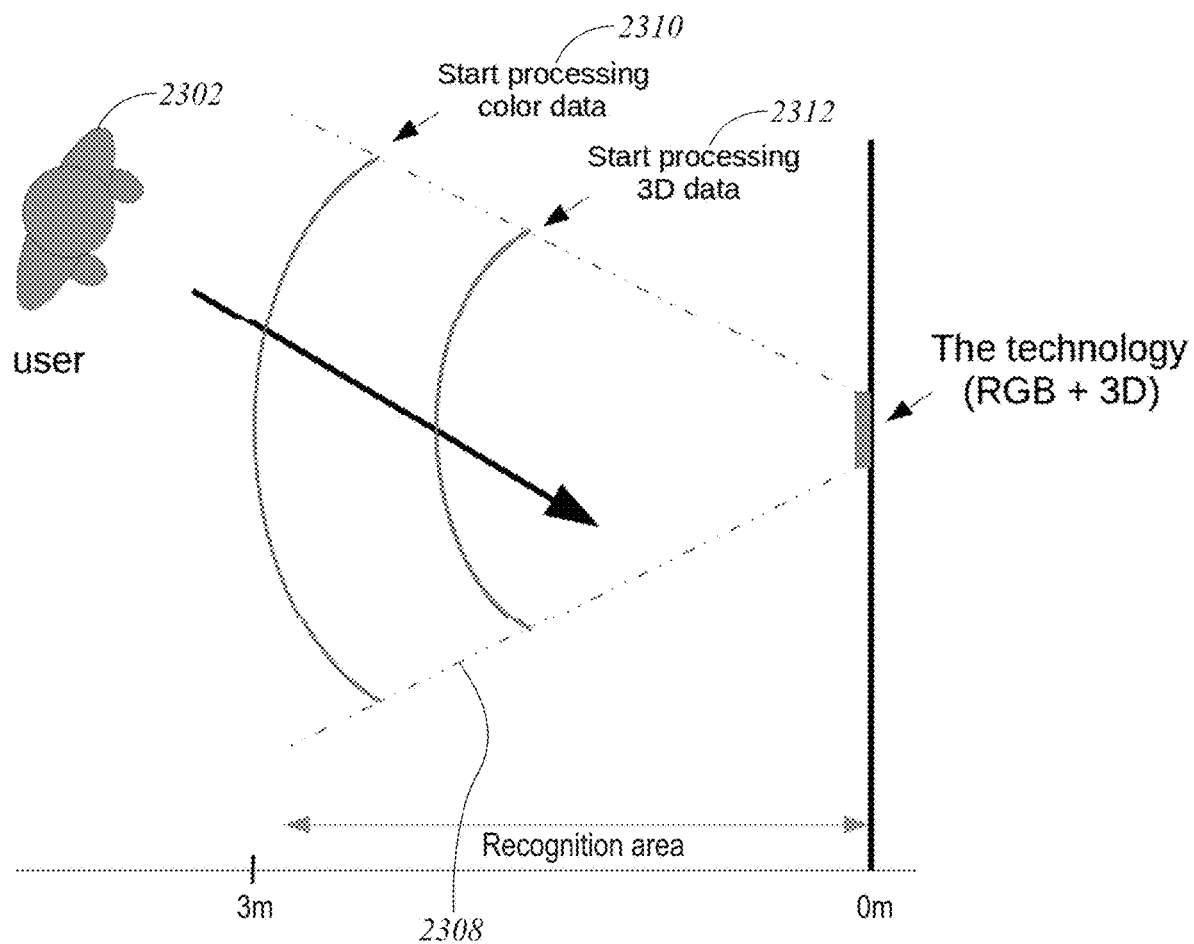
FIG. 23 is another illustration of how a facial recognition module can capture images of a person approaching a door controlled by the subject invention.

The final user experience target is "In the flow". The user does not have to be aware there is an identity control during normal operation. When a user is approaching the door, if he is recognized and authenticated, the door is unlocked and no additional user interaction is required. If not, the user interface will request the user to badge in. FIG. 23 provides a simplified representation of the setting.

A potential entrant 2302 walks toward facial recognition module 500, which is mounted on the wall near an access-controlled door (not shown). The cameras and sensors mounted on facial recognition module 500 each have a specific field of view 2308. The capabilities of facial recognition module 500 are partially dependent on the distance between potential entrant 2302 and facial recognition module 500. When potential entrant 2302 enters the region defined by field of view 2308 and the range at which RGB camera 502 is capable of capturing potential entrant 2302 with sufficient resolution 2310, facial recognition can begin. When potential entrant 2302 approaches further, and reaches the region defined by field of view 2308 and the range at which infrared sensors xxx are capable of capturing potential entrant 2302 with sufficient resolution 2312, anti-spoofing processing can begin.

Unless done extremely efficiently, "in the flow" facial recognition requires considerable computational power, and requires processing a large number of large image files. An aspect of the invention is a method for optimization of the process of finding, tracking and identifying faces in order to reduce computational load and thereby both speed up identification and make it possible to perform the required process using relatively inexpensive microprocessors.

The first method is checking the distance of the user to the sensor. If the sensor is far away from the person, the data accuracy will be reduced. Second method is checking if the face depth map fits a plane or if there are any 3D variations in it. Third method measures multiple physical angles between both sides of the face and uses this angle value to determine potential spoofs. A real face will be around 60 degrees when a piece of paper will be close to 180 degrees. Finally, another approach is to analyze the 3D mapping of the face and compare it to our facial print dataset to determine if it matches a generalized face model. FIG. 24a through 24d presents visuals of those four main parameters and methods, which can be run sequentially or in parallel.

Figure 24:
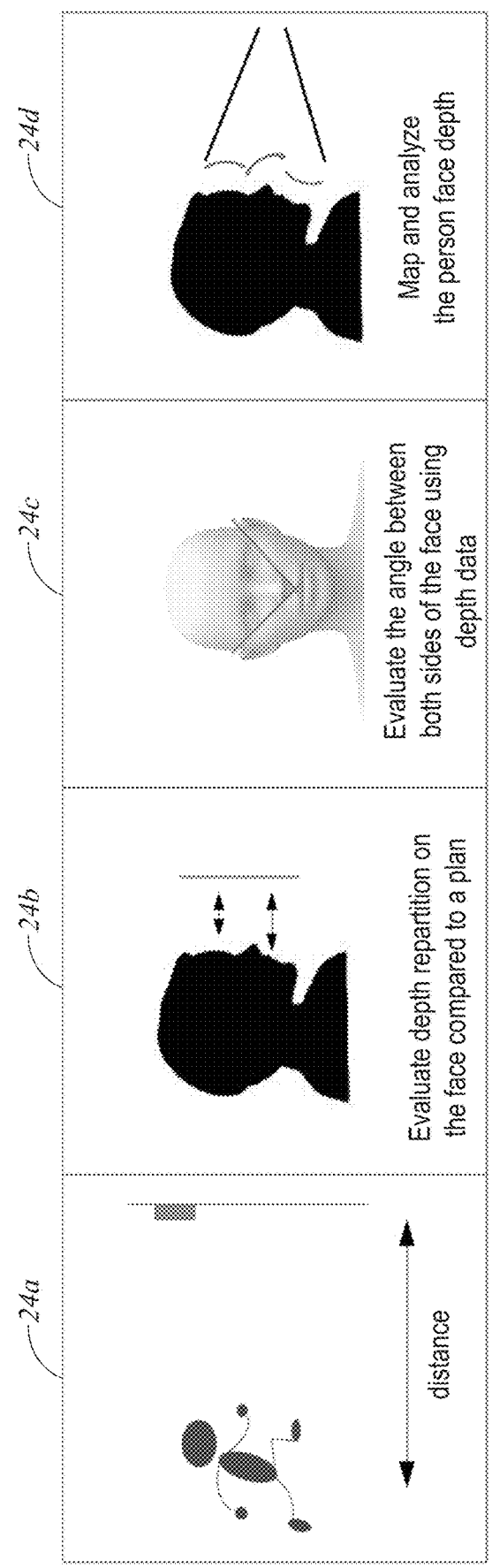
FIGS. 24a, 24b, 24c, and 24d are high-level illustrations of the steps involved in an exemplary embodiment in recognizing a person approaching a controlled access point.

In FIG. 24a, a person potentially seeking entrance to a restricted access area gets close enough to facial image recognition module 500 for a useful image to be captured. In FIG. 24b, the person has approached to within adequate range to perform facial recognition, and the facial recognition program performs an initial evaluation to determine if a human face is being presented. In FIG. 24c, depth-based facial recognition may be performed including measuring angles presented by the presumed face. In FIG. 24d, the full 3-D map of the face in the captured image is compared to those in a previously collected facial image database and/or to the two-dimensional image to confirm that features extracted from the 2D image correspond to features in the 3D image.

Figure 25:
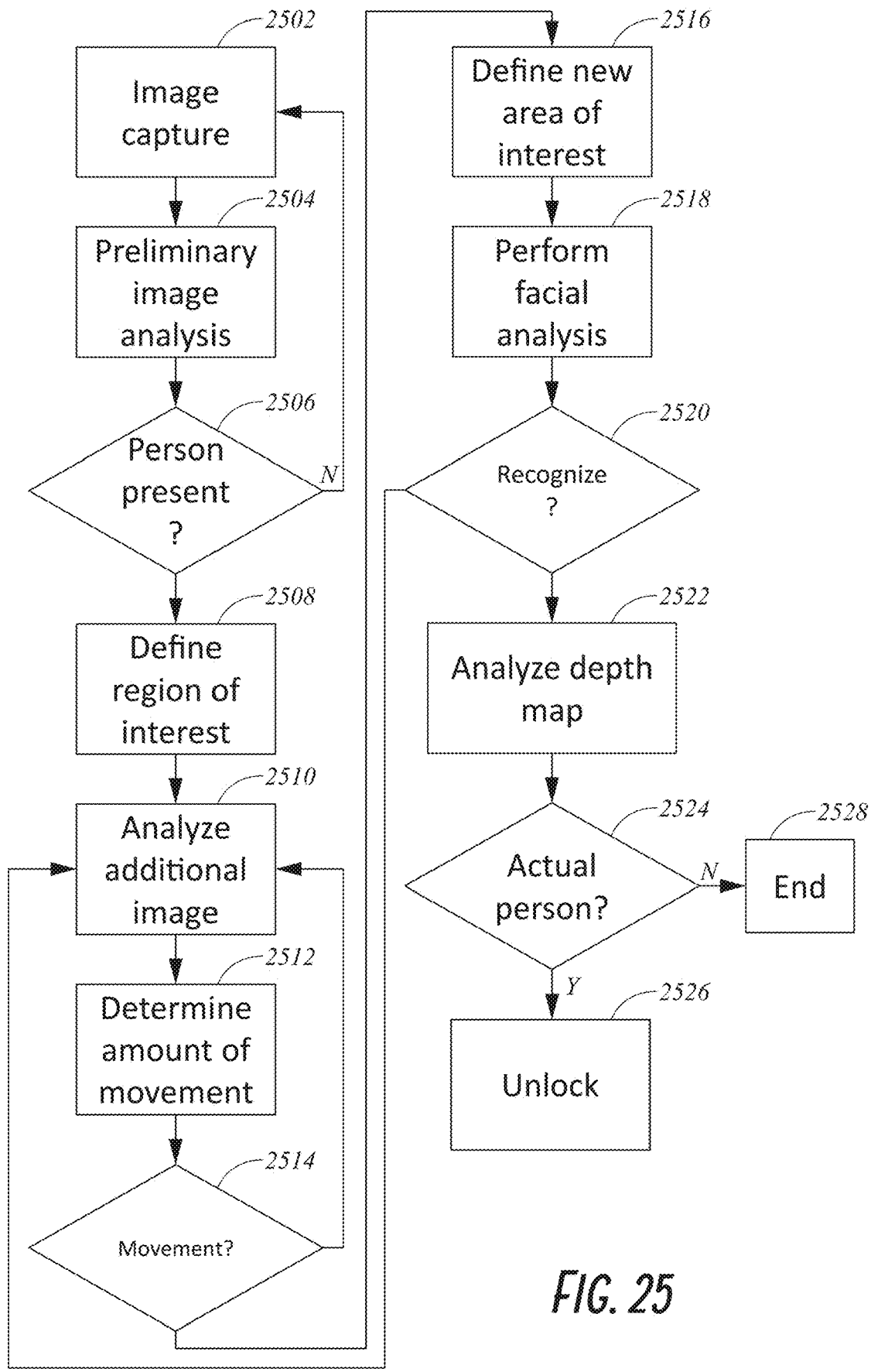
FIG. 25 is a high-level flowchart illustrating steps involved in an exemplary efficient facial recognition process.

FIG. 25 is a high level flow chart illustrating the steps involved in an exemplary efficient facial recognition process. In step 2502, RGB camera xxx captures an image of the entire field of view of RGB camera 502. In step 2504, the captured image is analyzed—not (initially) for purposes of determining who is there, but simply to determine if the captured image includes a person, and if so, where in the captured image the person is. This is a computationally simpler task, and can be completed relatively quickly. This step can consist of searching for a face, or it can consist of searching for a shape likely to be human body. In step 2506 it is determined whether or not a person appears to be present. If no face or body is detected then the process loops until a face is detected. When a person is detected, the region of interest, or the portion of the field of view that contains the image of interest (the face) is defined in step 2508. This region can be of virtually any appropriate size. In the currently preferred embodiment, it can be as small as 120 pixels by 120 pixels. In step 2510, a subsequent RGB image is captured, and the image region defined in step 2406 is analyzed to determine if the person has moved, and if so, in step 2512 the amount of movement is estimated. This process can be computationally intensive, so the load on the processor is reduced by limiting the analysis to the previously defined region, or a region slightly larger to accommodate potential motion. If the person is determined to have moved in 2514, then in step 2516 the defined region of interest is adjusted accordingly. A variety of techniques may be used to track one or more objects of interest. One such method is known as Kalman Filtering. This approach uses a series of measurements observed over time, which may contain inaccuracies such as noise and other errors, and produces estimates of unknown variables or states. A dynamic model is created that, based on a set of initialized states, compares the predicted output of the model to the actual measurement of the object of interest. The delta, or difference, between the measured value and the predicted model is used to adjust the model state values. In this way the object is "tracked". However a variety of methods can be used to detect movement and track changes in the region of interest. In step 2518 the defined image region is processed in order to recognize the captured facial image. In step 2520 it is determined whether the system recognizes the analyzed face. If the face is not recognized, then steps 2510 through 2518 are repeated. If the face is recognized, then in step 2522 the images captured by the IR sensors are analyzed. Tracking may continue the entire time a given human figure is within view of the camera and sensors. The system may also attempt to locate a person who has moved out of view of the camera and sensors for a period after the last "sighting," and attempt to match images taken before the "dropout" with those take after.

It should also be noted that the processes described herein may in some circumstances exceed the capabilities of processor 510 if pursued simultaneously. It may therefore be advantageous to provide the system with heuristics that prioritize tasks so that less essential tasks can be skipped. Thus for example, if the system is tracking multiple people approaching an access point, various processing steps may have to be performed on only every $2^{nd}$ or $3^{rd}$ captured image of each person, rather than on all captured images.

In step 2524 the images captured by the infrared sensors are analyzed to determine whether the image is an actual person, or a spoofed image such as a printed photograph or tablet computer. As in step 2508 above, the analysis of the infrared images is restricted to the defined image area in order to reduce computational load. If the analysis of the infrared images determines that the captured image is not spoofed, then in step 2526 the positive and validated identification is passed forward, either to trigger unlocking of the door or otherwise. If the image is determined to have been spoofed, then in step 2528 no action is taken to unlock the entrance. In addition, in certain implementations the system may send a notification of the spoof attempt, record the images associated with the step, or both.

Figure 26:
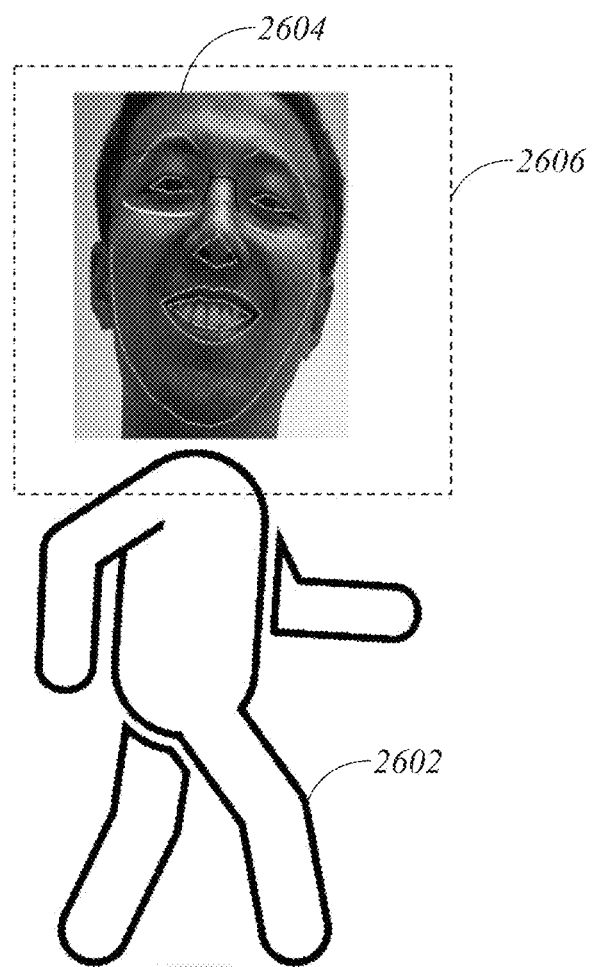
FIG. 26 is an illustration of how an exemplary version of the invention can be used to define a region of interest in a captured image.

FIG. 26 illustrates an exemplary optimization method that can be used by the subject invention to reducing processing load by restricting the portion of the captured image to be analyzed. Once a human form 2602 has been found, and a face 2604 has been located, region of interest 2606 is defined such that it includes the located face plus a margin of error, to make it more likely that, even if the subject is moving, the next captured image will still contain most or all of the face.

Alternatively, the invention can used to detect an area of an image likely to contain human skin, and based on the assumption that a face will generally be located somewhere above that area of skin, focus efforts to locate a face in that region.

In another embodiment, the invention also comprises methods for preventing unauthorized persons from entering a controlled space by following an authorized person, also known as "tailgating." Tailgating is a way of gaining entrance to a restricted area by walking in behind an authorized person (whether or not the authorized person is aware someone is behind them). Social conventions tend to pressure the authorized person to hold the door open to be polite, even if they are not sure they even know the person behind them, thereby enabling an unauthorized entry.

Figure 27:
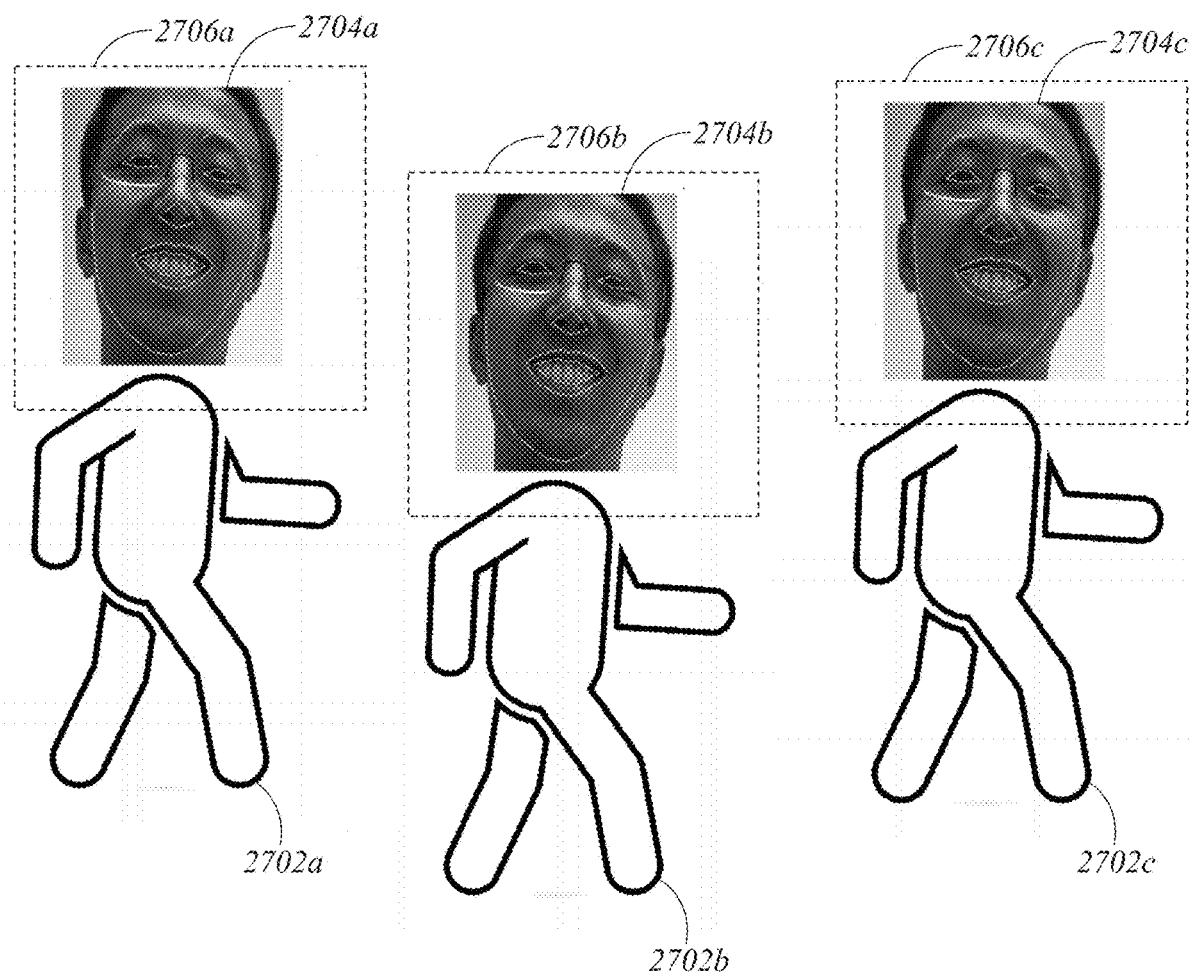
FIG. 27 is an illustration of how an exemplary version of the invention can be used to define multiple region of interest in a captured image.

Because the facial recognition module is capable of detecting multiple potential entrants simultaneously, an aspect of the subject invention is that it can significantly reduce or even eliminate the possibility of tailgaters entering a controlled space. FIG. 27 illustrates how the subject invention can be used to detect multiple potential entrants simultaneously. Facial recognition module xxx may find multiple humans 2702a, 2702b through 2702n in the vicinity of the controlled access point. Image processing permits the facial recognition module 500 to detect each such human form, their associated faces 2704a, 2704b through 2704n, and define regions of interest 2706a, 2706b through 2706n.

Once the system has determined that multiple potential entrants are in the vicinity of the controlled access point, the appropriate action to be taken can be set by policy. For example, if multiple people are approaching an access point and one of them is not authorized, or if one person's face is not visible to the facial recognition module, depending on policy, the door can be kept locked until everyone is authorized, or by asking for a second method of authentication, or an alert can be triggered. Other potential options are to open the door and notify security, to keep a log of each such unauthorized person (and admit both people, or not), or to admit the unrecognized person or persons and give the unrecognized person a timed window (of an number of minutes)—enough time to check-in and obtain permission to enter in another form, such as from an attendant in a lobby. If the unrecognized person does not do so within the permitted interval, a notification can be sent to building security or another designated responder.

Receiving real-time authentication data from a single or multiple connected units, it is up to the administrator's policy to decide how to enforce physical access control and notifications based on anti-tailgating. For example, if multiple people are approaching an access point and one of them is not authorized, depending on policy, the door can be kept locked until everyone is authorized, by asking for a second method authentication. The admin has the option to also open the door and notify security, keep a log of the unauthorized person or give that person a timeout of 5 minutes, enough time to check-in at the lobby. If this action is not completed, a notification is sent.

Real world use case of the technology includes multiple people approach and authentication. The technology handles this by processing all incoming pictures simultaneously. Each face is processed as a separated input and prediction is generated before the group reaches the door.

Figure 28:
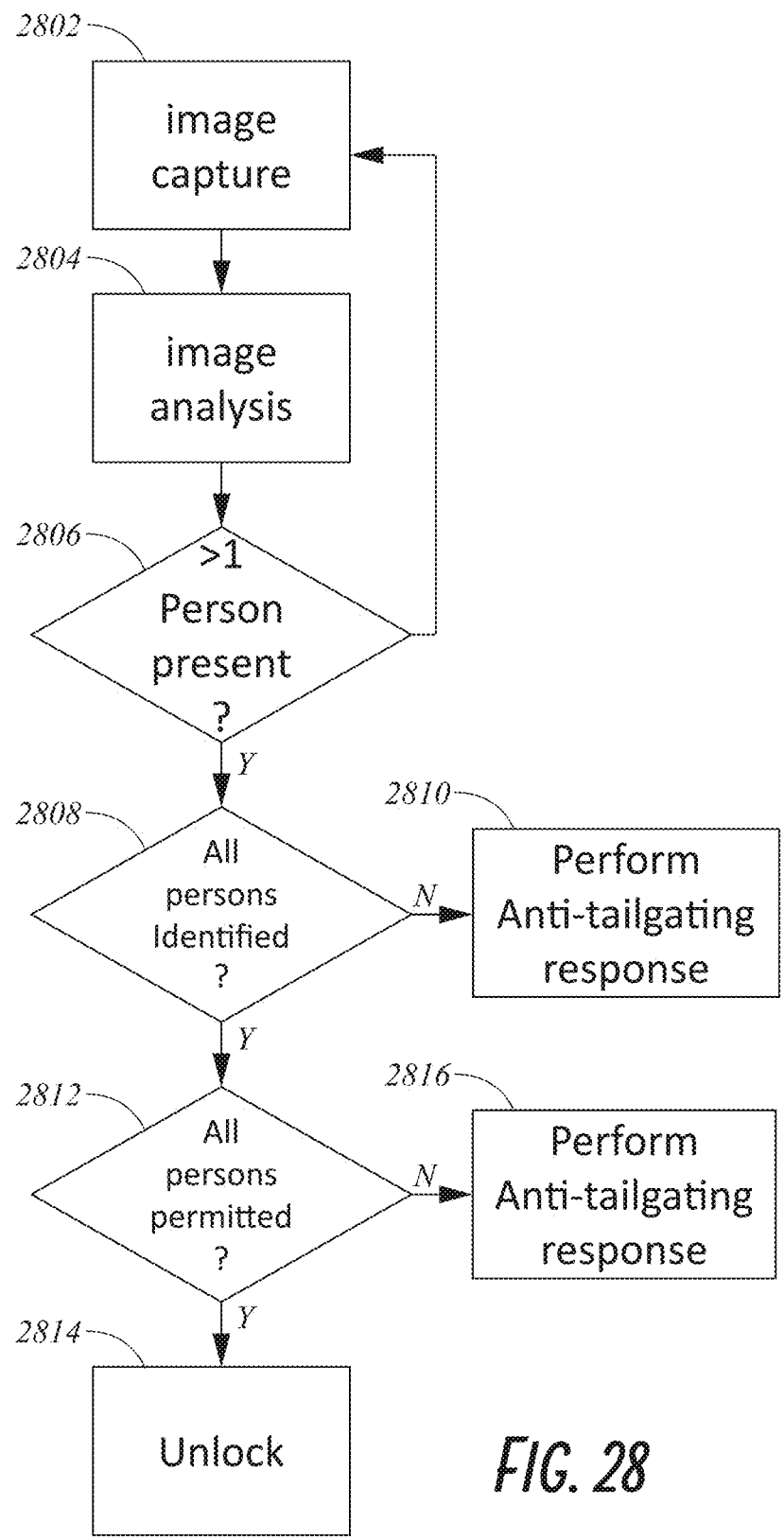
FIG. 28 is a flowchart illustrating steps involved in an exemplary process of preventing tailgating.

FIG. 28 is a flowchart describing high-level exemplary steps that may be used to determine the appropriate action when multiple potential entrants are detected. In step 2802, the RGB camera captures an image. In step 2804, processor 510 analyzes the image. If in step 2806 only one person is found in the image, then the anti-tailgating process loops back to step 2802. If facial recognition module 500 determines that more than one person is within a specified distance from the entry point, then the anti-tailgating process continues, and in step 2808 it is determined whether all persons determined to be within the defined distance have been identified. If all persons determined to be within the defined distance have not been identified, then in step 2810, the system performs the previously specified anti-tailgating response. Potential anti-tailgating responses may include one or more of: not unlocking the access point until any unidentified persons have left the specified area; unlocking the access point, but triggering an alert, or logging the tailgating event, either when denying entry or after allowing it.

If all persons within the defined distance have been identified, then in step 2812 it is determined whether all of those persons have the requisite permission to access the controlled entrance. If they do, then in step 2814, the access point is unlocked. If not all persons have the requisite permission, then in step 2816, the system performs the previously specified anti-tailgating response. Potential anti-tailgating responses may include one or more of: not unlocking until any unidentified persons have left the specified area; unlocking the access point, but triggering an alert, or logging the tailgating event, either when denying entry or after allowing it.

Figure 29:
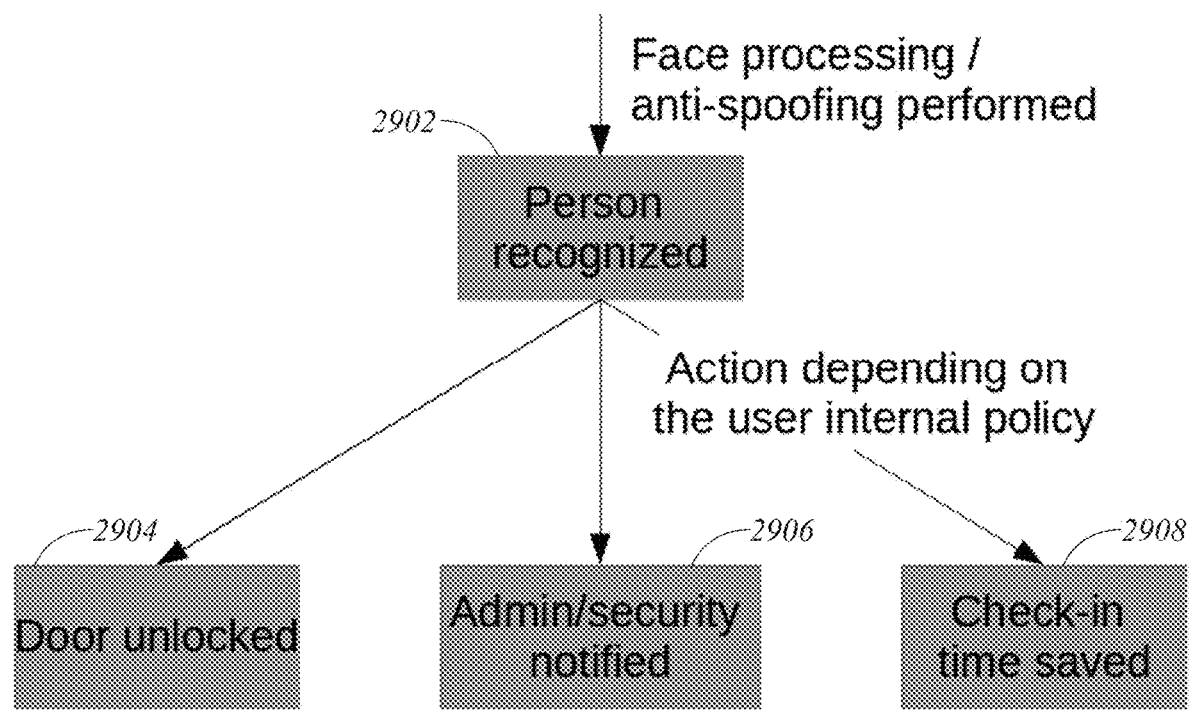
FIG. 29 is an illustration of steps that can be taken to act on a detected instance of tailgating.

FIG. 29 presents options that can be followed in the event tailgating is detected. If a tailgater is detected 2902 following an authorized person, a definable administrative policy can automate one or more of unlocking the door 2904 (or not unlocking it), notifying an administrator or building security 2906, and logging the time of the event 2908.

Another aspect of the invention is the process for generating, evaluating and storing useful images of potential admittees in order to improve accuracy and reduce friction. In a real sense, a facial recognition system does not actually recognize faces; it simply confirms or rejects the possibility that the image it is evaluating is a "close enough" match to one or more images stored in a library of images. Thus it is very important to curate that library in order to ensure that it contains high-quality images that will best support the evaluation process. When a priority for the access control system is to enable authorized admittees to minimize interaction with the system that means that the system will ideally be capable of validating users even if they are not facing the camera and sensors, or if their features are partially blocked by clothing, glasses, facial hair, etc.

Facial recognition requires a lot of pictures of the same user to be efficient. This proposal replaces traditional biometric registration process with learning through the normal user badging process. Each person receives a badge and uses the system like a traditional badge controlled access point. The first time the user badges in by the door, multiple facial scans are stored in the system and a new 3D face model is built. The badge number is binded to the facial data. The system outputs a badge number as normal When the system has enough data to have a high confidence on the recognition, it will recognize the user with enough precision and the badging will not be required any more. Usually this method requires one badging interaction. This approach removes all registration and setup steps which are time consuming. In addition, all facial data captured and stored will be under the normal usage conditions which would provide better facial recognition accuracy.

The facial recognition method uses previously stored RGB, infrared, and depth pictures of the same person to generate the model for matching. The model and the recognition accuracy is also improved over time as each user uses the system more. This training throughout several days allows the system to become robust to personal and external changes.

Figure 30:
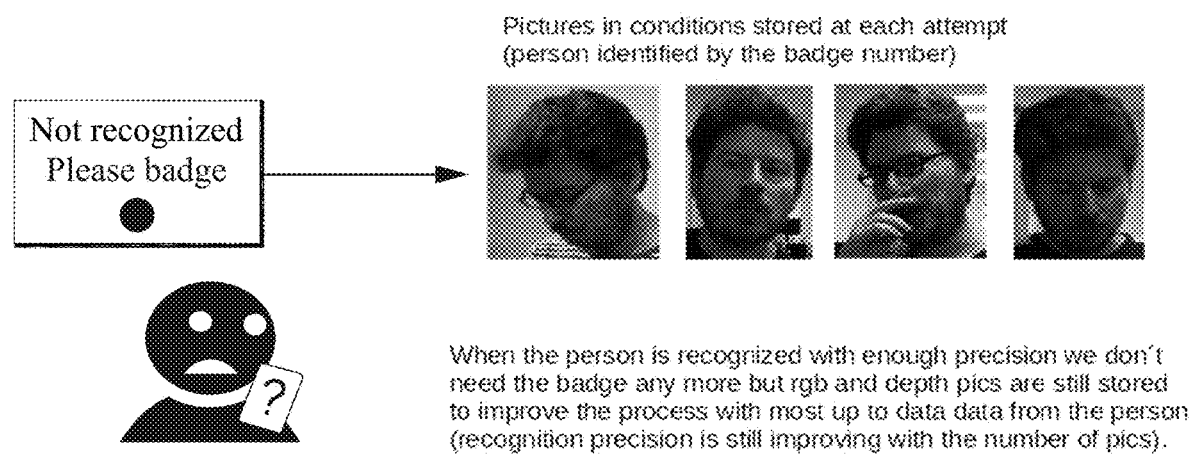
FIG. 30 is an illustration of how multiple captured images may be used to increase the likelihood of correct facial identifications.

Here is a non-exhaustive list of the fluctuating parameters which are affecting the recognition accuracy but improved with continuous learning:

Clothes
Makeup
Haircut and beard (hiding one portion of the face)
Facial expression (tired, smiling . . . )
Position of the face compared to the module (right, left angled, portion hidden by something else)
Distance from the module
Speed of the person
Movement
Lighting conditions FIG. 30 illustrates how a library of images increases the likelihood of correct facial identifications. When an unidentified person 3002 approaches a facial recognition module, at least one image is captured. Assuming that the captured image or images are "good enough," and that the person presents a badge 3004, facial recognition module 500 compares the captured image to stored images 3006a, 3006b, 3006c through 3006n associated with that badge number. The more images the system accumulates, particularly including a variety facial expressions and of angles relative to the camera and sensors, the better the chances of accurate identification. The higher the quality of the images the system accumulates—that is images in which most or all of the face is visible, well lit, and generally facing toward the camera, the better the chances of accurate identification. The system will keep learning the person's face even if the person is fully enrolled. This continuous learning improves accuracy because someone's appearance changes over the time.

In another embodiment, the invention also comprises systems and methods for coordinating and sharing data regarding authorized entrants across multiple devices and multiple entry points. In a multi-entrance context such as a building or campus with multiple entry points, a user may generally use a single entry point, and thus that entry point may accumulate a large number of images of that user. When that user approaches a different access point (assuming it is also a permitted entry point), that user will expect the system to recognize her. This can be accomplished by sharing images (or the metadata extracted from them) between access points.

The proposed technology can be deployed self-contained or connected to multiple units. One of its key features is synchronized learning within a group. Groups can be configured and defined based on the company, facility, location, etc. All data recorded at any of these access points within the group using the technology will be aggregated and shared to provide a more complete dataset of face models. If a person is registered and recognized at a door, all other doors within the same group will be able to recognize him without additional learning.

Figure 31:
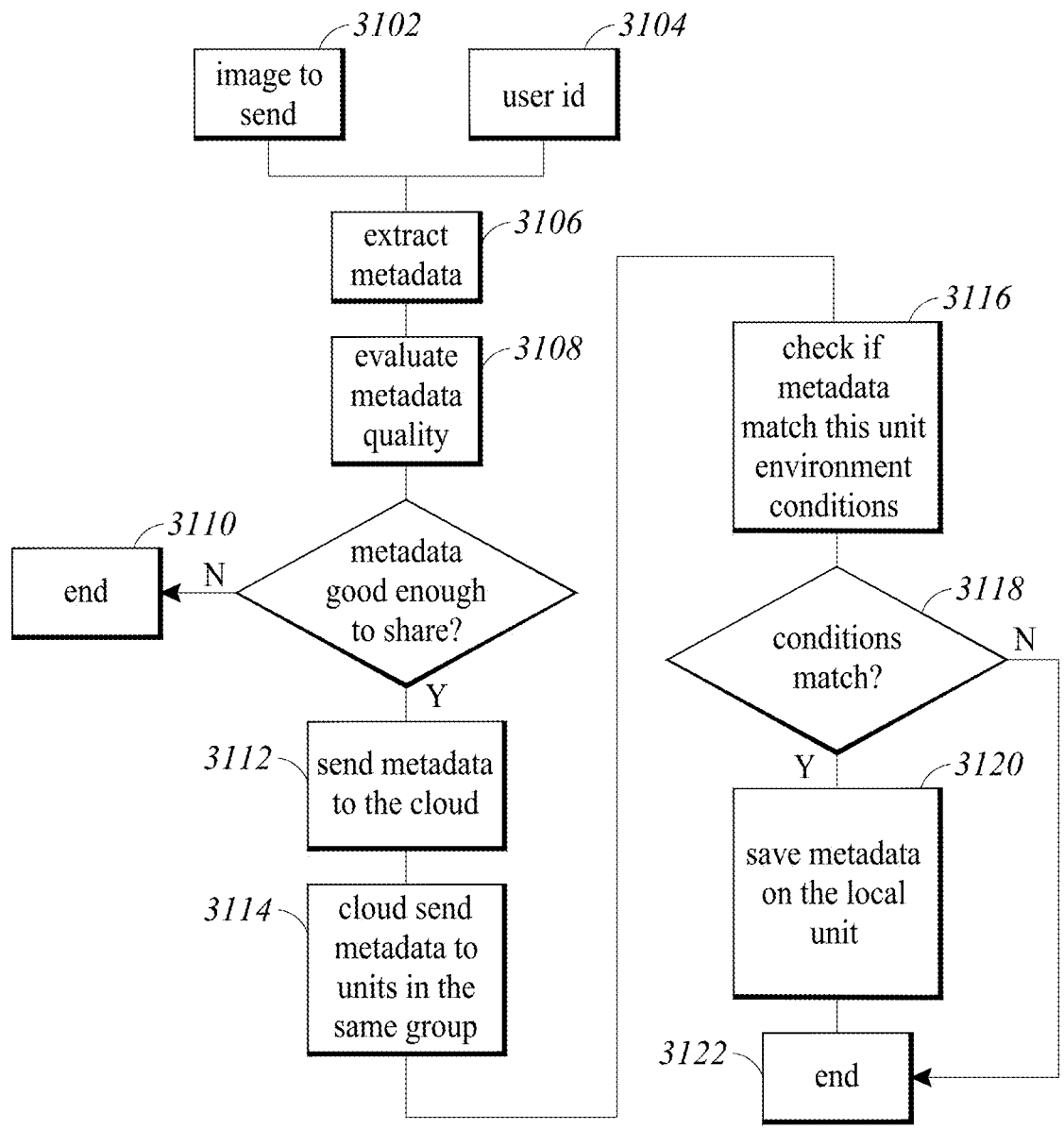
FIG. 31 is a flowchart illustrating an exemplary method for sharing recognized faces among multiple entry points.

FIG. 31 illustrates an exemplary method that can be used to share recognized faces among multiple access points. In step 3106, metadata is extracted from image 3102 and paired with user ID 3104. The metadata may include, but is not limited to characteristic facial landmarks, angles, skin luminosity, etc. In step 3108 the metadata is evaluated for quality, so that only information that will likely be useful for future recognition interactions is shared. If the extracted metadata is of insufficient quality, then in step 3110 the process ends. If the extracted metadata is of sufficient quality, then in step 3112 the metadata is transmitted to a server in the cloud, and in step 3114 the cloud server in turn sends the metadata to other relevant facial recognition modules. (Relevant modules may be those located at other entrances to the same building, other entrances within a campus, or may be defined in another way.)

In step 3116 a receiving facial recognition module determines if the received metadata matches the environmental conditions affecting the receiving module. For example, if the metadata was generated from an image captured in bright sunshine, creating a very high-contrast image with deep shadows, and the receiving module is located indoors where lighting is always even, producing low contrast, the received metadata may not increase the accuracy of recognition by the receiving module. If the environmental conditions are similar enough, then in step 3120, the metadata is saved by the local unit. If not, then in step 3122, the process ends without saving.

Figure 32:
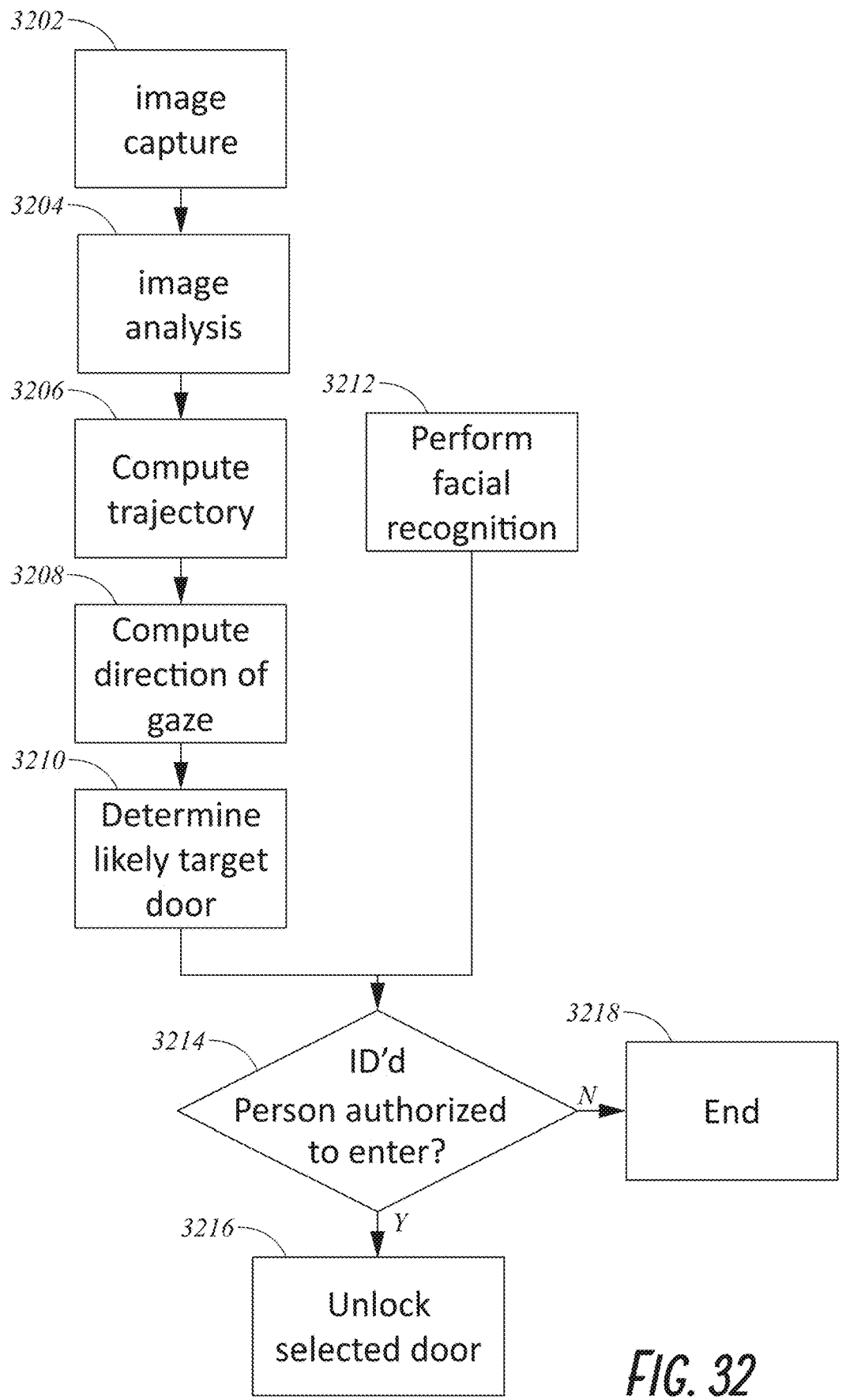
FIG. 32 is a flowchart illustrating an exemplary method for determining which of a plurality of doors to open based upon the actions of a person approaching those doors.

Another challenge for an access control system that is designed to minimize friction and required interaction may arise in a context in which multiple access-controlled doors are relatively close together, such as in a hallway. In some contexts, it will be inappropriate or prohibited to simply open all such doors when a person who is to be permitted access to only one of those doors approaches. Opening multiple doors unnecessarily may also create security vulnerabilities—a person not in view of the facial recognition module may be able to enter undetected. In another embodiment, the invention also comprises systems and methods for determining, in the case of a location with a plurality of separately controlled entry points, which of those entry points a user seeks to enter. By capturing and analyzing the trajectory and gaze of the potential entrant, the subject invention may be used to predict the door the users seeks to enter, and unlock only that door. FIG. 32 is a flowchart describing the steps of a high level exemplary method for selecting which of multiple doors should be opened.

In step 3202 an image of the potential entrant is captured, and in step 3204, the image is processed. (In an actual implementation, a series of images will be captured and analyzed, but for simplicity a single image capture is described.) In step 3206 the trajectory of the potential entrant is calculated; in step 3208 the gaze of the potential entrant is analyzed. In addition to these steps, the direction in which the potential entrant is facing may be analyzed, and other indicators of intent may be detected. In step 3210 these inputs are used to extrapolate the likely door the person is approaching.

Separately, the detected face is used to perform facial recognition 3212 as described previously. In step 3214, it is determined whether the identified person is authorized to enter the door the person is approaching. If so, then in step 3216, that door is unlocked. If not, then in step 3218 the process ends without unlocking a door.

In practice, it may be advisable to perform the predictive steps 3202 through 3210 iteratively, so that the accuracy of the prediction improves both with more data and as the user gets closer to the intended door. When multiple people are in a multi-door environment, all of them may be separately tracked, both for intent (in order to decide which door or doors to open) and for anti-tailgating (to make sure only authorized people enter each door).

A related problem for a facial recognition-based access control system is that it will not always be the case that a person who is near an access-controlled entry point will actually intend to enter. People may congregate near a doorway, sit outside or otherwise be in the vicinity without actually intended to enter. Thus it will be advantageous to be able to only open the access point if the recognized person manifests an intent to enter. In another embodiment, the invention also comprises systems and methods for detecting whether a person in the vicinity of an entry point intends to enter.

The proposed technology is currently able to detect and recognize people 3 meters from the sensor. This can be concerning if an authorized individual is walking in front of the entrance but not planning to go in. For example in a hallway, a person can pass several entrances before going through one. Only intended doors must be unlocked for security reasons.

The proposed module includes facial and eye analysis to detect if the person is specifically gazing in the direction of the door. If this condition is met, the unlock mechanism will be activated. If gaze towards the general direction of the sensor is not detected, no action is taken. The system combines the "in the flow" target by not asking the user to do anything specific and the intent detection to unlock only requested entrances.

Figure 33:
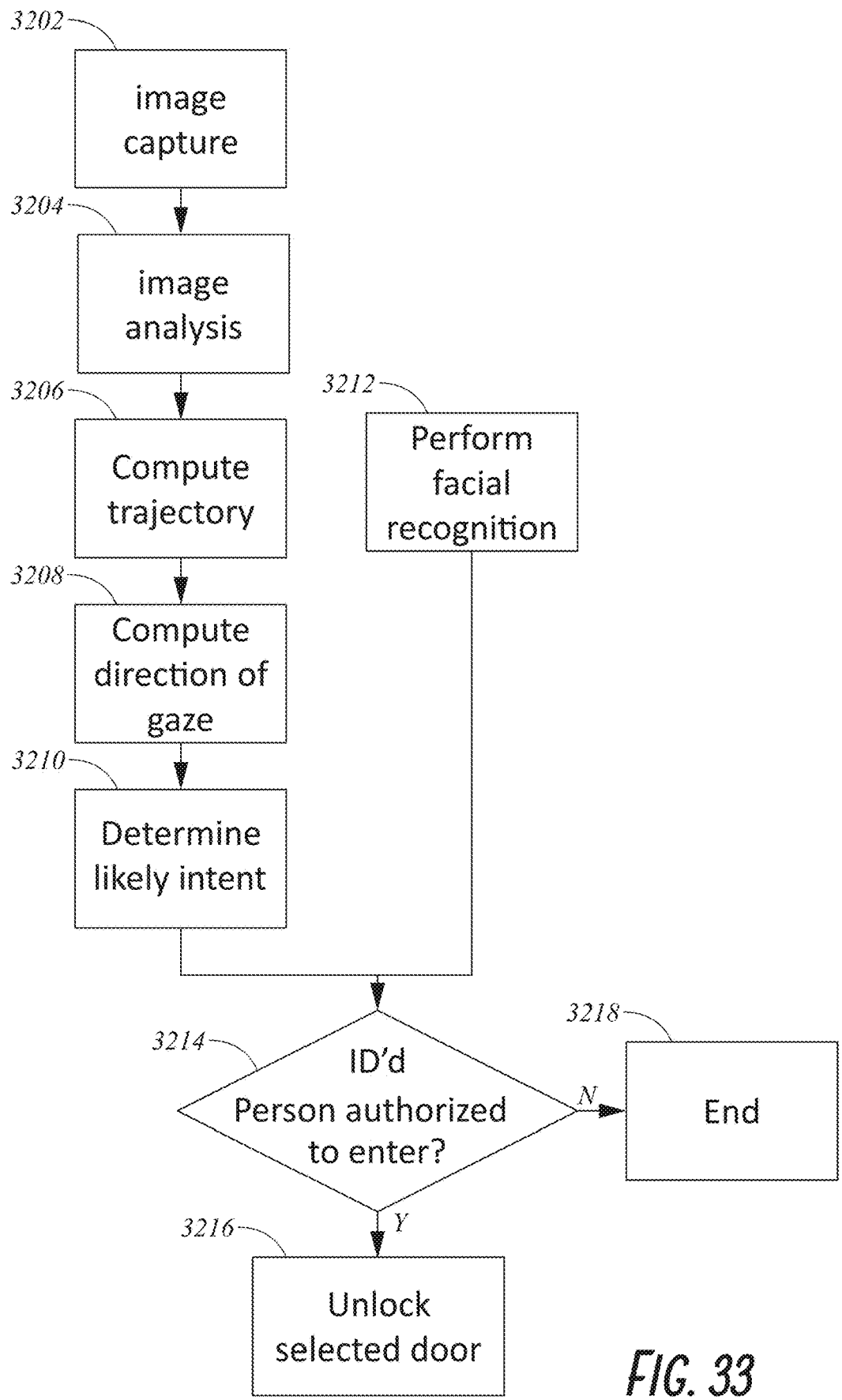
FIG. 33 is a flowchart illustrating an exemplary method for determining whether a person observed near a controlled access point intends to enter.

FIG. 33 is a flowchart describing the steps of a high-level exemplary method for determining whether a person observed by a facial recognition access control system intends to enter.

In step 3302 an image of the potential entrant is captured, and in step 3304, the image is processed. (In an actual implementation, a series of images will be captured and analyzed, but for simplicity a single image capture is described.) In step 3306 the trajectory of the potential entrant is calculated; in step 3308 the gaze of the potential entrant is analyzed. In addition to these steps, the direction in which the potential entrant is facing may be analyzed, and other indicators of intent may be detected. In step 3310 these inputs are used to produce a probability that the person intends to enter the access point.

Separately, the captured image is used to perform facial recognition 3312 as described previously. In step 3314, it is determined whether the identified person is authorized to enter the door the person is approaching. If so, then in step 3316, that door is unlocked. If not, then in step 3318 the process ends without unlocking a door.

In practice, it may be advisable to perform the predictive steps 3302 through 3310 iteratively, so that the accuracy of the prediction improves both with more data and as the user gets closer to the intended door.

Figure 34:
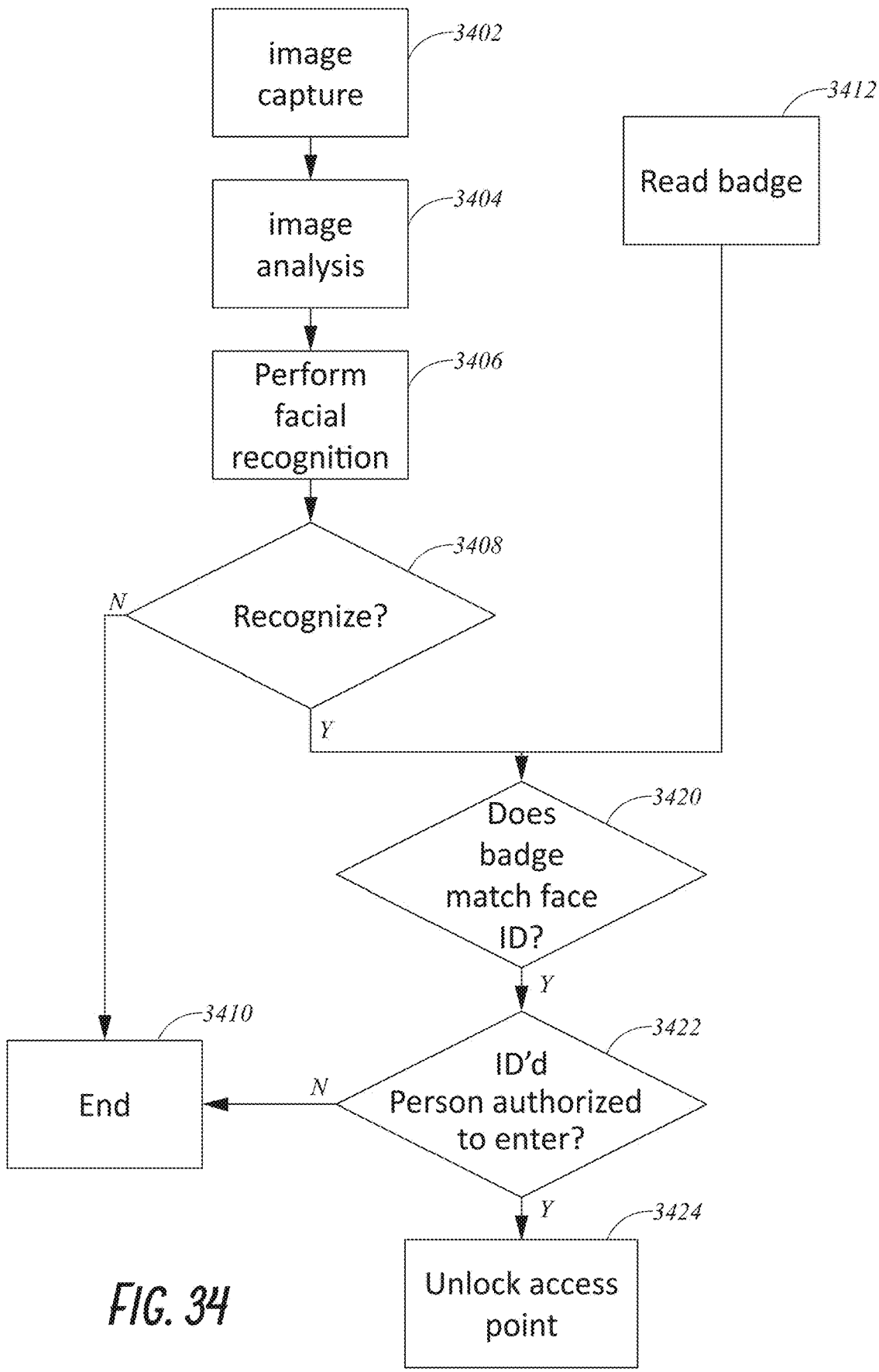
FIG. 34 is a flowchart illustrating an exemplary process for detecting whether a person is presenting a badge assigned to another person.

In building security implementations that include multi-factor authentication, such as systems that include both badge readers and facial recognition modules, the subject invention can also be used to detect improper behaviors such as the use of an authorized badge by an unauthorized person, or an authorized person using a different authorized person's badge. A company may wish to restrict such practices in order to prevent employees from giving their badges to anyone else, to keep accurate track of which of their employees are in a facility, or for other reasons. Thus in another embodiment, the invention comprises methods for identifying people who attempt to enter a controlled space using an improper badge. FIG. 34 is a flowchart illustrating an exemplary process for detecting when a valid badge is presented by a person other than the person to whom the badge was issued.

In step 3402, facial recognition is initiated. In step 3404, analysis of the captured image is performed, and in step 3406 the analyzed image is used to attempt to identify the person. In step 3408, it is determined whether the person can be identified. If not, then in step 3410 the process ends. Separately, in step 3412 the presented badge is read and the ID number is extracted.

In step 3420, the recognized face and badge number are compared. If they do not match, then the process ends 3410 without unlocking the access point. If they do match, then in step 3422 it is determined whether the identified person is authorized to enter. If not, the process ends 3410 without unlocking the access point. If the person is authorized, then in step 3424 the access point is unlocked to permit entrance.

Additional variations are possible, including taking different actions depending on the confidence in a given identification, and adding a "maybe" step in which a potential entrant is neither accepted nor rejected, but has to provide additional input, such as providing better images by standing in front of facial recognition module 500.

The subject facial recognition system, like most or all neural network-based systems, requires training in order to develop the algorithms used to perform as intended. This requires that a large number of images of faces be presented and analyzed. In the currently preferred embodiment, much of this training is to be performed while developing the system and prior to deployment in specific installations, thereby significantly reducing the ramp-up period in an actual deployment.

In order to minimize both friction and inaccurate identifications, and to do so for people of a broad range of ethnicities, comprehensive libraries of images are very useful.

When a person walks by the door, the proposed technology starts looking for similar profiles in the database. To reduce the processing time and complexity, several external parameters are used to decrease the number of candidates. Here is a non-exhaustive list of possibilities:

Checking time: people are usually coming around the same hour and those profiles will be checked first when someone is coming by in the same time slot.

Recurrent groups: As people have routines, the proposed technology is also associating people who are usually coming together (same commute, team going out for lunch time, etc.). Those "associated profiles" will also be checked with priority if one of those individuals approaches the physical access point To improve facial recognition, diverse pictures of millions of subjects are needed, with annotations to correctly identify same and different identities. To do that, an aggregation tool needed to be built, which downloads pictures of faces from social websites.

This dataset provides good quality images of people from different origins. This is especially useful for facial recognition as many social users have multiple pictures on their profiles, which allows the dataset to annotate same identity automatically. The following section details how these pictures from different websites are clustered and processed to identify pictures of the same person and decrease redundancies for algorithm training.

Traditional facial recognition methods are known to have higher accuracy on some types of faces while accuracy may decrease for others. In order to increase facial recognition speed and accuracy, the authors needed to collect millions of pictures from people from those specific ethnic origins.

RGB images can be collected in bulk using the above tool. One important requirement is to have the pictures annotated by name or profile, to identify faces correctly. If this information is not available, another method for identification is the proposed clustering method. We will consider that the dataset is preprocessed and includes only normalized face pictures (RGB or grayscale). We don't know who the subject of the picture is but we can assign person ID numbers. Annotation is the process of having a human review a captured image and associate an ID (name or badge number) with that image.

The technology for clustering is semi-automatic and aggregates all pictures from different origins to find reoccurrence of same individuals. Pre-processing is automatic and pictures with similar faces are collected into batches. An operator is required to confirm or reject matchings where the algorithm does not have high confidence. This efficient method is a good alternative to manually matching pictures with manual human interaction, improving accuracy on the database content before any post processing.

Figure 35:
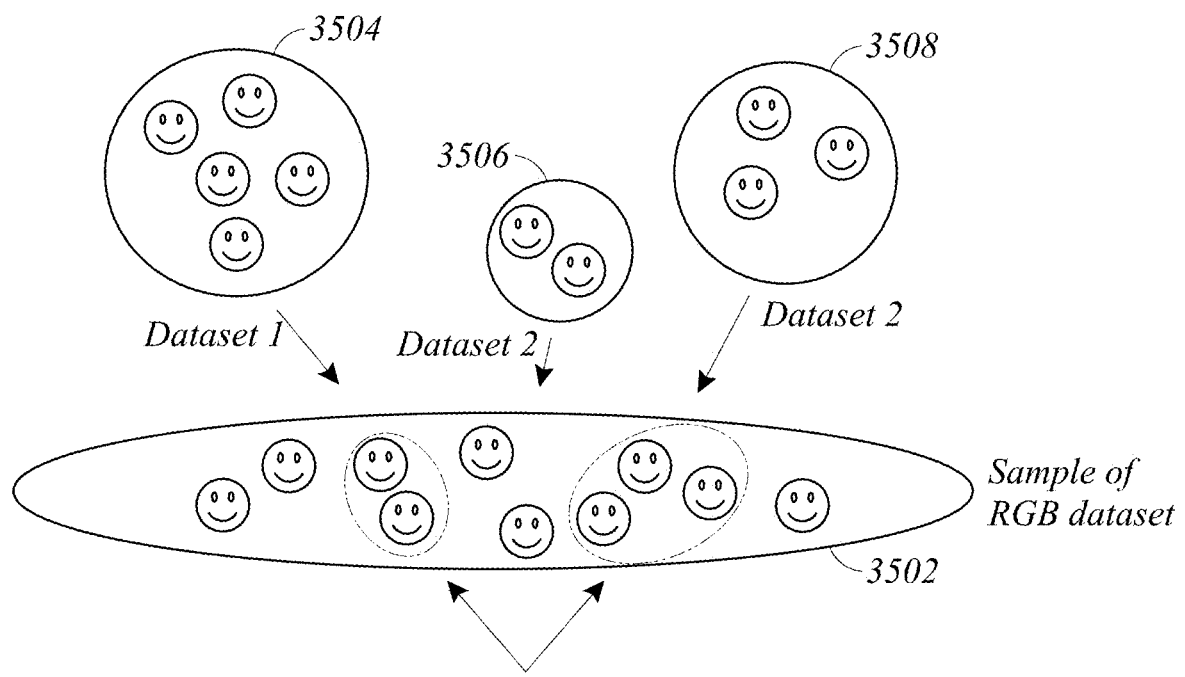
FIG. 35 illustrates how pictures of people approaching a controlled access point can be grouped into similar clusters.

The process works in 3 steps: a) Process all pictures and automatically look for very close ones. As the similarity threshold is very high, confidence that the person is the same in a group is (several groups can have pictures from the same person). We will call those groups of very close pictures "clusters". FIG. 35 explains this automatic matching of very similar pictures.

Facial recognition module 500 (not shown) will collect a large number of facial images 3502. It would be very time-consuming for a human operator to have to individual identify all of the pictures individually, even if just during initial training. Thus in an exemplary embodiment, facial recognition module 500 may group those images into clusters 3504, 3506 and 3508 based on a level of confidence that all of the images in cluster 3504 are of one person, images in 3506 of a different person, and so on. This will permit a human operator helping to train the system to identify a single image representing a cluster, and thus accomplish the identification process more efficiently.

When all pictures are organized into clusters consisting of one or more pictures: b) Compare each cluster to all other clusters by comparing each picture within the first cluster to all pictures from the other cluster and calculate the similarity confidence.

This process enables further simplification of the process by automating the merging of cluster when there is a high likelihood that two (or more) clusters contain pictures of the same person.

Figure 36:
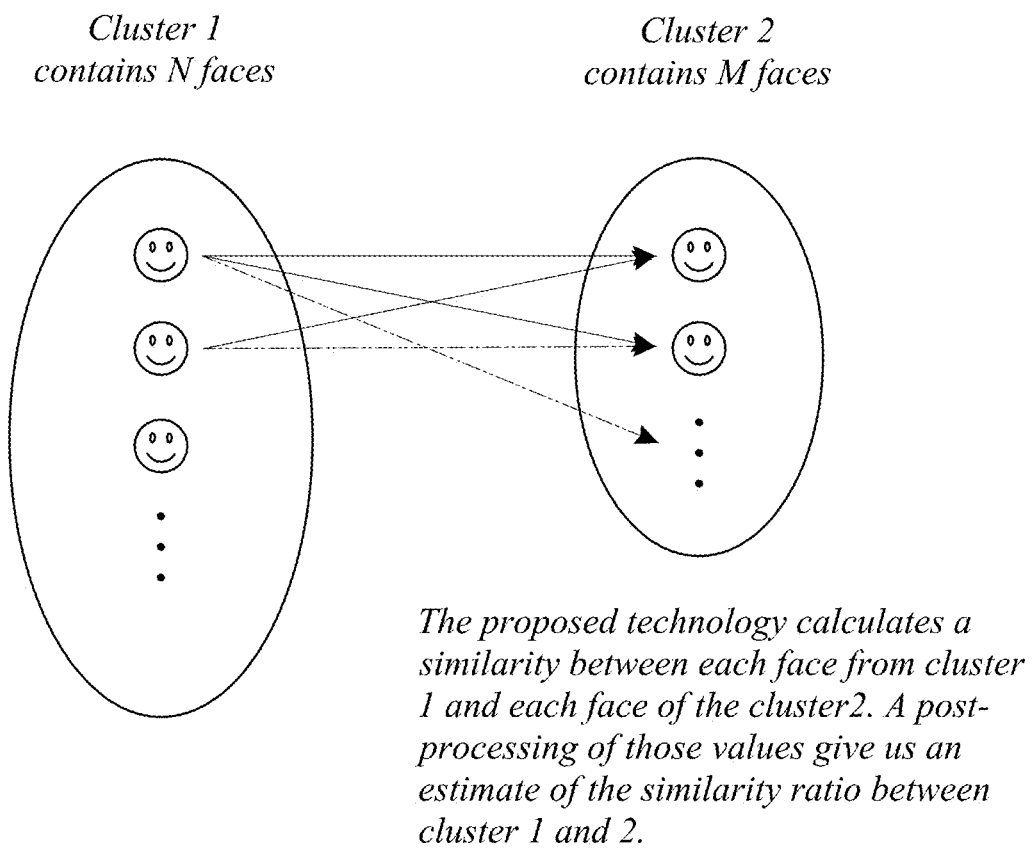
FIG. 36 illustrates another aspect of how pictures of people approaching a controlled access point can be grouped into similar clusters.

FIG. 36 presents a visual explanation of this pairing method. Thus where cluster 3602 contains a number of images determined to be all images of the same person, and cluster 3604 contains a number of images determined to be all images of the same person, all of the images in both clusters can be compared in order to estimate the degree of similarity between the two clusters. If the degree of similarity is sufficiently high, the two cluster can be merged into a single larger cluster. This may be performed automatically by facial recognition module 500, or may be assigned to a human operator, as described in FIG. 37 below.

Figure 19:
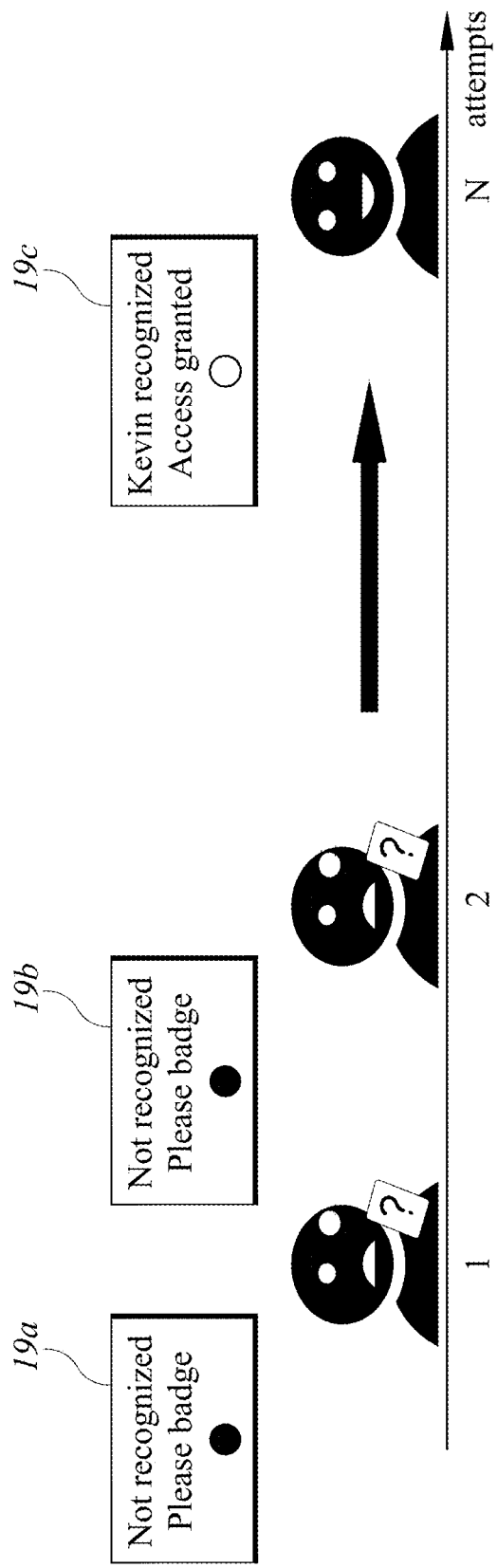
FIGS. 19a, 19b, and 19c illustrate an exemplary method by which an access control system can learn with the assistance of badge information.

For each cluster, rank all other clusters by their combined similarity confidence (higher are more likely to include the same person). c) Display the current cluster and the first one in the similarity clusters list to the operator. If the person is the same, clusters will be merged. If not, we will propose the next cluster in the similarity buffer. FIG. 19 is an example of a visual interface used. The user should confirm or reject if the two clusters are the same person by clicking one of the proposed buttons.

Figure 37:
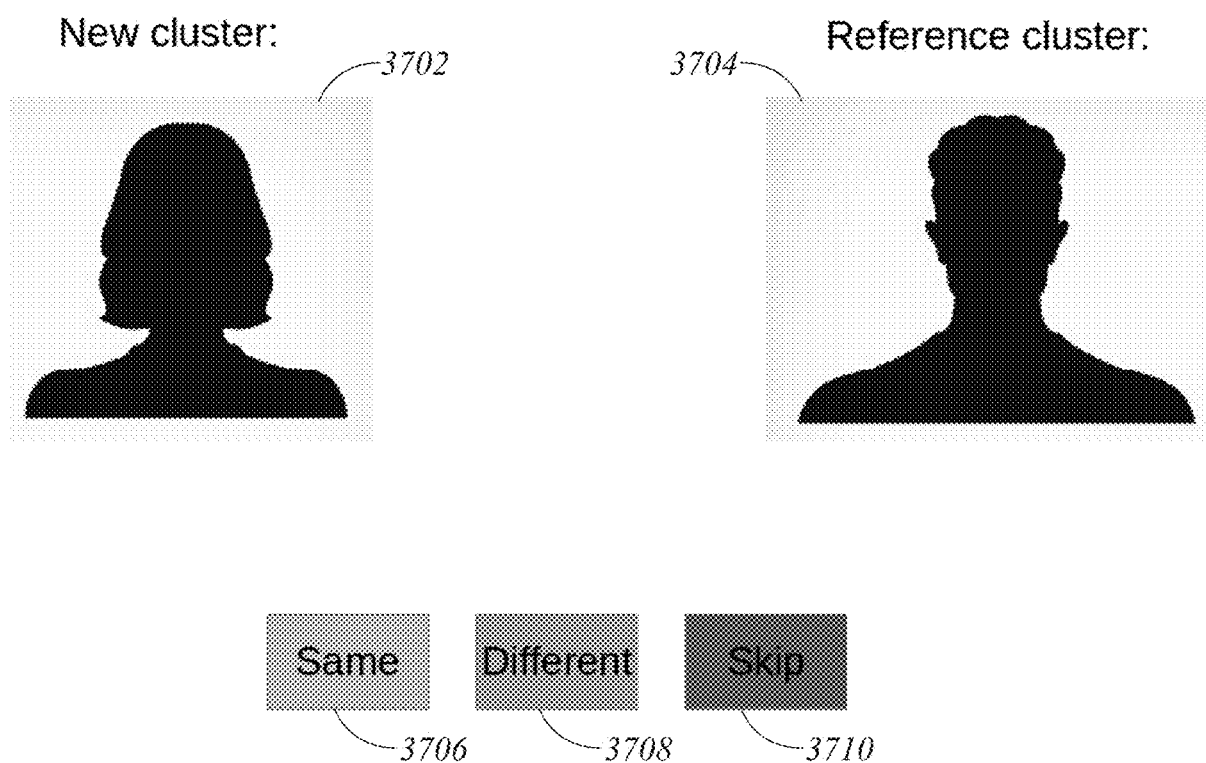
FIG. 37 illustrates a high-level user interface that may be used to help teach a facial recognition module to recognize specific faces.

FIG. 37 provides a View of a possible embodiment of the visual interface using the proposed technology to evaluate person matching. The user interface may present a representative image from an existing cluster of images 3702, as well as a representative image from a new cluster of images 3704. The human operator may then be prompted to mark the clusters as same 3706, different 3708, or to skip the matching process 3710 if the human is unsure.

After X iterations (X is a number depending on the type of pictures and time we want to spend), we will deduce this new cluster as a new person and assign a new cluster ID. If there is mismatch, same cluster or if the comparison is too ambiguous we have a third option to save ambiguous data for more specific manual post processing.

Because of parallel processing and human error, another step is necessary to increase again the accuracy in the database. After all processing, final post-processing will be operated on the database to remove again any potential person duplicates (same person identified with different person IDs).

The process is identical to above: a) Build a cluster by extracting Y random pictures for each person ID in the dataset (Y to be decided depending on the time we want to spend and target accuracy). Random factor is very important for better accuracy. b) For each generated cluster, compare it to all other clusters and generate a list of similar clusters from higher similarity to lower one. c) For each cluster, consecutively display X closest clusters from the similarity list to the operator. If one of them matches (same person displayed) person IDs will be merged. If after X comparisons no identical person identity is detected, we will consider this person cluster to be unique.

This allows for automatic processing of obvious results and human validation of ambiguous ones. This dataset processing method allows a good accuracy on person id assignation and same person image clustering. All automatic clustering methods depend on a numerical threshold which should be adjusted depending on the type and quality of input data. Lower threshold will be more accurate but increase the manual processing time, higher one will reduce manual intervention but also matching accuracy. Ethnic origins of the person can also be a factor for threshold adjustment depending on what type of data was used to create and test the clustering function. If people characteristics are very different from ones used to create the clustering method, results may be less accurate.

The dataset used in the proposed facial authentication technology also includes pictures of people taken in real-world conditions. To match as many common parameters of facial capture (picture quality, orientation, luminosity, size, distance . . . ), functional sensors needed to be deployed at various location. The captured pictures have been aggregated with the existing dataset (already described in previous sections) and improve the facial recognition database by adding depth data.

Previous sections described data collection for recognition pictures but Alcatraz AI also process fake data like paper faces and other spoof attempts to test and evaluate its anti-spoofing algorithms. This dataset also request as much diversity as possible to be efficient.

To resolve this problem, Alcatraz AI developed a recording module capturing all coming by faces and added some features in the display to create a gamification around the spoofing part. The display is just showing an enigmatic message like "Are you human?". Those words and color indications encourage users to try several approaches to trick the system. Additional information and messages are displayed to guide the user and show the progress.

Figure 38:
FIG. 38 illustrates messages that can be used to gamify the process of training an image recognition system.

Finally, those "game units" are positioned in strategic places like technical universities and facilities where people are more familiar with this type of features. FIG. 38 gives examples of messages displayed by the gaming unit.

While it may be desirable to permanently install dedicated facial recognition modules at access control points in many situations, there may also be contexts in which an ad hoc access control point is desired. It may also be the case that facial recognition may be useful for other purposes for which more portable hardware is useful.

Figure 39:
FIG. 39 presents multiple views of a potential embodiment of a portable image recognition module.

The following embedded module had been designed to provide a real-time 3D sensing experience to mobile users, as shown in FIG. 39. This module contains an RGB and depth cameras (or IR sensors) pointing to the user and live streaming the captured video to the phone. This module also contains its own battery and power module. The specific embodiment of module 3902 illustrated in FIG. 39 is intended to be used in connection with smart phones and/or tablets from Apple Corp., and features the proprietary Lightning connector 3904 included in many Apple products. Alternative implementations may use other connectors, such as a form of USB (Universal Serial Bus) in order to work with other smartphones or tablets, such as those using the Android operating system. Module 3902 may also include one or more IR light sources and one or more IR sensors. Module 3902 may also include its own RGB camera, or may connect to the RGB camera or cameras already present in connected smart device 3906.

The setup and provisioning of a building security system, especially a system that includes multiple components that can be configured in software, can be a time-consuming and difficult process. Some systems have required user to type alphanumeric codes into devices with limited user interfaces, or perform other precise tasks with limited feedback. Thus it is another object of the invention to provide a simple provisioning process that can be performed by people having a variety of levels of technical skill. This object is provided by an aspect of the subject invention that permits settings and other aspects of the setup process to be communicated to edge devices including facial recognition modules by presenting visually encoded information to be input via one or more cameras on the device. One method of accomplishing this is to present a portable device with a display, such as a tablet or smartphone with a coded message, such as a barcode or QR code, so that it is seen by the edge device.

In one embodiment, When the system is first turned on, it enters configuration and setup mode automatically. In this mode, the system has all connectivity disabled by default. The camera is enabled to accept configuration input and the display is enabled to convey information. The administrator or installer may configure the unit using the included application. The app is available on any smartphone and tablet device, as well as a web client. The app consists of step by step configuration with explanation for each option. After the administrator or installer has selected all the settings, the app encodes the configuration settings into a barcode and displays them on the screen. At this point, the administrator or installer can present the barcode to the camera to easily transfer and save all the selected settings to the system.

The system and related subscriptions are designed to work with and without internet connectivity. Without internet connectivity, subscription products can be managed and renewed via NFC and RFID. Before shipping each system to the customer, there can be created a set of special and unique NFC and RFID credentials for each system representing the annual subscription renewal. This set of subscription renewal credentials are stored internally to the edge unit and are recognized by that particular system. When the customer wants to renew a subscription for a system without internet connectivity, the customer will be given a corresponding NFC or RFID renewal credential for that year. The customer may then present the credential to the system. The system will read the credential and match against its internal records to update the subscription and expiration date accordingly.

In another embodiment, the invention also comprises a tool to enable an employer to provide information about the morale and emotional health of its employees. The technology required to recognize individual people can also used to recognize indicators of the emotional state of the people being analyzed. Thus detecting smiles versus frowns and grimaces, laughing versus crying can all be used to inform management about their workforce as a whole, as well as potentially identify individuals who might benefit from extra attention.

The technology proposed provides various information:
Number of people near the door
Distance for each person
Intent of each person based on head or eye gaze
The identity for each person if recognized
The anti-spoof result for each person (real or fake)

Figure 40:
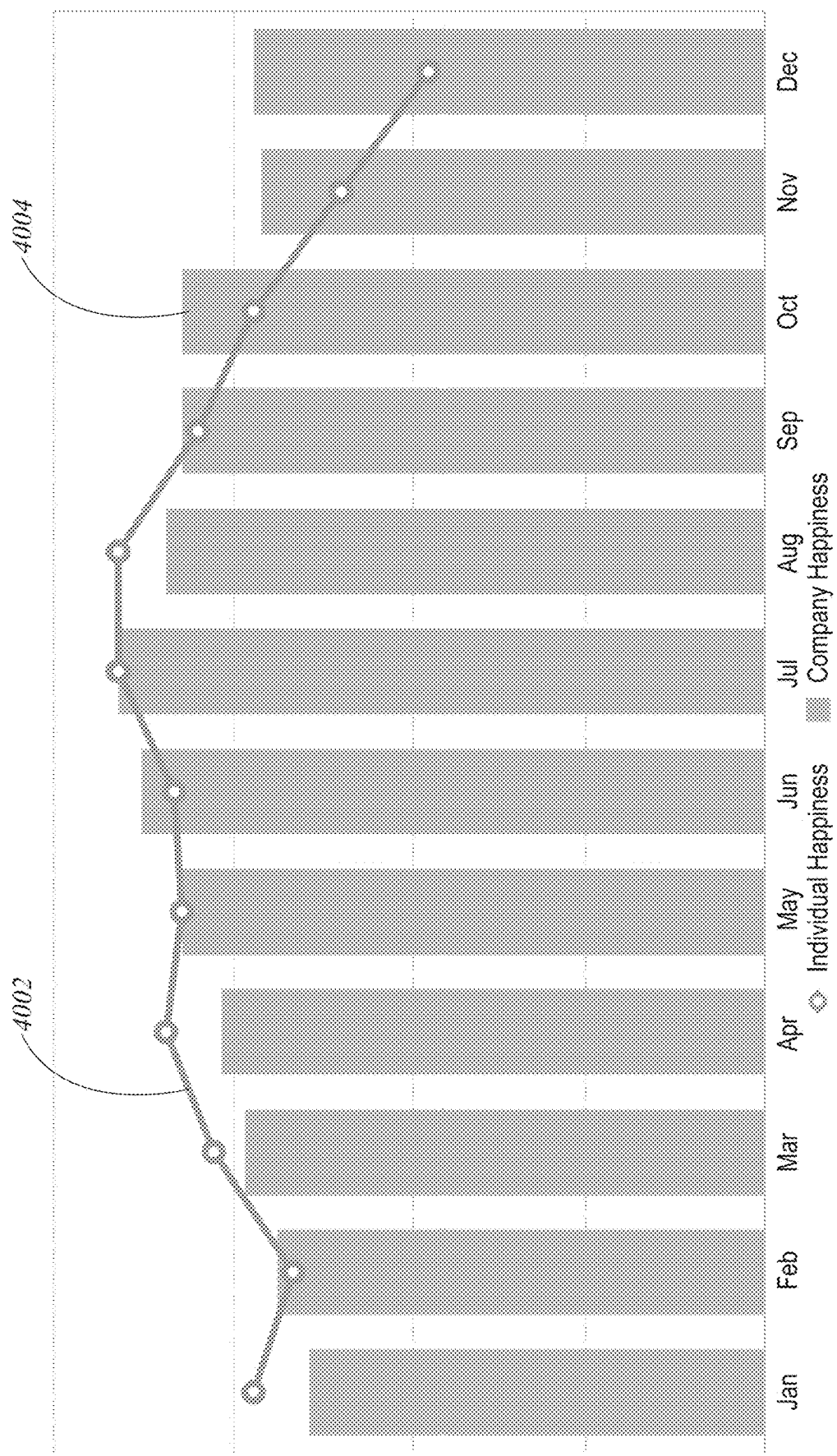
FIG. 40 presents a potential visual representation of data that can be used to learn about the emotional state of entrants to a building over time.

The proposed method uses facial recognition to grant access to incoming people. The authentication system also provides additional features like automatic personnel timekeeping without any manual check-in and emotion tracking. This is especially useful when comparison on individual versus department, group or company is analyzed. For example, a performance review of an employee can be correlated with his quarterly physical presence in the company and their emotional analysis for a more complete insight into their profile and current work. Another example is when a notification is triggered if there is an outlier per company configuration—a group of people working on a project experience longer working hours correlated to lowered positive emotion levels throughout weeks or months. The company can potentially hire help or delay deadline. FIG. 40 gives an example of a visual presentation of the data.

Line 4002 illustrates an exemplary method to track the displayed emotional state of an individual who passes regularly through an access point controlled by facial recognition module 500. Bar chart 4004 illustrates an exemplary method to track the overall displayed emotional state of all of the people (or a subset thereof) moving through an access point controlled by facial recognition module 500.

Figure 41:
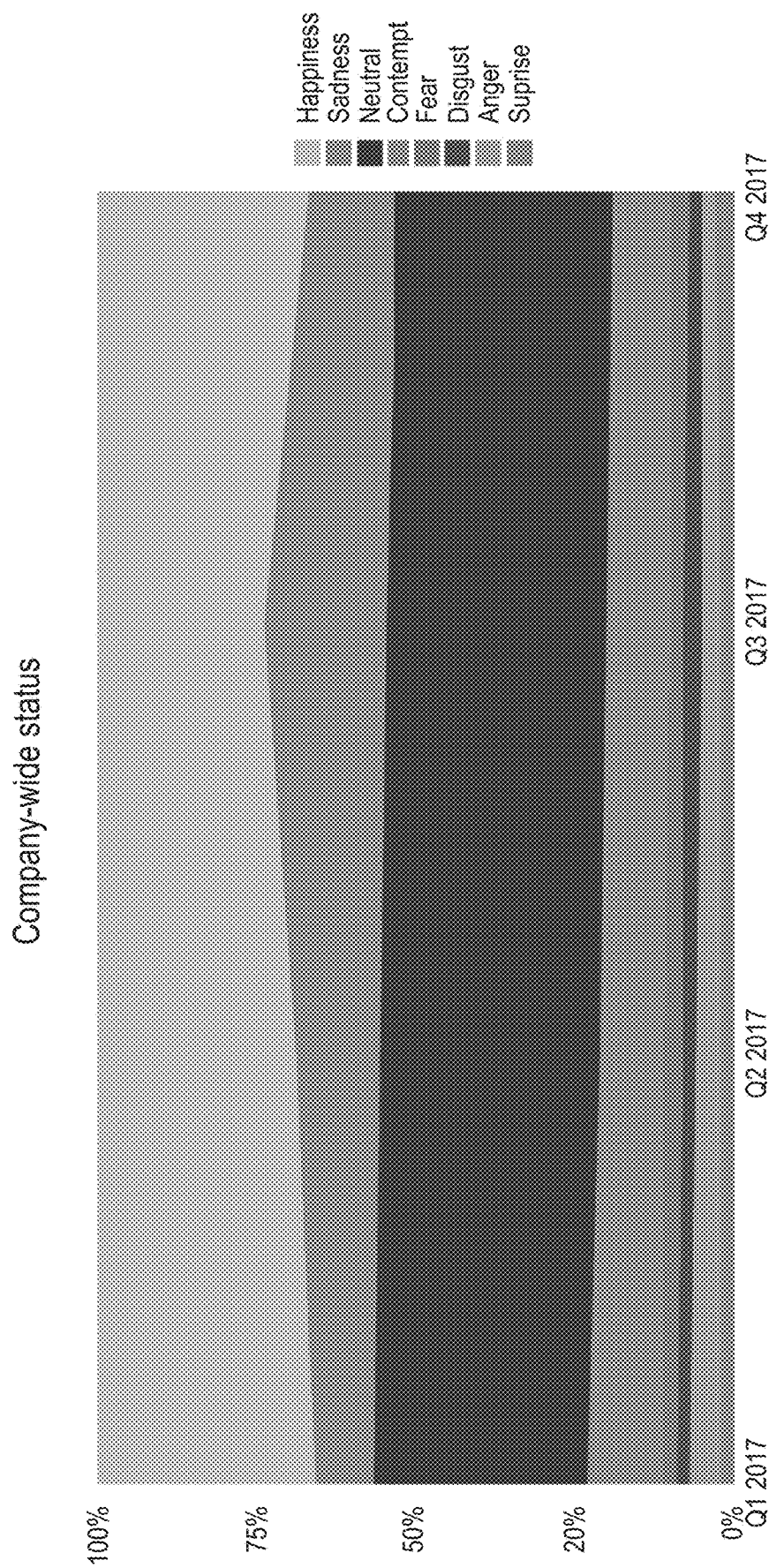
FIG. 41 presents another potential visual representation of data that can be used to learn about the emotional state of entrants to a building over time.

Additionally, a company can track how employees react to an announcement pre and post the event by tracking their emotional behavior. The company can time an event based on how the company's emotional level is in general. This is presented in FIG. 41. Different facial expressions may be recognized and associated with different emotional states. Those emotional states can be tracked over time, and changes in overall emotional states can be used to affect various company policies and initiatives.

Another aspect of the invention that leverages the image recognition capabilities of the facial recognition module is to use a system of encoded badges or stickers for purposes such as guest badges. The authentication platform is using image processing to grant access. The main target is facial recognition but this tool can also be used to recognize any 1D or 2D barcodes. For guest recognition and access, custom name tags can be created with QR codes or barcodes. The person doesn't have to be recognized by the system and access can be granted for a limited time.

This use case can give more liberty to guests and temporary employees but also avoid all tailgating alerts. It's also a way to track guest movements by checking (for example) this person is always with a representative of the company.

Another aspect of the invention that leverages the image recognition capabilities of the facial recognition module is to use information generated by the facial recognition modules to inform other systems, such as emergency response systems. In the event of fire, live shooter situations, earthquake, etc., an essential piece of information for first responders is knowledge of how many people are inside a building or critical area of a building. Since the technology intrinsically uses 3D scanning with volumetric data to do facial authentication, it can also recognize bodies even if no face is detected or recognized. This is especially useful in case of emergency, when during evacuation, people can be counted on the way out and an alert can be dispatched if a mismatch is present between employees indoors versus employees outdoors.

In another embodiment, the subject invention may use facial recognition to determine not (or not only) the identity of a given person, but to read that person's facial expressions as a user interface—that is, as a means for interacting with a computer system.

Figure 42:
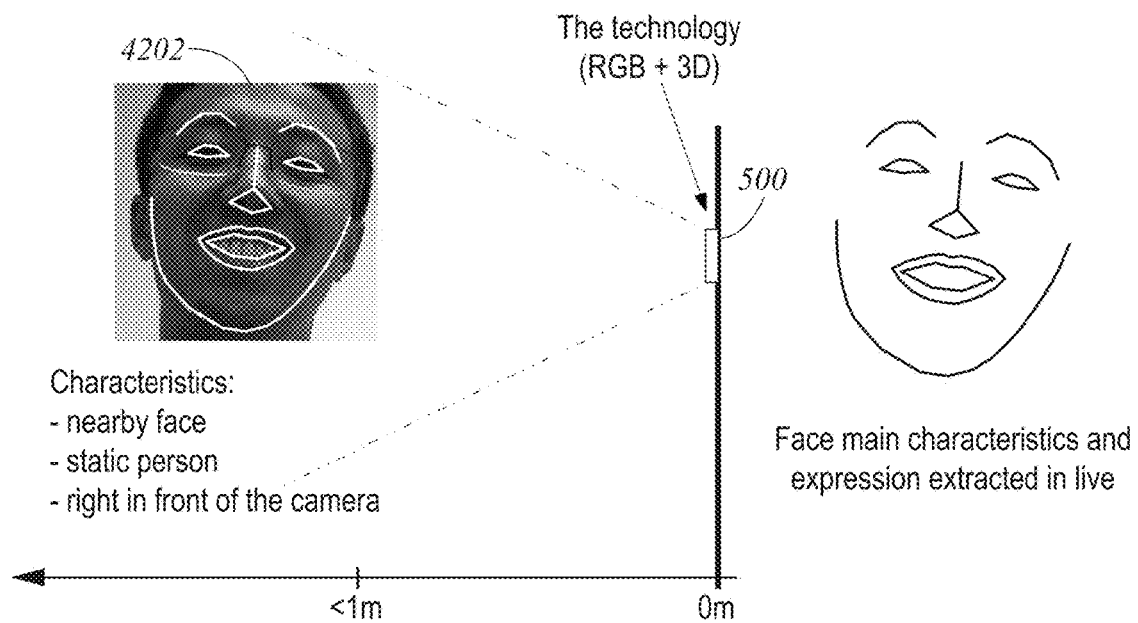
FIG. 42 is an illustration of how an embodiment of the subject invention may be used to allow a user to execute commands on a facial recognition module using facial expressions.
Figure 42:
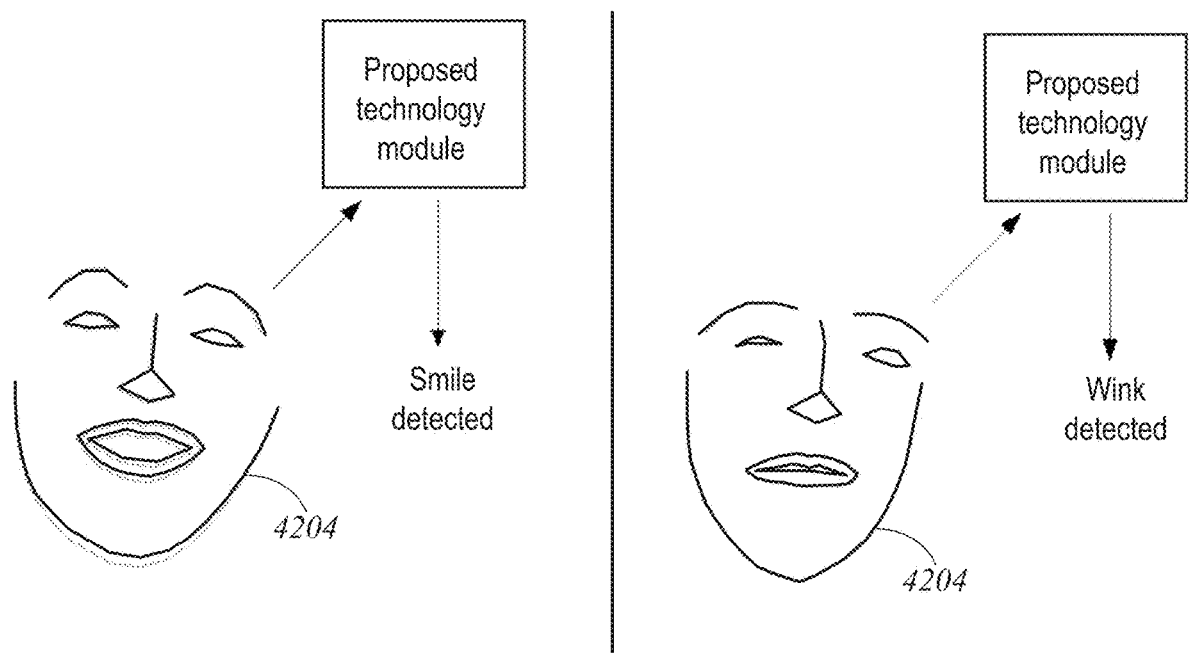

In an embodiment, Authorized individuals are able to perform administrative tasks with their facial expressions. Main tracking points are mouth, eyes and global facial movements. FIG. 42 provides some detail on how that is done.

When person 4202 approaches facial recognition module 500, and that person has been recognized as an authorized person through extraction of person 4202's facial features, it is also possible for person 4202 to trigger actions based on facial expressions. Thus if person 4202 smiles, facial recognition module 500 recognizes smiling face 4204, and can initiate an action that has been associated with a smile by that person, such as navigating among menu items; if person 4202 winks, facial recognition module 500 recognizes winking face 4206, and can initiate an action that has been associated with a wink by that person, such as selecting a menu item. Such expression-based actions can be the same for all users, or could be customized on a user-by-user basis.

Because security systems should be designed to prevent and detect a wide variety of methods of compromising them, it may be desirable to incorporate technologies inside the facial recognition module to detect a variety of forms of physical tampering. Thus in an embodiment of the subject invention, the invention comprises additional components that can detect tampering with the system.

The physical anti-tampering functionality has two main purposes. First, the system is designed to protect the internally stored user and location data from being accessed. Second, the system's door unlock functionality will be automatically disabled via software to prevent physical access to the secured space. In an exemplary embodiment, Upon detecting a physical access attempt, the system will perform an alert action and self-destruct. The notification can be configured to be any combination of sound and alert messages via digital transmission. The self-destructing action involves repeatedly erasing and overwriting sensitive user and location data regions within the internal flash storage and any removable storage medias.

In an exemplary embodiment, The system consists of three main types of physical anti-tampering detection methods. Any combination of the anti-tampering detection methods may be configured and used depending on the situation. First, in an exemplary embodiment the system has an internal barometer (also known as pressure sensor) and a physical structure which prevents rapid pressure changes. The system software monitors the barometer for rapid pressure changes via an interrupt. This antitampering method is designed to detect an intrusion involving physically breaking the casing of the system. For example, drilling into the casing or cracking the casing.

Second, in an exemplary embodiment the system has an internal ambient light sensor and a small light source between the wall mounting plate and the system casing.

When installed, the light is emitted from the light source, reflected from the wall mounting plate, and detected in the ambient light sensor. The system software monitors for light level changes from the ambient light sensor via an interrupt. This anti-tampering method is designed to detect when the system has been physically removed from the wall.

Last, in an exemplary embodiment the system has an internal accelerometer. When mounted on a wall, the system is expected to be relatively physically stable. The system software monitors for rapid acceleration via an interrupt. This anti-tampering method is designed to detect physical shock to the system such as being pried off by a crowbar or being hit by a hammer.

Another approach to sensing tampering is to monitor the image captured by the camera and sensors. If, for example, the location of normally stationary objects changes, and especially if the location of all such objects move together, it can indicate that the facial recognition module has been removed from its normal location.

Another aspect of the invention is the ability to operate in low-light conditions. The infrared laser projector may, in some embodiments, project enough light under certain conditions to permit one or both IR sensors to capture a useful 2D image. This image may be used for facial recognition in place of or in addition to RGB images when there is insufficient light to permit the RGB camera to produce high-quality images.

The subject invention provides multiple benefits as compared to previous building security technologies. FIG. 43 presents a comparison of classical access control methods and the proposed platform based on various criteria. This comparison is based on security, speed, ease of use and setup.

While particular embodiments of the present invention have been shown and described, it is apparent that changes and modifications may be made without departing from the invention in its broader aspects and, therefore, the invention may carried out in other ways without departing from the true spirit and scope. These and other equivalents are intended to be covered by the following claims:

What is claimed is:

1. A system for controlling access to multiple entry points to a building or other physical space at a plurality of controlled access point, the system comprising:
a plurality of facial recognition modules, each comprising at least a visible light camera, at least a plurality of sensors capable of detecting infrared light, an infrared light source; a processor, and memory;
an plurality of electronically unlockable access control mechanisms;
an access control panel comprising at least components capable of sending a signal to at least the electronically unlockable access control mechanism and receiving a signal from the facial recognition module and a database of badge identifiers, each such identifier comprising at least unique code associated with a specific badge;
wherein the plurality of facial recognitions module are configured to capture images of a plurality of people in the vicinity of the controlled access point;
wherein the plurality of facial recognition modules are further configured to determine whether each of the detected people in the vicinity of each controlled access point is authorized to enter the controlled access point;
wherein at least a facial recognition module transmits a signal to unlock the access control mechanism if a specified number of the people in the vicinity of the controlled access point are authorized to enter the controlled access point;
wherein said infrared light source projects a grid consisting of an array of lines or points over an area that roughly corresponds to the field of view of said sensor capable of detecting infrared light; and
wherein facial recognition information captured by one of said plurality of facial recognition modules is shared with the other facial recognition modules.

2. The system as in claim 1 in which the facial recognition module comprises at least an indicator light, which is illuminated if the access control mechanism is unlocked by the facial recognition module.

3. The system as in claim 1 in which the facial recognition module is connected to a central processor that stores a list comprising a plurality of authorized entrants at the controlled access point.

4. The system as in claim 1 which also comprises at least a badge reader separate from the facial recognition module, where said badge reader is capable of interacting with a plurality of badges carried by a plurality of people authorized to enter the physical space at the controlled access point so that at least a unique identifier associated each of said badges can be read from said badges.

5. The system as in claim 3 in which the facial recognition module is connected to the central processor by at least a pair of wires.

6. The system as in claim 1 in which the facial recognition module also comprises a badge reader capable of interacting with a plurality of badges carried by a plurality of people authorized to enter the physical space at the controlled access point so that at least a unique identifier associated each of said badges can be read from said badges.

7. The system as in claim 1 in which the facial recognition module contains a visible light camera capable of capturing images that are at least 1280 by 720 pixels in size.

8. The system as in claim 1 in which the facial recognition module contains at least an infrared light camera capable of capturing images that are at least 640 by 480 pixels in size.

9. The system as in claim 1 in which the facial recognition module transmits a signal to unlock the access control mechanism only if all of the detected people in the vicinity of the controlled access point are authorized to enter the controlled access point.

10. The system as in claim 1 in which the facial recognition module transmits a message to an administrator of said system if fewer than all of the detected people in the vicinity of the controlled access point are authorized to enter the controlled access point.

11. A method for controlling access to a building or other physical space at a plurality of controlled access points comprising:
maintaining, on an access control panel comprising at least components capable of sending a signal to at least the electronically unlockable access control mechanism and receiving a signal from the facial recognition module and a database of badge identifiers, each such identifier comprising at least unique code associated with a specific badge a database of faces of people with the right to access the building or other physical space;
capturing at least a visible light image with at least a camera mounted in a facial recognition module located near a controlled access point to the building or other access-controlled physical space;

projecting with at least an infrared light source mounted in said facial recognition module a grid consisting of an array of lines or points over a defined area;

capturing at least a first infrared image from a first infrared sensor mounted in the facial recognition module, where the field of view of said infrared sensor includes at least the area defined by said grid of lines or points projected by said infrared light source, and where said infrared sensor is capable of detecting the infrared light emitted by said infrared light source;

performing facial recognition on a plurality of persons using at least said visible light image and said infrared image;

determining whether each of the detected people in the vicinity of the controlled access point is authorized to enter the controlled access point;

determining whether to unlock an electronic lock connected to said facial recognition module controlling access to a building or other controlled space based at least in part upon whether a specified number of faces of detected people match faces of people listed in the database with the right to access the building or other physical space; and sharing facial recognition information captured by one of said plurality of facial recognition modules with the other facial recognition modules.

12. The method as in claim 11 in which the facial recognition module is connected to a central processor and the database is a list comprising a plurality of authorized entrants at the controlled access point.

13. The method as in claim 11 in which the facial recognition module also comprises at least a badge reader capable of interacting with a plurality of badges carried by a plurality of people authorized to enter the building or physical space at the controlled access point so that at least a unique identifier associated with each of said badges can be read from said badges.

14. The method as in claim 12 in which the facial recognition module is connected to the central processor by at least a pair of wires.

15. The method as in claim 11 in which the visible light camera is capable of capturing images that are at least 1280 by 720 pixels in size.

16. The method as in claim 11 in which at least one of said infrared light cameras is capable of capturing images that are at least 640 by 480 pixels in size.

17. The method as in claim 11 in which the facial recognition module transmits a signal to unlock the access control mechanism only if all of the detected people in the vicinity of the controlled access point are authorized to enter the controlled access point.

18. The method as in claim 11 in which the facial recognition module transmits a message to an administrator of said system if fewer than all of the detected people in the vicinity of the controlled access point are authorized to enter the controlled access point.

19. The method as in claim 11 in which the facial recognition module comprises an IR laser emitting structured light.

20. The method as in claim 11 which also comprises at least a badge reader separate from the facial recognition module, where said badge reader is capable of interacting with a plurality of badges carried by a plurality of people authorized to enter the physical space at the controlled access point so that at least a unique identifier associated with each of said badges can be read from said badges.

* * * * *